(12) United States Patent
Kushmerick

(10) Patent No.: US 10,891,148 B2
(45) Date of Patent: Jan. 12, 2021

(54) METHODS AND SYSTEMS FOR IDENTIFYING APPLICATION COMPONENTS IN DISTRIBUTED COMPUTING FACILITIES

(71) Applicant: VMware, Inc., Palo Alto, CA (US)

(72) Inventor: Nicholas Kushmerick, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 171 days.

(21) Appl. No.: 15/998,680

(22) Filed: Aug. 15, 2018

(65) Prior Publication Data

US 2020/0057665 A1 Feb. 20, 2020

(51) Int. Cl.
*G06F 9/455* (2018.01)
*G06F 11/30* (2006.01)
(Continued)

(52) U.S. Cl.
CPC ........ *G06F 9/45558* (2013.01); *G06F 11/302* (2013.01); *G06F 11/3051* (2013.01);
(Continued)

(58) Field of Classification Search
CPC ............. G06F 11/1423; G06F 11/1471; G06F 11/1482; G06F 2009/45562;
(Continued)

(56) References Cited

U.S. PATENT DOCUMENTS 8,756,595 B2 * 6/2014 Arcilla ................ G06F 9/44505
709/201
8,856,319 B1 * 10/2014 Huang .................. G06F 9/5077
709/224

(Continued)

*Primary Examiner* — Dong U Kim

(57) ABSTRACT

The current document is directed to automated methods and systems that employ unsupervised-machine-learning approaches as well as rule-based systems to discover distributed applications within distributed-computing environments. These automated methods and systems provide a basis for higher-level distributed-application administration and management tools and subsystems that provide distributed-application-level user interfaces and operations. In one implementation, the currently disclosed methods and systems employ agents within virtual machines that execute routines and programs and that together comprise a distributed application to continuously furnish information about the virtual machines to a pipeline of stream processors that collect and filter the information to provide for periodic application-discovery. The stream processors generate data representations of the processes currently running on the virtual machines and data representations of the communications connections between the virtual machines. An application-discovery subsystem periodically employs these data representations, and additional data derived from them, to identify the different distributed applications running within a distributed-computing facility and to identify tiers of virtual-machine nodes within each identified distributed application. This, in turn, allows the application-discovery subsystem to generate sets of delta changes for the discovered applications after each periodic application discovery.

20 Claims, 47 Drawing Sheets

(51) Int. Cl.
  *G06F 16/28* (2019.01)
  *G06N 20/00* (2019.01)
(52) U.S. Cl.
  CPC .. *G06F 16/285* (2019.01); *G06F 2009/45595* (2013.01); *G06N 20/00* (2019.01)
(58) Field of Classification Search
  CPC ......... G06F 2009/45575; G06F 21/554; G06F 2209/482; G06F 2209/508; G06F 9/54
  See application file for complete search history.

(56) References Cited

U.S. PATENT DOCUMENTS

| | | | | |
|---|---|---|---|---|
| 9,830,190 | B1* | 11/2017 | Pfleger, Jr. | G06F 9/5016 |
| 2005/0278699 | A1* | 12/2005 | Buskens | G06F 9/4856 |
| | | | | 717/120 |
| 2005/0278701 | A1* | 12/2005 | Buskens | G06F 11/1438 |
| | | | | 717/120 |
| 2006/0067209 | A1* | 3/2006 | Sheehan | H04L 29/08846 |
| | | | | 370/216 |
| 2007/0250840 | A1* | 10/2007 | Coker | G06F 9/54 |
| | | | | 719/320 |
| 2011/0265164 | A1* | 10/2011 | Lucovsky | G06F 9/45533 |
| | | | | 726/7 |
| 2013/0124911 | A1* | 5/2013 | Griffith | H04L 45/28 |
| | | | | 714/4.2 |
| 2013/0124912 | A1* | 5/2013 | Griffith | G06F 11/20 |
| | | | | 714/4.2 |
| 2013/0232164 | A1* | 9/2013 | Bigney | G06F 9/5061 |
| | | | | 707/769 |
| 2013/0275969 | A1* | 10/2013 | Dimitrov | G06F 8/61 |
| | | | | 718/1 |
| 2014/0096134 | A1* | 4/2014 | Barak | G06F 9/45558 |
| | | | | 718/1 |
| 2014/0115028 | A1* | 4/2014 | Taylor | G06Q 10/10 |
| | | | | 709/202 |
| 2016/0103881 | A1* | 4/2016 | Gukal | G06F 16/248 |
| | | | | 707/722 |
| 2018/0176120 | A1* | 6/2018 | Katz | G06F 9/5061 |
| 2019/0059117 | A1* | 2/2019 | Shu | H04W 76/19 |

* cited by examiner

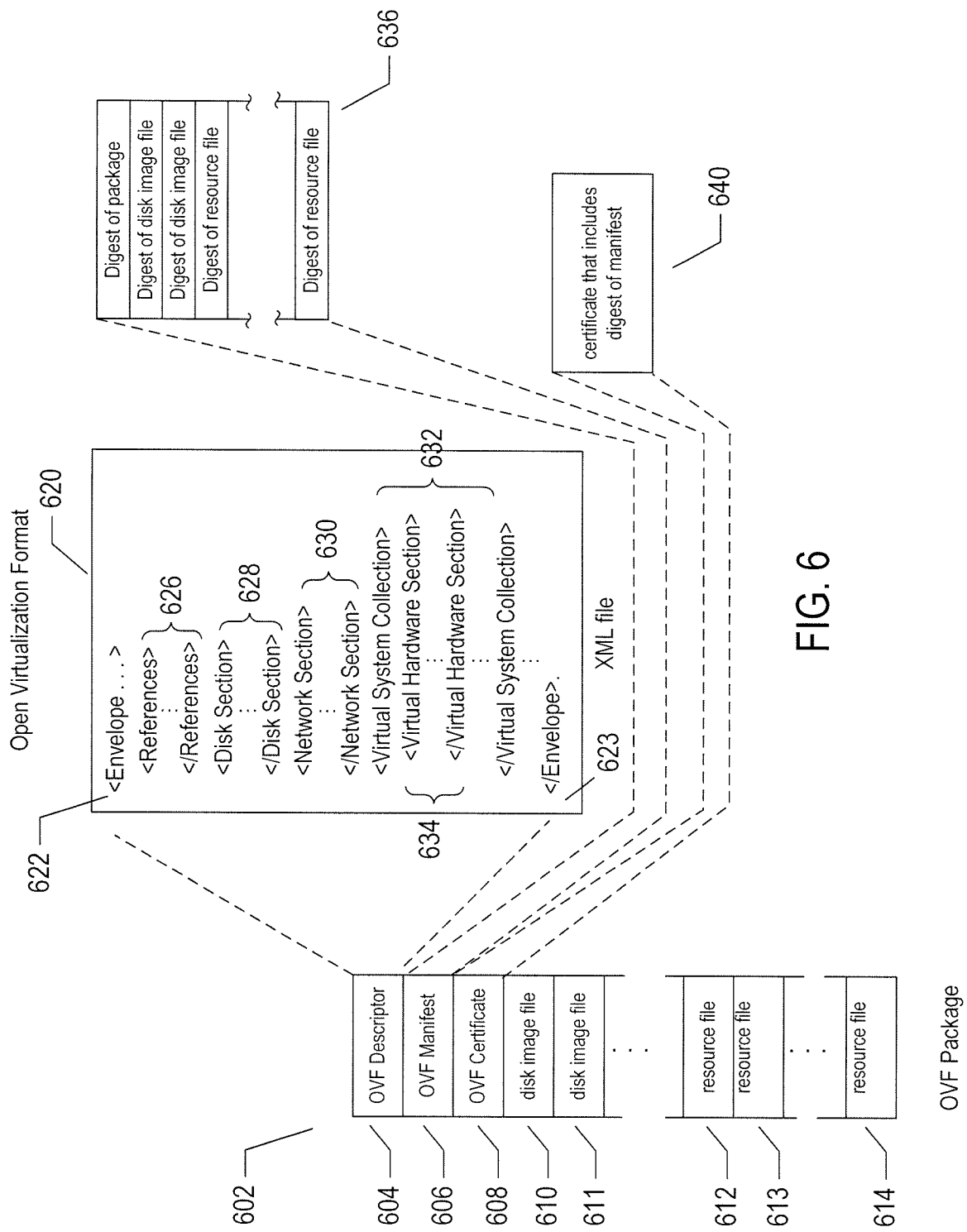

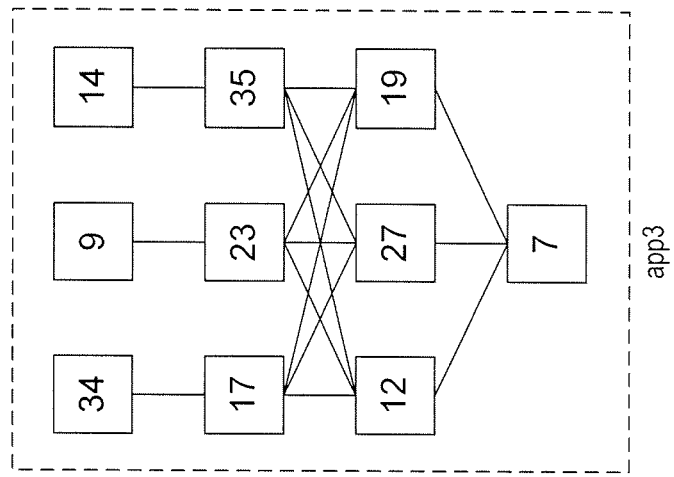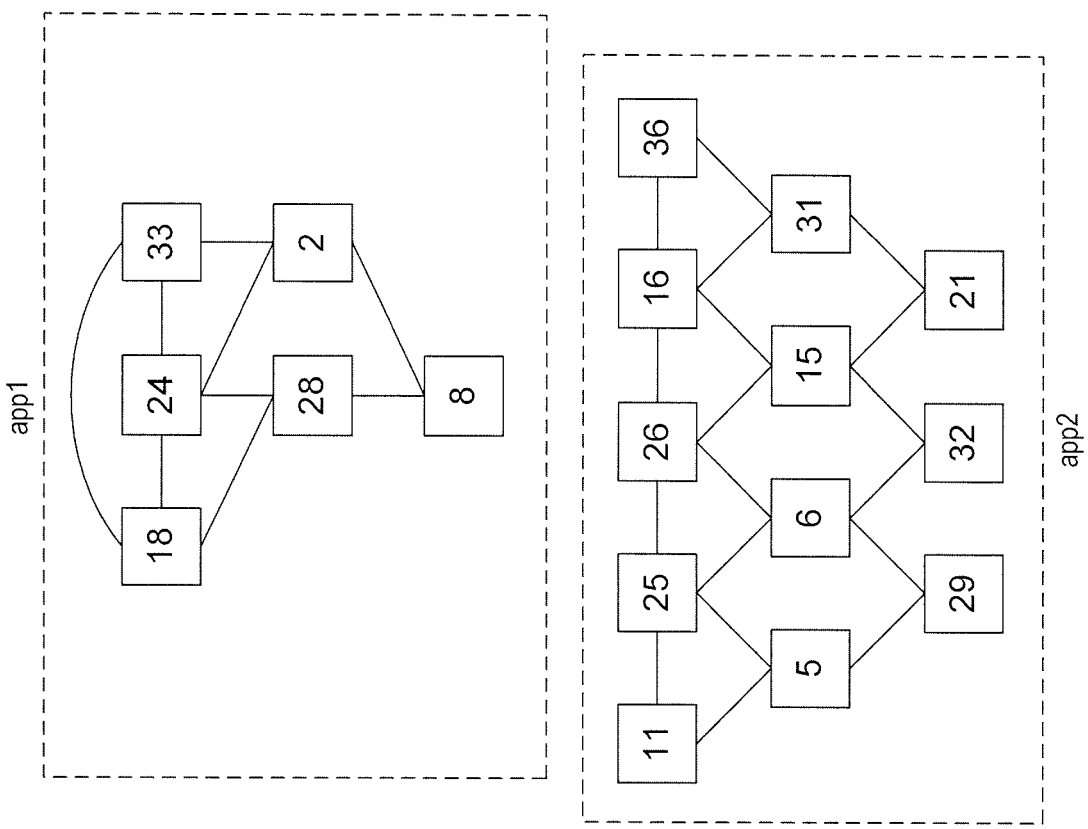
FIG. 23

2702 — count (t,n) = count for the pair t, n in table Terms

2704 — N = total number of nodes

2706 — $n_t$ = total number of nodes for which count(t,n) > 0

2708 — $w(t,n) = count(t,n) \log\left(\dfrac{N}{n_t}\right)$

2710 — $d(n_1, n_2) = \dfrac{\sum_t w(t, n_1) w(t, n_2)}{\sqrt{\sum_t w(t, n_1)^2} \sqrt{\sum_t w(t, n_2)^2}}$ 2712 — $G = \{n_1, \ldots, n_z\}$

2716

2714 — $|G| = Z, \quad 1 \leq |G| \leq N$

2718 — $d(G_1, G_2) = \dfrac{1}{|G_1||G_2|} \displaystyle\sum_{n_1 \in G_1} \sum_{n_2 \in G_2} d(n_1, n_2)$

| tier_ID_f | tier_ID_1 | tier_ID_2 | $d(G_1,G_2)$ | merged |
|---|---|---|---|---|
|  |  |  |  |  |
|  |  |  |  |  |
|  |  |  |  |  |

2720

Merges

M = number of rows in table Mergers
S = sum of $d(G_1, G_2)$ in table Mergers
threshold = $\dfrac{S}{M}$

FIG. 27

```
                    connection_groups*  connection_group = null;  ──── 2902
                    tempTable = Node_Connections;  ──── 2904
           ┌──  while (row in tempTable)
           │    {
           │        select row r from tempTable;  ──── 2908
           │        delete r from tempTable;  ──── 2910
           │        g = new connection_group;  ──── 2912
           │        add(connection_groups, g)  ──── 2914
           │        insert(g, r.node_ID_1);  ⎫
           │        insert(g, r.node_ID_2);  ⎬ 2916
   2906 ──┤                                  ⎭
           │        while(select row s from tempTable              ⎫
           │              where  s.node_ID_1 in g, OR              │
           │                     s.node_ID_2 in g                  ⎬ 2918
           │        {                                              │
           │            delete s from tempTable;  ──── 2920        │
           │            if (s.node_ID_1 in g AND s.node_ID_2 not in g) insert(g, s.node_ID_2);  ⎫
           │            else if(s.node_ID_2 in g AND s.node_ID_1 not in g)                      ⎬ 2922
           │        }        insert(g, s.node_ID_1);                                            ⎭
           └──  }
```

FIG. 29

METHODS AND SYSTEMS FOR IDENTIFYING APPLICATION COMPONENTS IN DISTRIBUTED COMPUTING FACILITIES

TECHNICAL FIELD

The current document is directed to distributed computing systems and, in particular, to methods and systems that discover the components of distributed applications within distributed-computing environments using unsupervised-machine-learning approaches.

BACKGROUND

Computer systems and computational technologies have steadily evolved, during the past 70 years, from initial vacuum-tube-based systems that lacked operating systems, compilers, network connectivity, and most other common features of modem computing systems to vast distributed computing systems that include large numbers of multi-processor servers, data-storage appliances, and multiple layers of internal communications networks interconnected by various types of wide-area networks and that provide computational resources to hundreds, thousands, tens of thousands, or more remote users. As operating systems, and virtualization layers have been developed and refined, over the years, in parallel with the advancements in computer hardware and networking, the robust execution environments provided by distributed operating systems and virtualization layers now provide a foundation for development and evolution of many different types of distributed application programs, including distributed database-management systems, distributed client-server applications, and distributed web-based service-provision applications. This has resulted in a geometric increase in the complexity of distributed computing systems, as a result of which owners, administrators, and users of distributed computing systems and consumers of computational resources provided by distributed computing systems increasingly rely on auto-mated and semi-automated management and computational-resource-distribution subsystems to organize the activities of many users and computational-resource consumers and to control access to, and use of, computational resources within distributed computing systems.

One problem domain that has emerged in the area of distributed computing systems is the lack of intuitive and effective administration and management tools for monitoring and managing application programs by clients of cloud-computing facilities and vendors. Many modern distributed applications run by clients of cloud-computing facilities execute on multiple hierarchically organized virtual machines that each supports execution of multiple processes. Often, these large, complex distributed applications are automatically launched via blueprint-based or script-based application-deployment subsystems. As a result, the cloud-computing-facility users may not directly understand and monitor the many different components of a distributed application, but may instead rely on automated distributed-application deployment and management tools. However, in many cases, the automated distributed-application deployment and management tools do not provide visual representations of application programs and do not provide application-based operations, but instead provide finer granularity user interfaces and tools that allow users to monitor and manage virtual machines, virtual servers, virtual data centers, and other computational entities at hierarchical levels below and above the level of distributed applications. For example, automated distributed-application deployment and management tools may provide tools for managing the virtual machines running on a particular physical or virtual server or a group of physical or virtual servers, but those virtual machines may be supporting execution of multiple different distributed applications. As another example, automated distributed-application deployment and management tools may provide tools for managing virtual disks and virtual data-storage appliances, but any virtual disk may be used by multiple different distributed applications, and management operations directed to those disks may have widely different ramifications for the different distributed applications using them. Furthermore, modern distributed applications are often quite dynamic, continuously or intermittently adding and removing computations resources sin order to respond to changes in workload and request volumes generated by remote users of the distributed applications. A user may wish to monitor and manage applications from an application viewpoint rather than monitoring and managing a collection of virtual machines, containers, virtual servers, and other computational resources that together comprise, or contribute to execution of, one or more distributed applications. A user might, for example, wish to determine the current cost, per unit time or per volume of requests, for a particular distributed application, but such determinations may need to be made by accessing information with regard to many different computational resources that together comprise the distributed application. Similarly, a user may wish to migrate a particular distributed application to a different cloud-computing facility or data-center node of a distributed cloud-computing facility, but currently available administration and management tools may support only migration of virtual machines, as a result of which the user would need to identify the virtual-machine components of the distributed application and migrate the components individually. Part of the reason for the lack of intuitive and effective administration and management tools for monitoring and managing distributed application programs by clients of cloud-computing facilities is that it is generally non-trivial and, indeed, computationally difficult to automatically identify the various different computational resources that together comprise a distributed application. Various types of distributed-application deployment, management, and monitoring tools currently provide facilities that allow a cloud-computing-facility user to identify the computational resources that together comprise a distributed application, but, for many reasons, these distributed-application-identification tools are unsuitable as a basis for application-level administration and management. For one thing, using the tools is a labor-intensive and often error-prone operation, as a result of which users either fail to properly identify the computational-resource components of the distributed application or fail to continuously or periodically monitor the identified computational-resource components to account for the dynamic nature of modern distributed applications. As a result, distributed-application-centric administration and management tools continue to lack precise and reliable methods and subsystems for identifying the computational resources that together comprise distributed applications and therefore continue to fail to provide a distributed-application-centric suite of management and monitoring tools to clients and users of cloud-computing facilities.

SUMMARY

The current document is directed to automated methods and systems that employ unsupervised-machine-learning approaches as well as rule-based systems to discover distributed applications within distributed-computing environments. These automated methods and systems provide a basis for higher-level distributed-application administration and management tools and subsystems that provide distributed-application-level user interfaces and operations. In one implementation, the currently disclosed methods and systems employ agents within virtual machines that execute routines and programs and that together comprise a distributed application to continuously furnish information about the virtual machines to a pipeline of stream processors that collect and filter the information to provide for periodic application-discovery. The stream processors generate data representations of the processes currently running on the virtual machines and data representations of the communications connections between the virtual machines. An application-discovery subsystem periodically employs these data representations, and additional data derived from them, to identify the different distributed applications running within a distributed-computing facility and to identify tiers of virtual-machine nodes within each identified distributed application. This, in turn, allows the application-discovery subsystem to generate sets of delta changes for the discovered applications after each periodic application discovery.

BRIEF DESCRIPTION OF THE DRAWINGS

FIG. 6 illustrates an OVF package.

FIGS. 21-24 illustrate operation of the application monitor. FIG. 21 shows three applications using the node-, tier-, and connection-illustration conventions used in FIG. 12B.

FIG. 23 shows the currently executing applications in the distributed-computing facility at a second point in time $t_2$.

FIG. 24 illustrates the tables Tiers and Applications following application identification by the application monitor at time $t_2$.

FIG. 27 provides greater detail regarding the hierarchical agglomerative clustering method implemented by the for-loop of steps 2612-2614 in the FIG. 26.

FIG. 29 provides pseudocode that illustrates one method for partitioning the typed nodes (2810 in FIG. 28) into interconnected partitions (2814 in FIG. 28).

DETAILED DESCRIPTION

Figure 1:
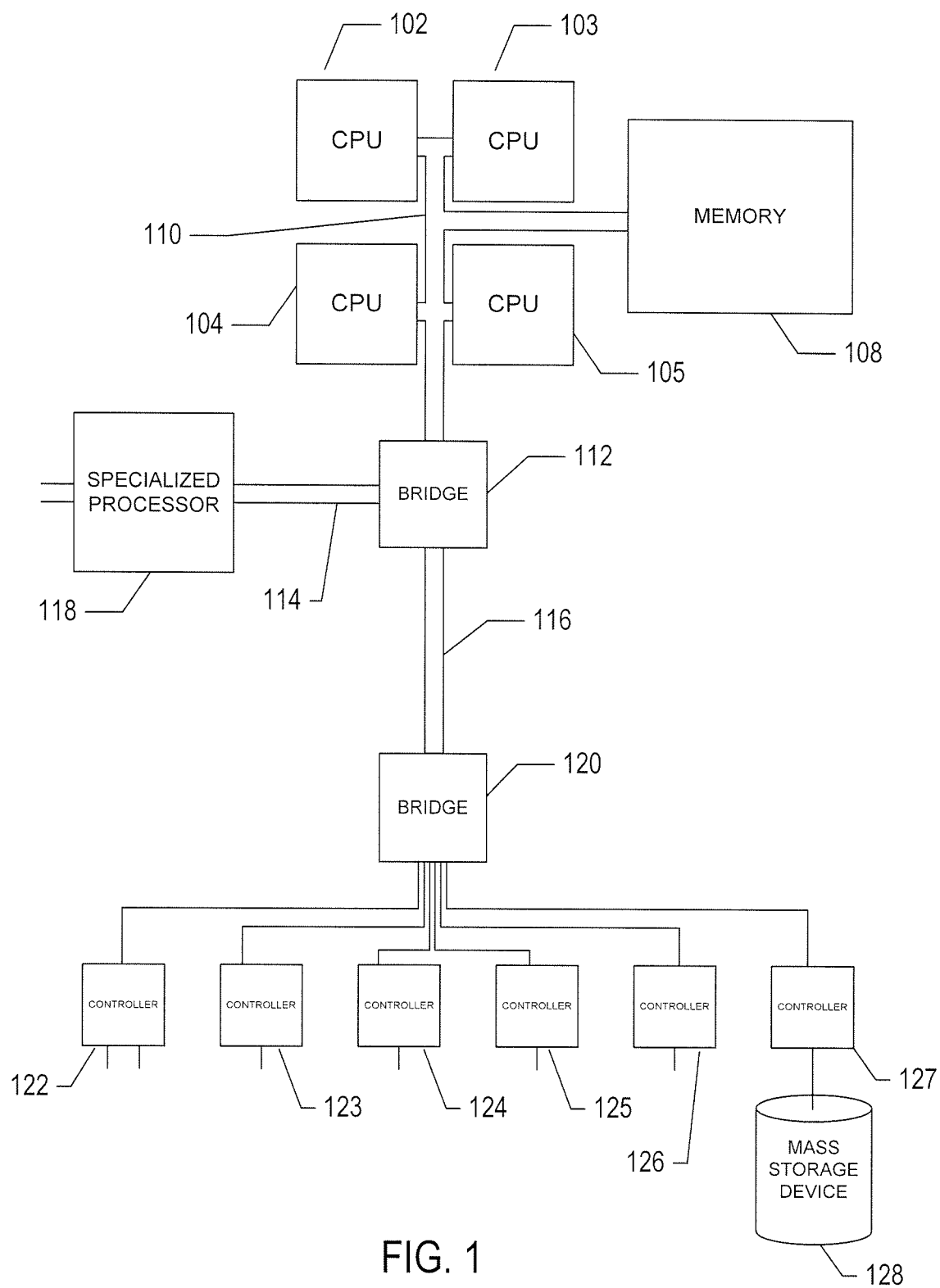
FIG. 1 provides a general architectural diagram for various types of computers.

The current document is directed to methods and systems that identify computational-resource components of distributed applications in distributed-computing facilities. In a first subsection, below, a detailed description of computer hardware, complex computational systems, and virtualization is provided with reference to FIGS. 1-10. In a second subsection, the methods and systems to which the current document is directed are discussed with reference to FIGS. 11A-30.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
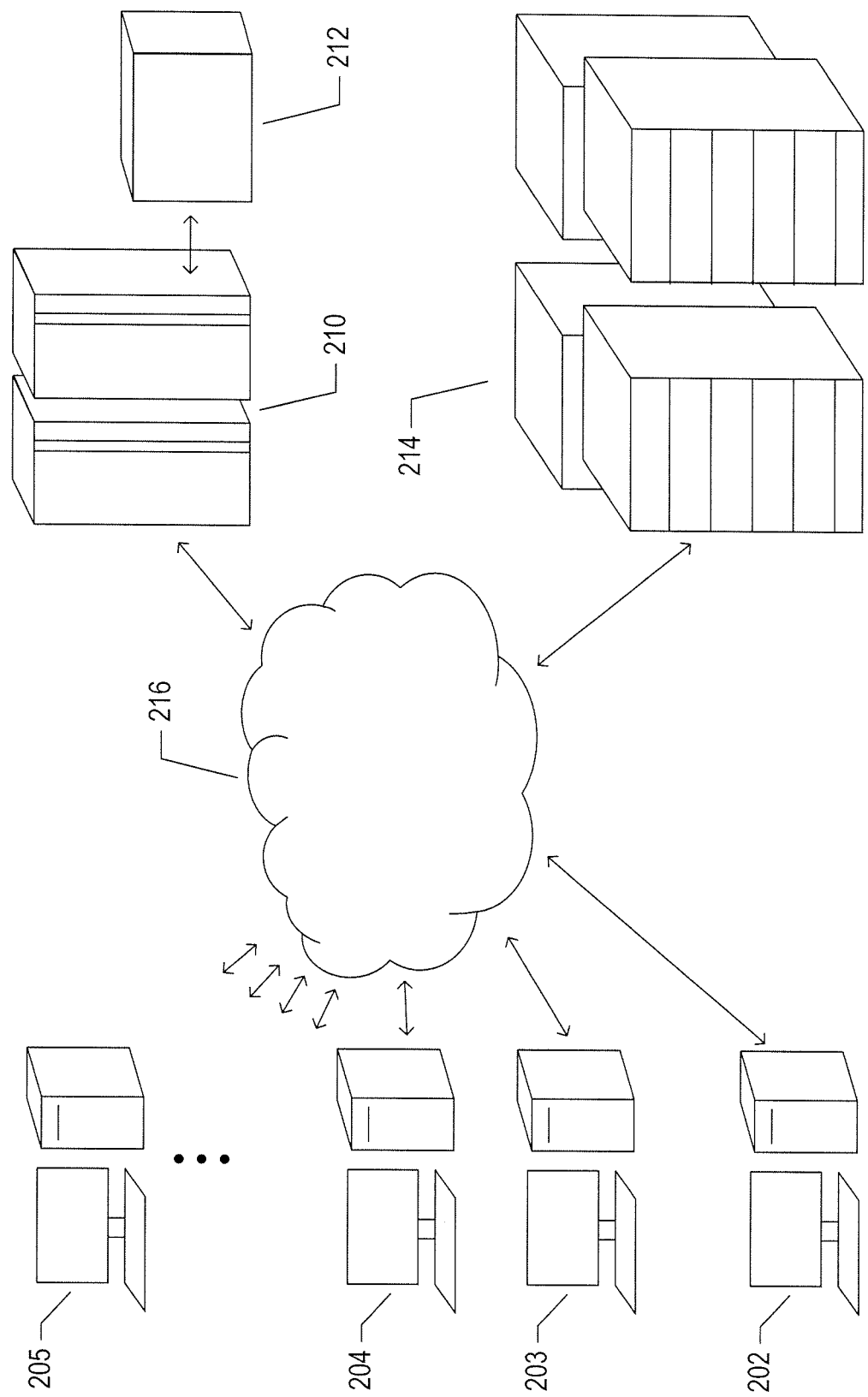
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
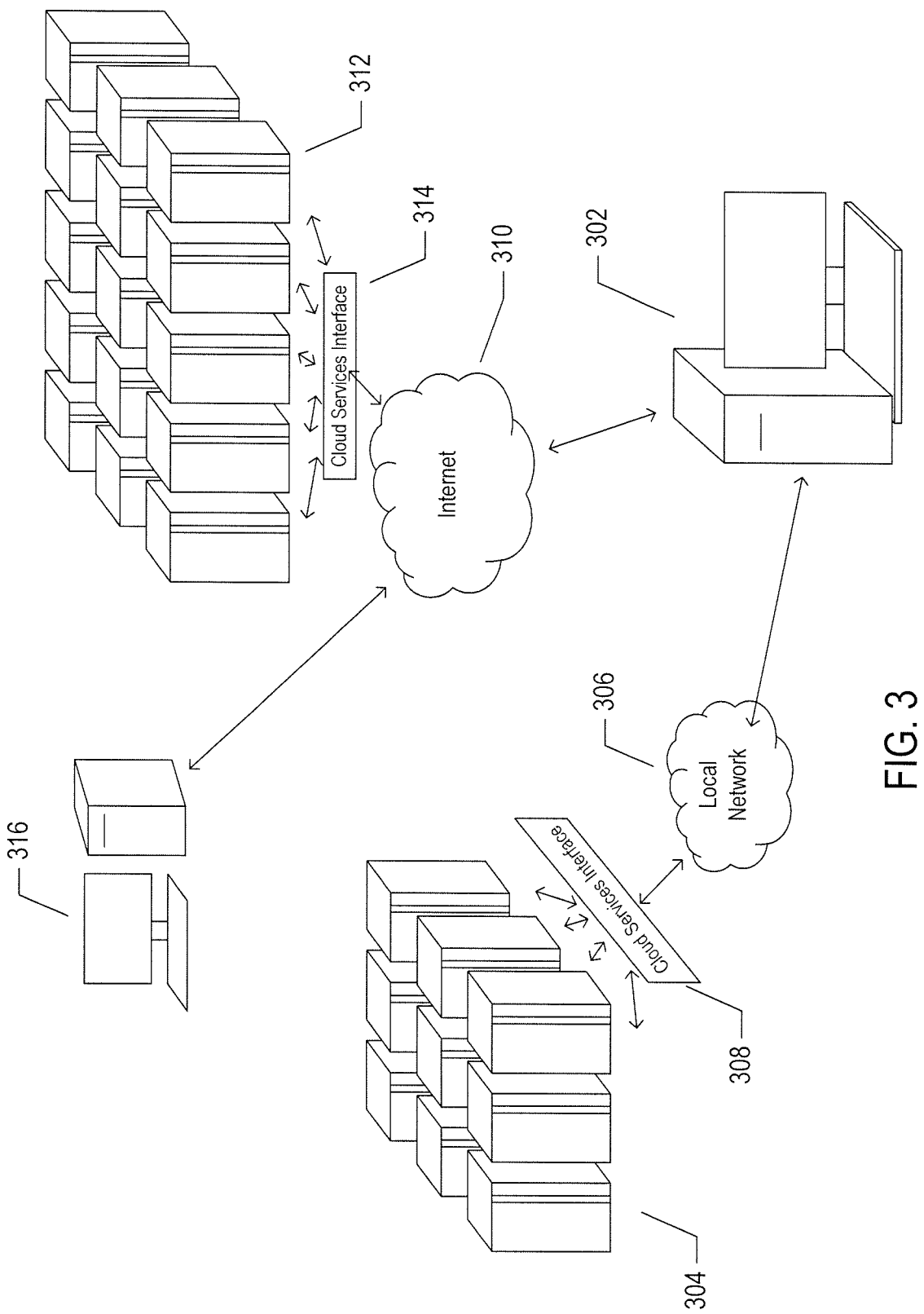
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
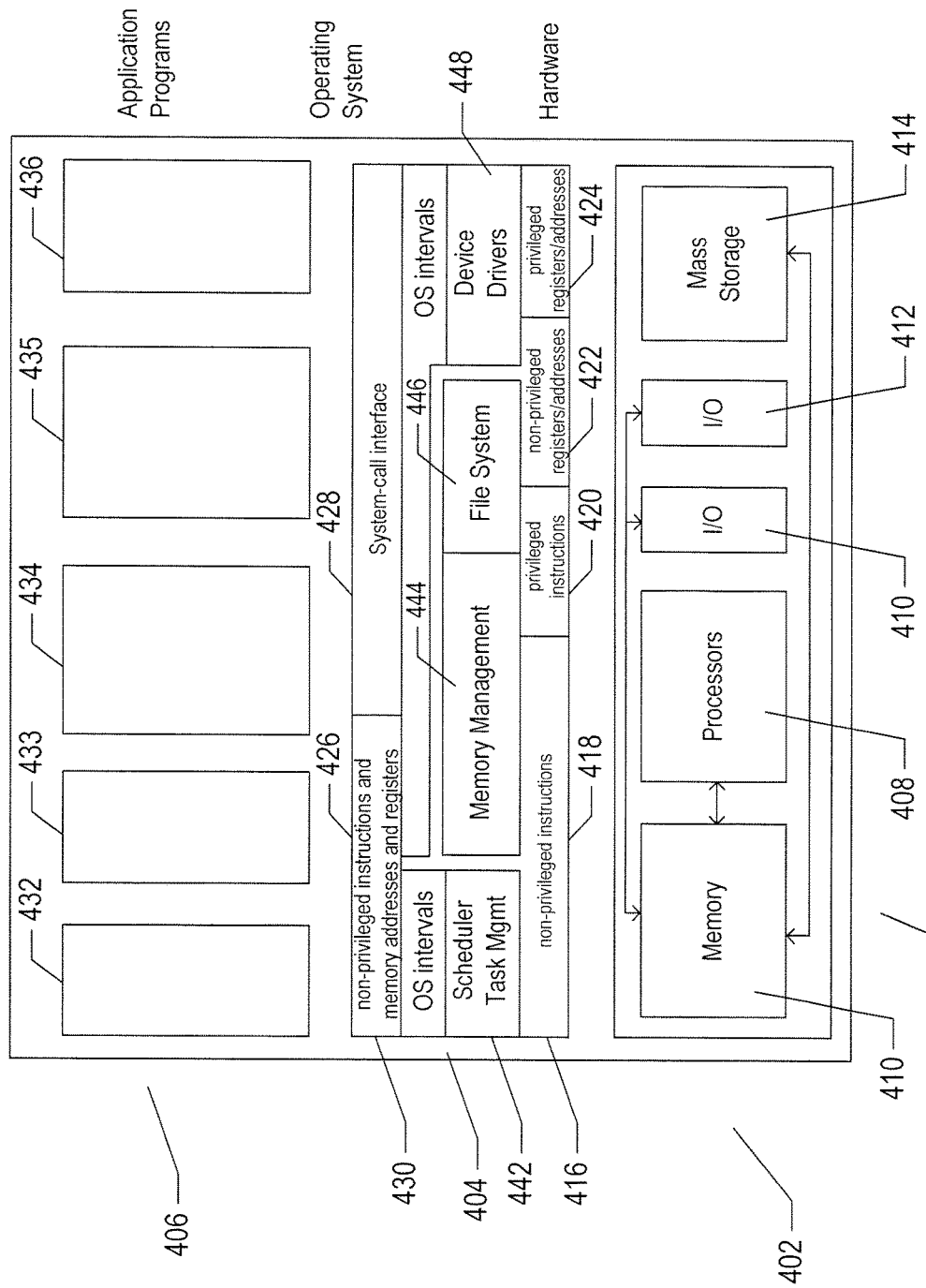
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
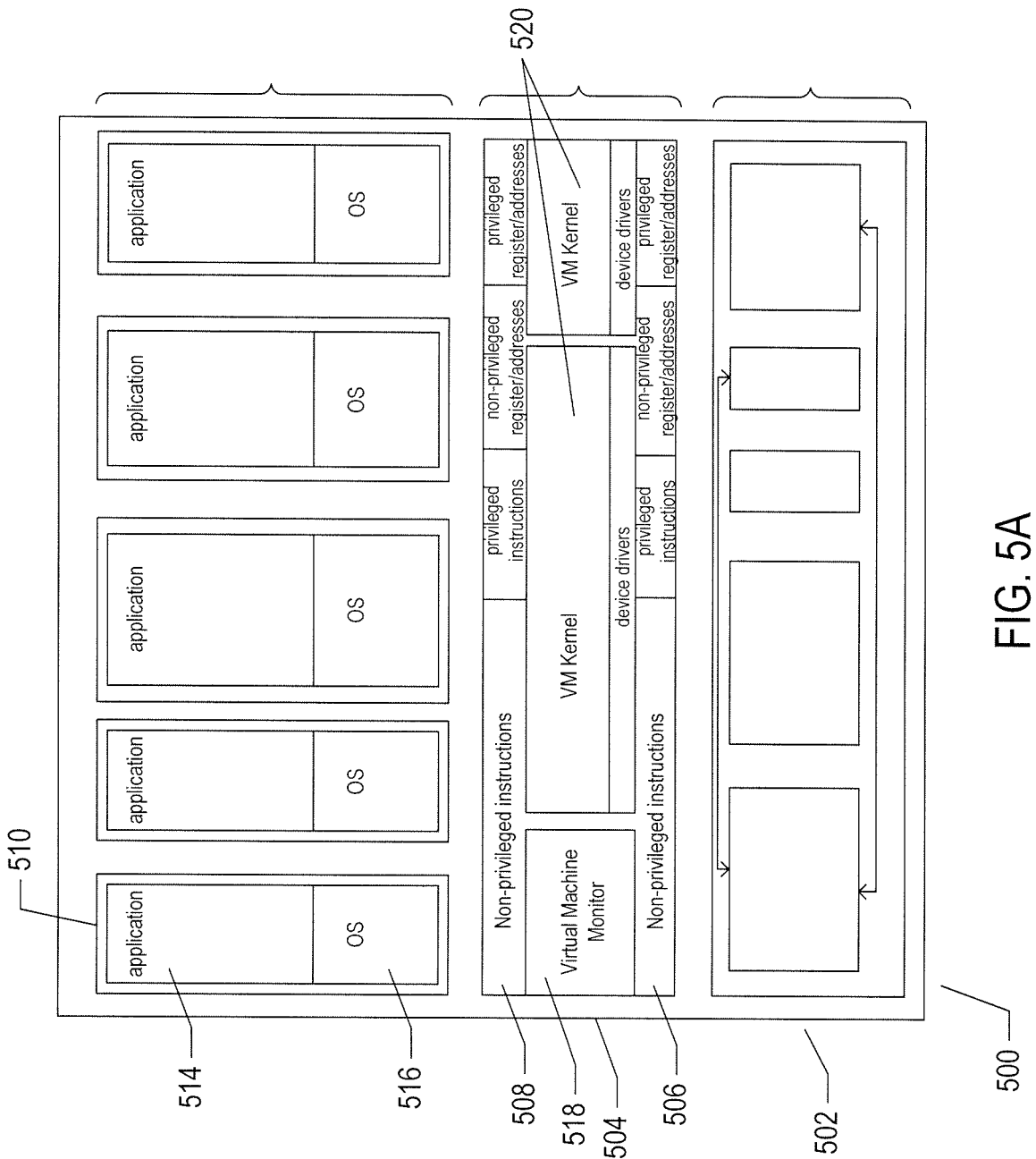
FIGS. 5A-D illustrate two types of virtual machine and virtual-machine execution environments.
Figure 5B:
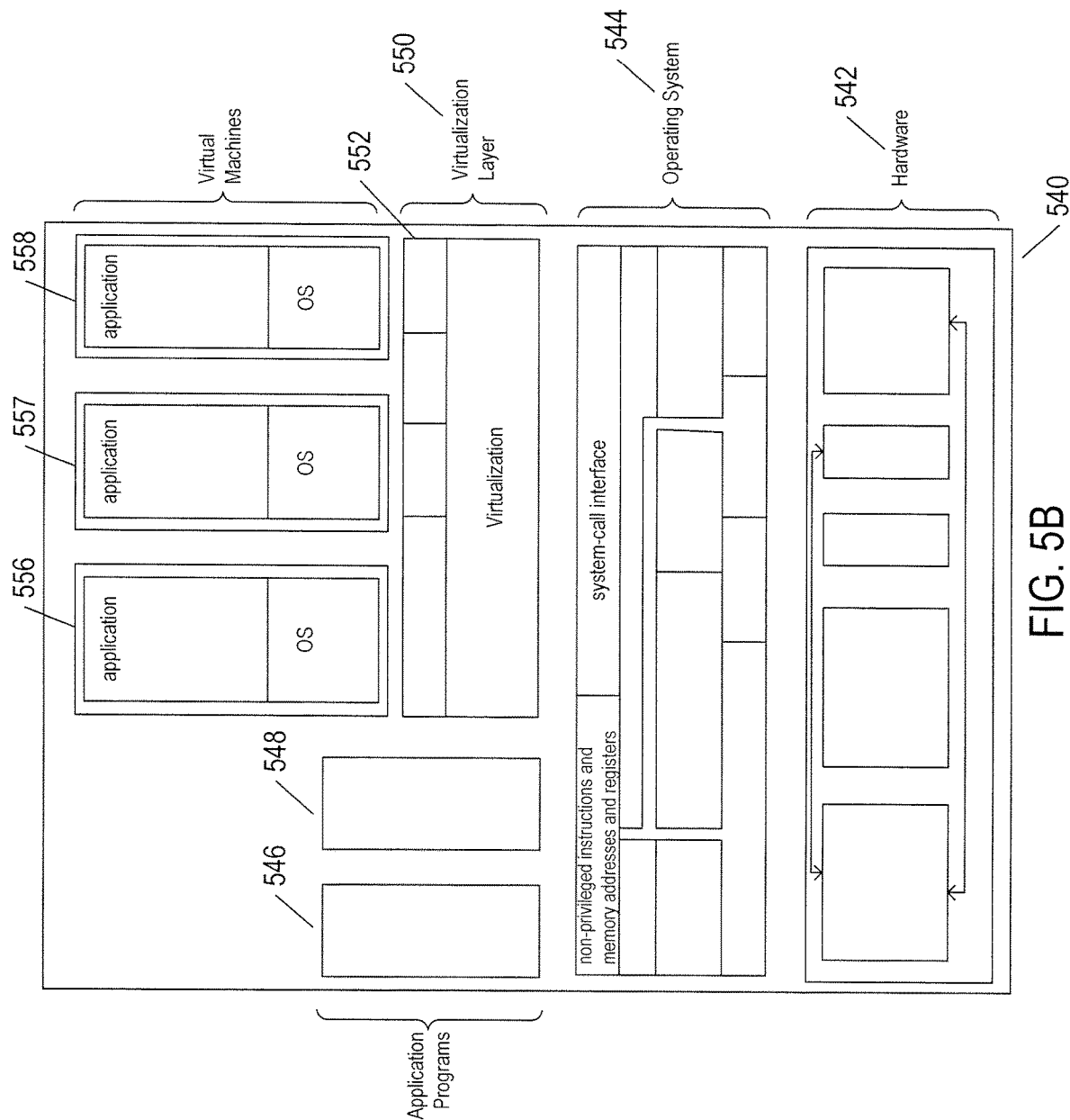

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
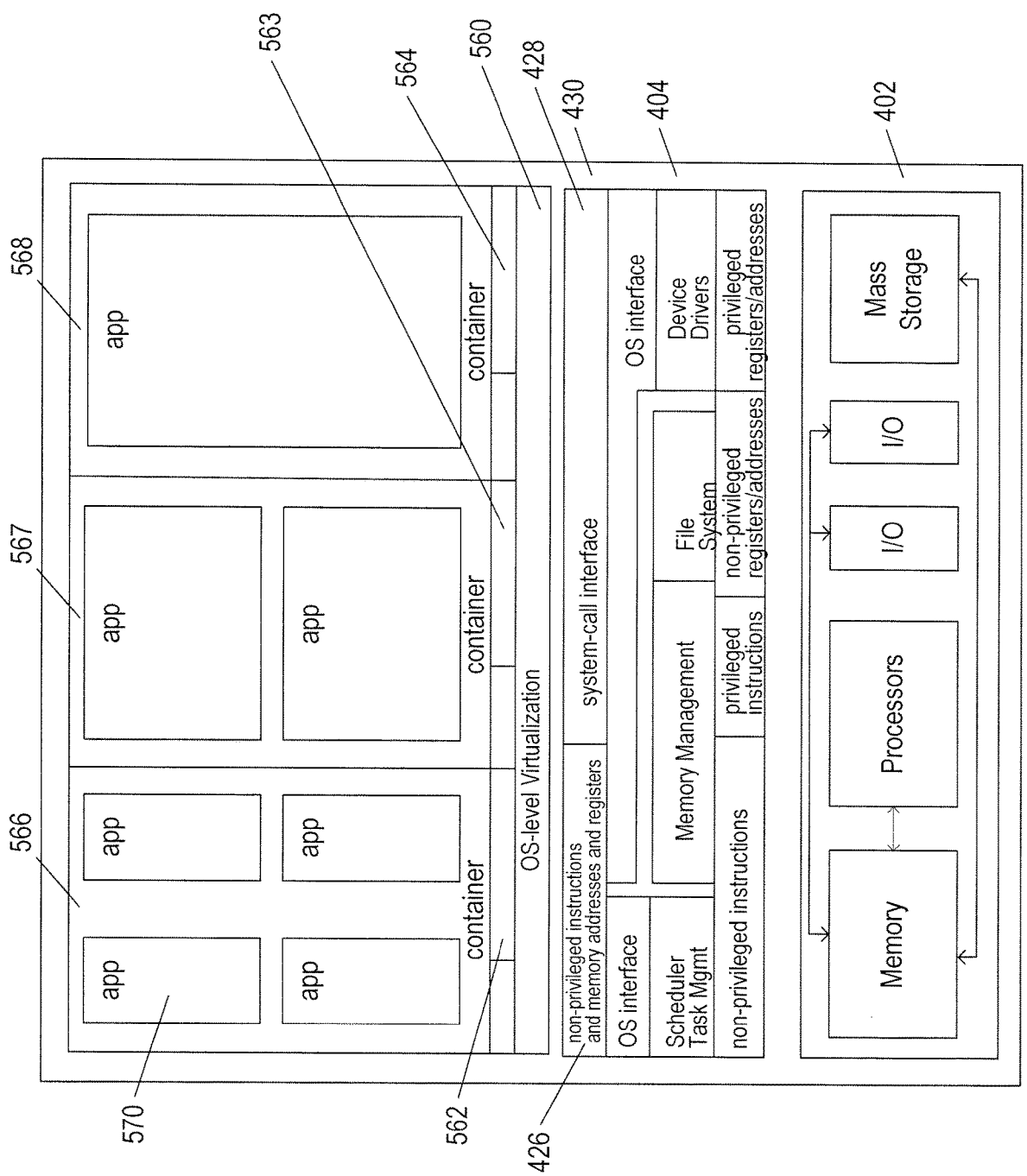

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
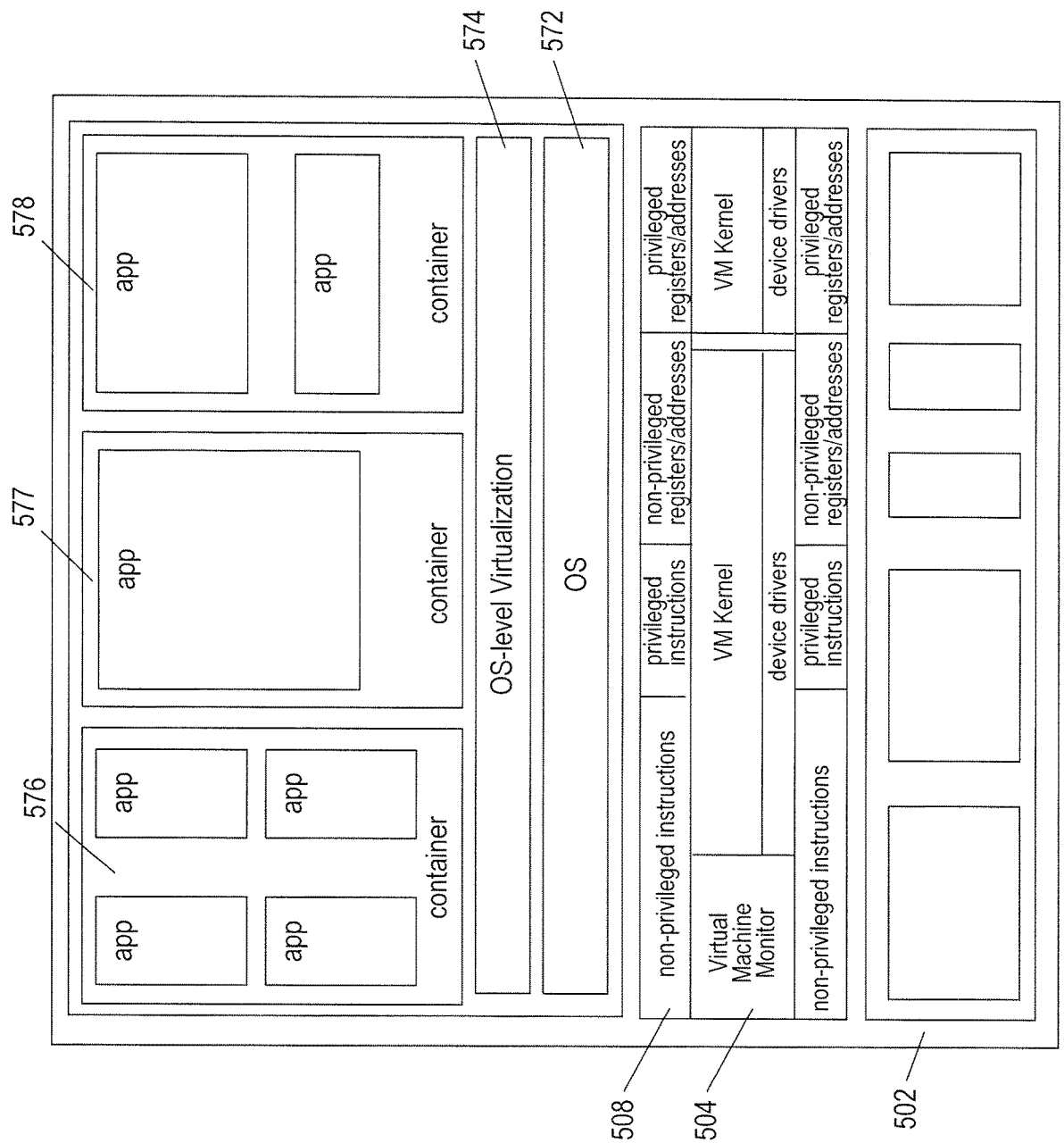

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
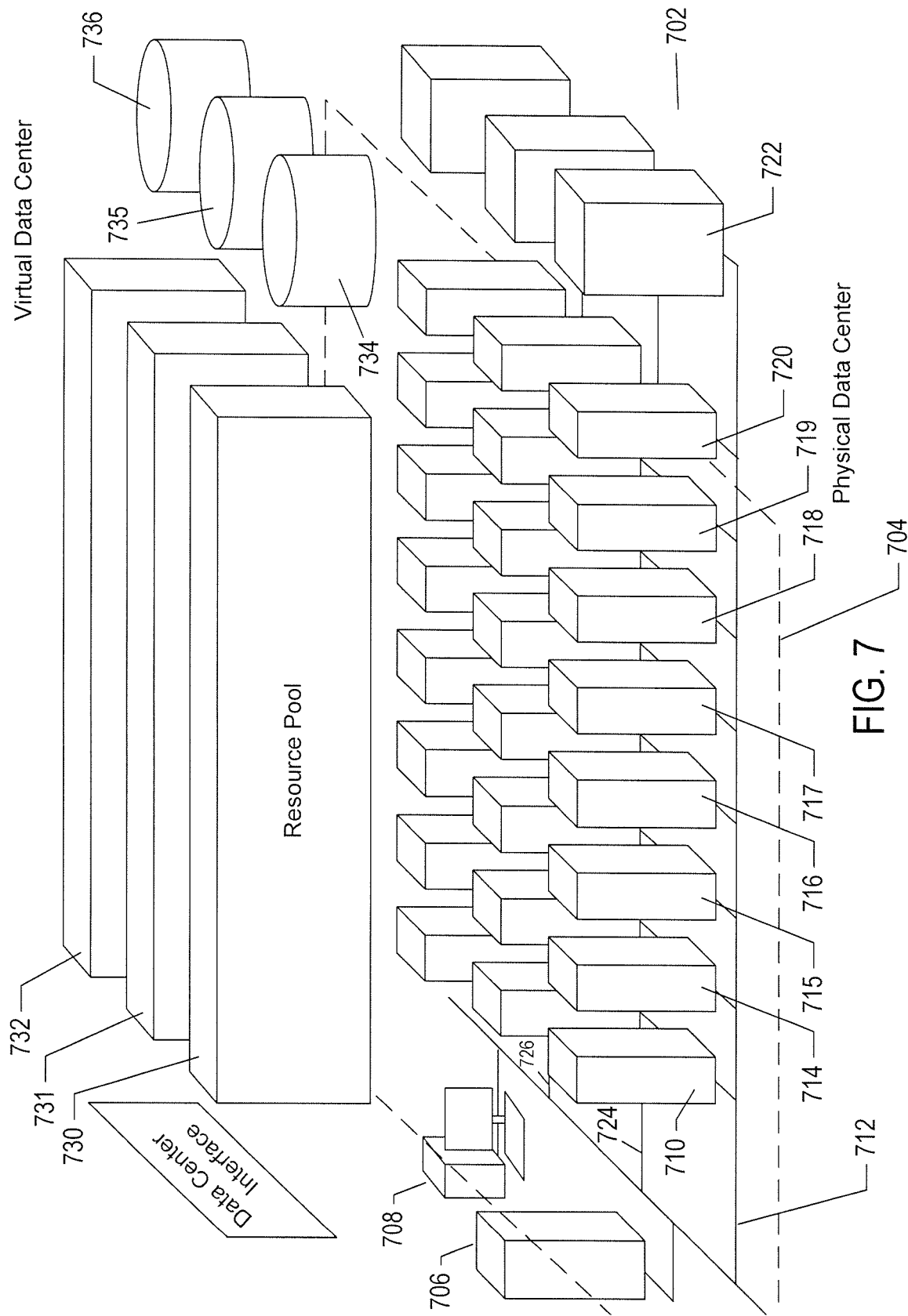
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
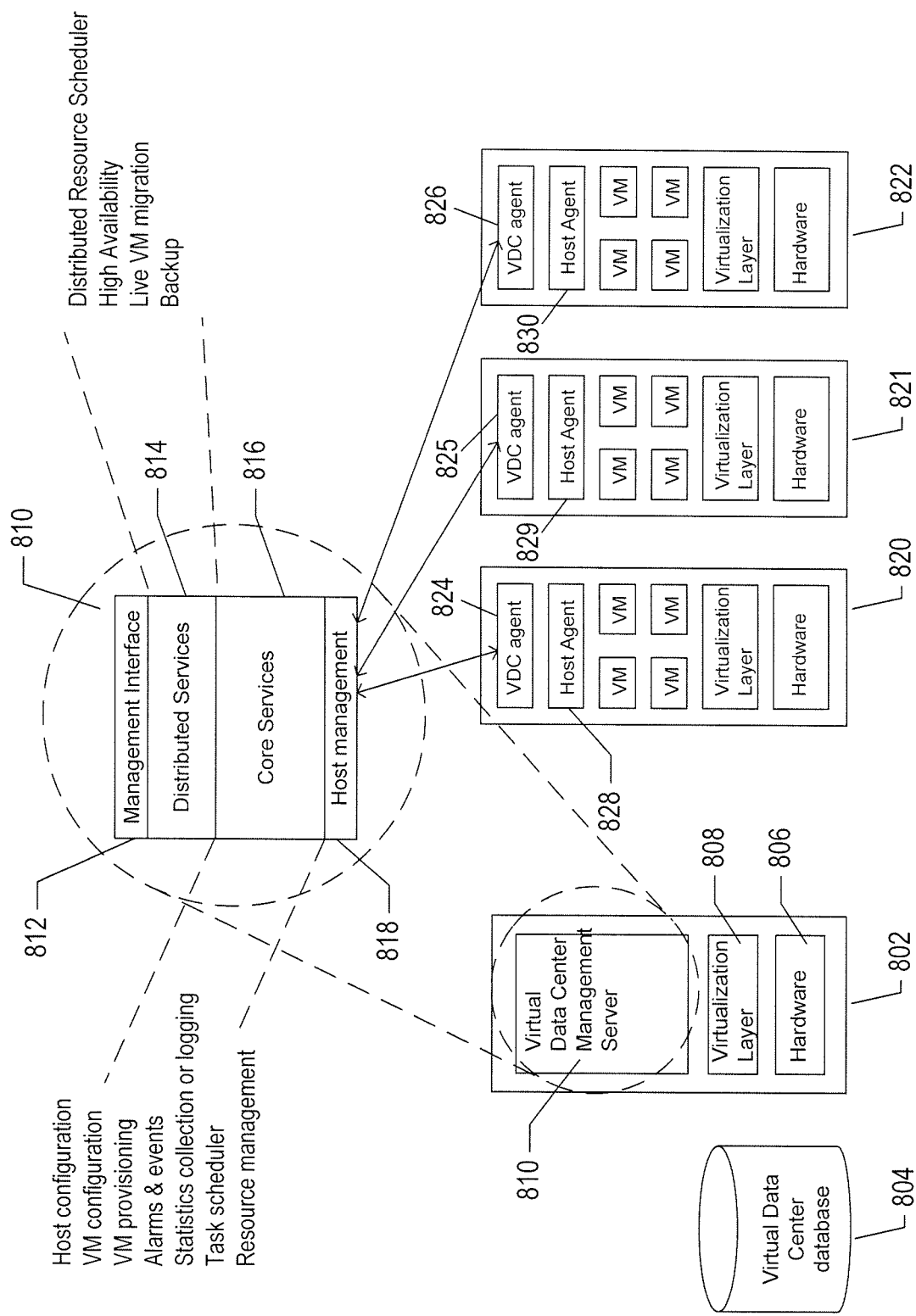
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual data management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG.

3) exposes a virtual-data-center management interface that abstracts the physical data center.

Figure 9:
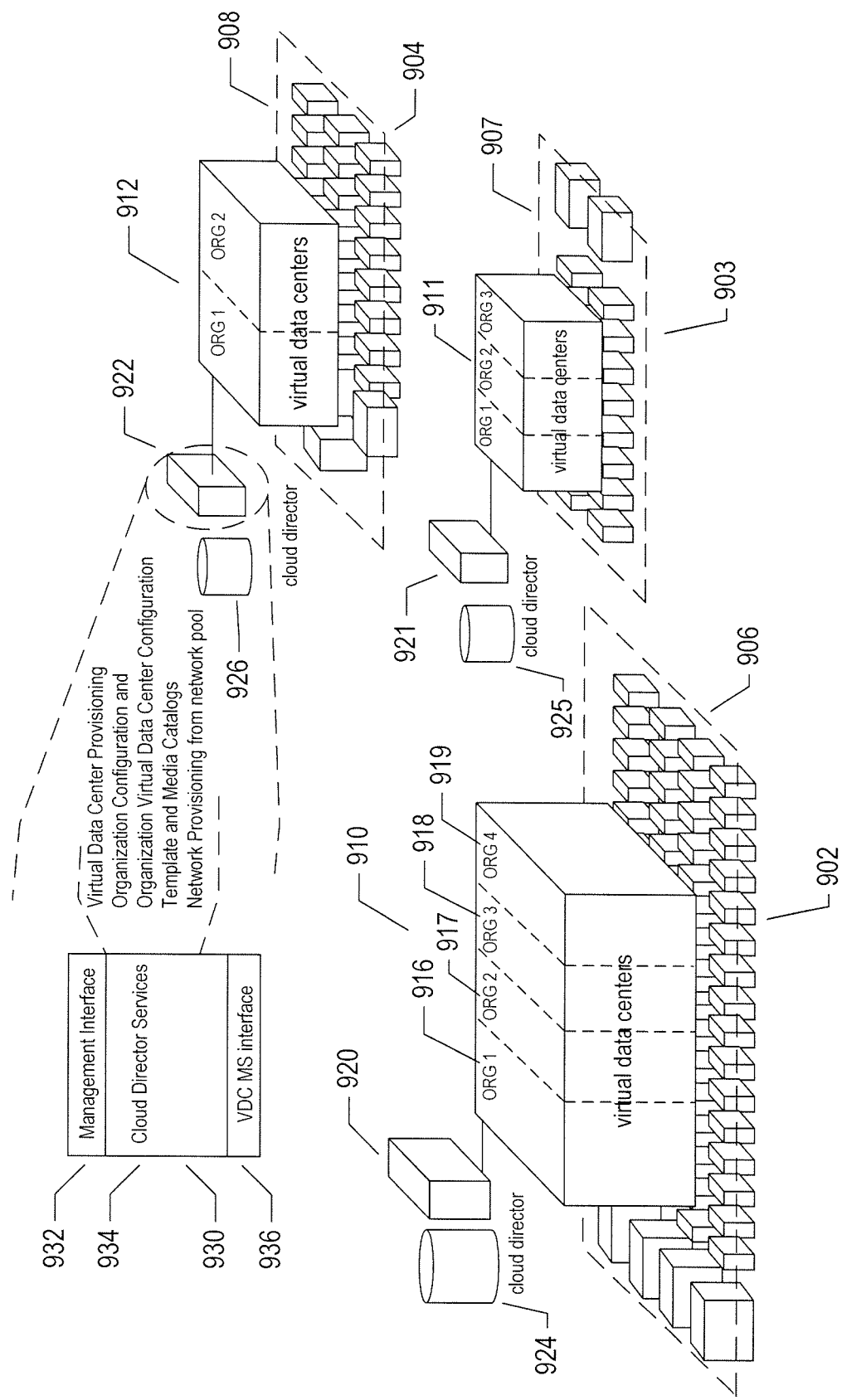
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
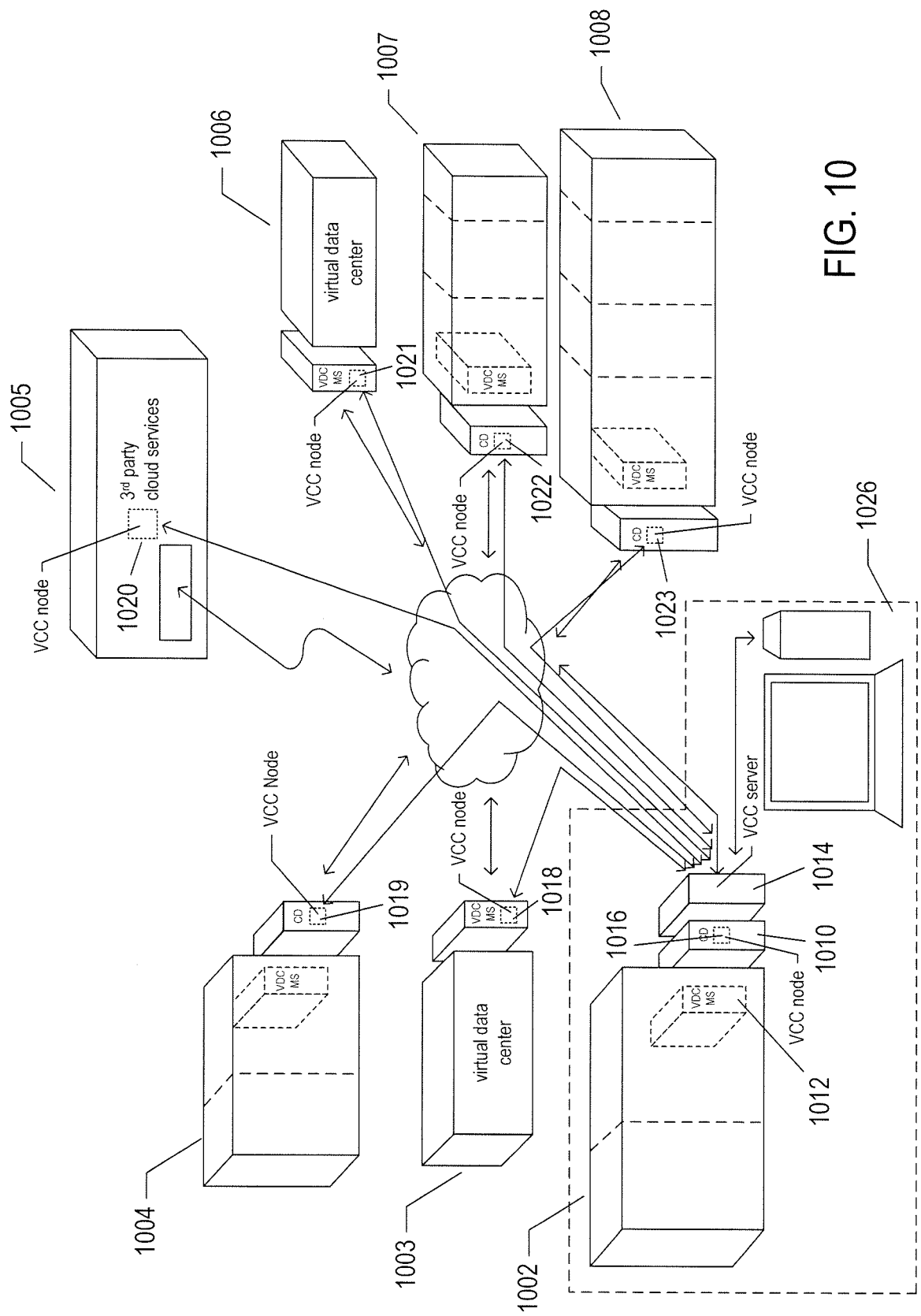
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11A:
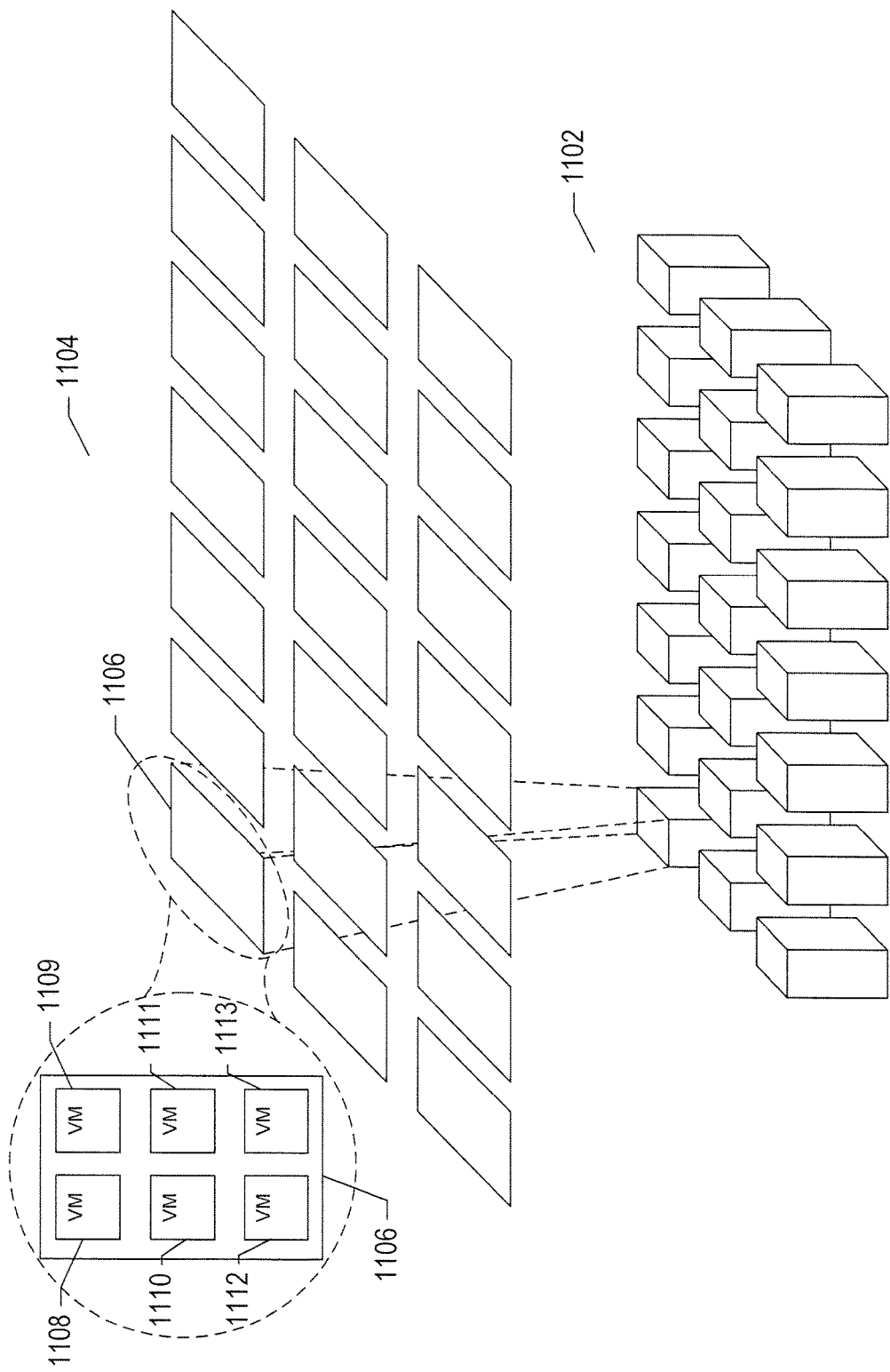
FIGS. 11A-C provide a high-level view of the distributed-computing environment in which the current disclosed methods and systems discover currently executing distributed applications.
Figure 11B:
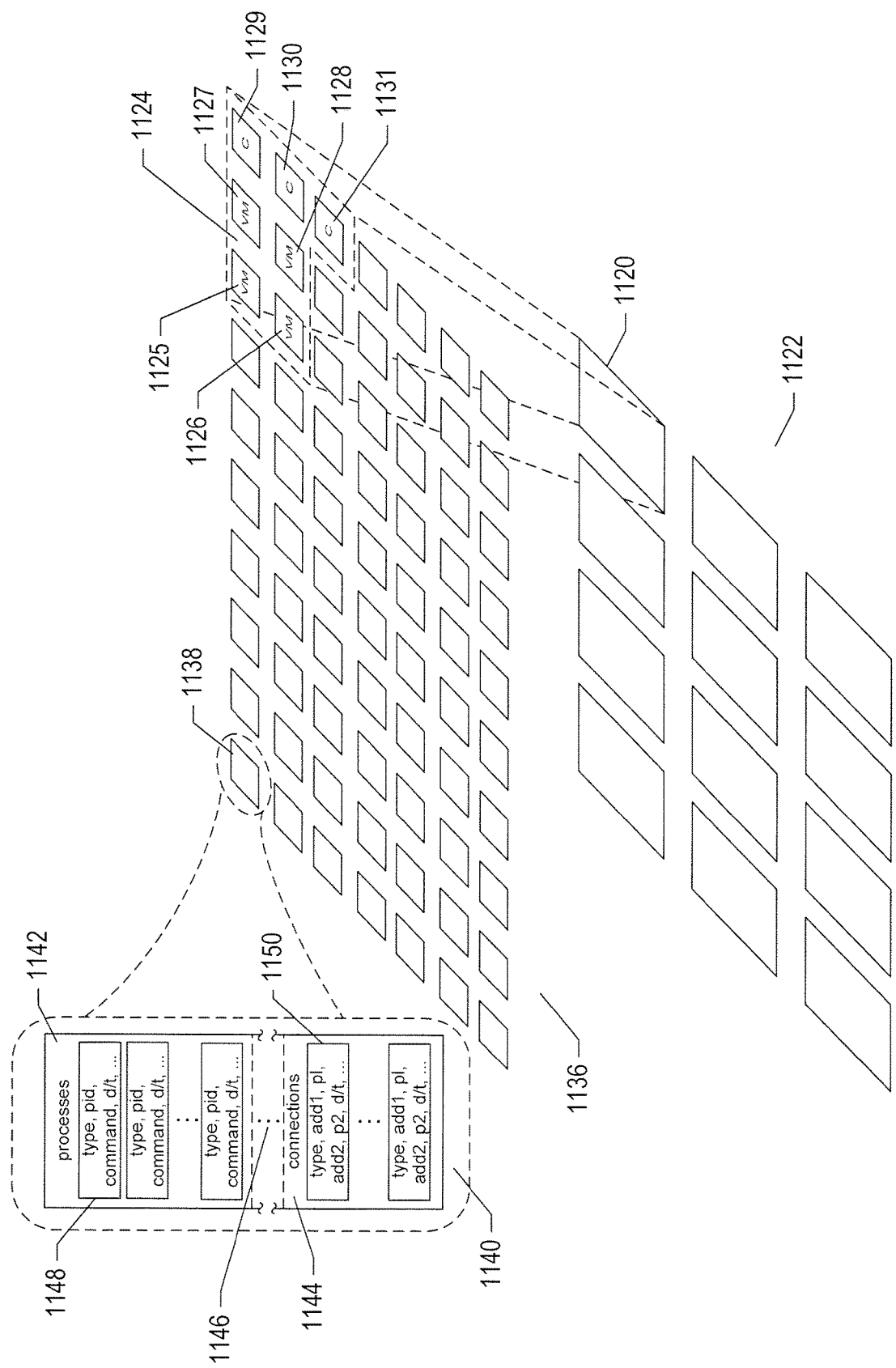
Figure 11C:
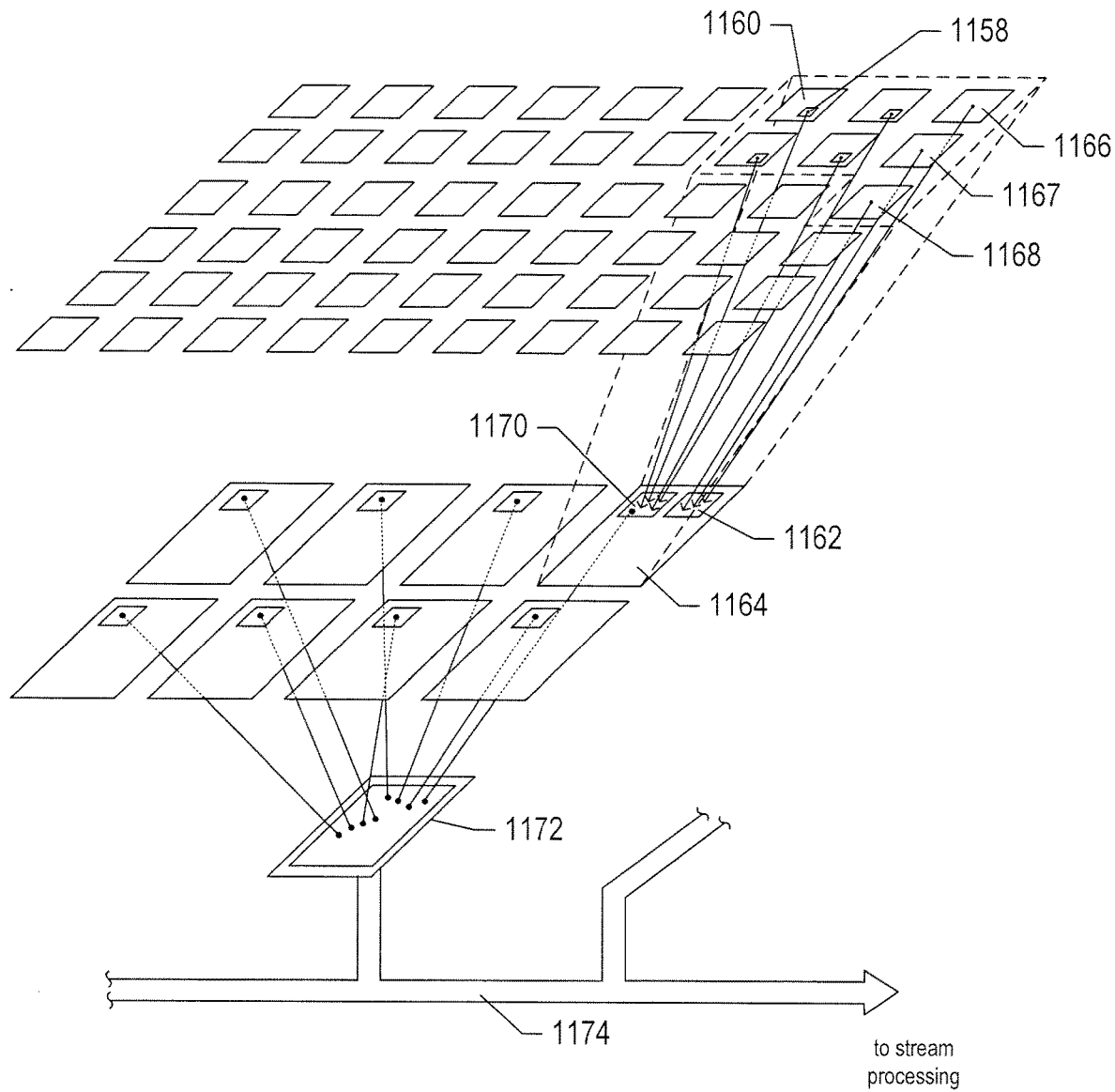

Methods and Systems that Identify Computational-Resource Components of Distributed Application Programs within Cloud-Computing Facilities FIGS. 11A-C provide a high-level view of the distributed-computing environment in which the current disclosed methods and systems discover currently executing distributed applications. As shown in FIG. 11A, a cloud-computing facility, or other distributed application-execution environment, is represented as a set of server computers 1102. The server computers may be physical server computers or virtual server computers provided by a virtual data-center, as discussed in the previous subsection. The server computers may be located within a single physical computing facility or may be distributed across multiple physical computing facilities. Each server computer can be represented as a set of virtual machines that execute within a virtual-machine-execution environment provided by a virtualization layer within the server computer. In FIG. 11A, the server computers 1102 are thus represented by sets of virtual machines 1104. Each set of virtual machines, such as virtual-machine set 1106, includes one or more virtual machines 1108-1113. As shown in FIG. 11B, each server, such as server 1120, in the set of servers 1122 that represent a cloud-computing facility or other distributed-application-execution environment can be thought of as comprising a number of application-execution environments 1124 including virtual machines 1125-1128 and/or containers 1129-1131. For simplicity, both virtual machines and containers, as well as other types of application-execution environments, are referred to as "nodes." Thus, the distributed-computing facility, abstracted as a set of servers 1122, as discussed above with reference to FIG. 11A, can be further abstracted as a set of application-execution-environment nodes 1136, the application-execution-environment nodes referred to simply as "nodes" in the discussion below. Each node, such as node 1138, can be represented by a data set, or data representation, 1140. The data representation of a node includes representations of the various processes currently running on the node 1142, a representation of the communications connections from the node to other nodes and to remote computational entities 1144, and additional information represented by ellipses 1146. Each process, such as process 1148, may be represented by a process identifier, the command line used to launch the process, and various descriptive types of data, including a process type, the time at which the process was launched, indications of the resources consumed by the process, and other types of information. Similarly, each connection, such as connection 1150, can be represented by source and destination network addresses and port numbers, a timestamp representing when the connection was established, an indication of the type of connection and protocol stack associated with the connection, and other such information. The additional information represented by ellipses 1146 may include a list of the current communications addresses associated with the node. Different implementations of the currently disclosed methods and systems may use different information sets selected from the data representation 1140 of each node for application discovery. In the implementation discussed below, the data representations of processes and connections, along with the network addresses associated with nodes, is used for application discovery, but different or additional information may be used in more complex implementations to facilitate precise application discovery.

FIG. 11C provides an overview of the architecture of the implementation of the currently disclosed system discussed below. An agent, such as agent 1158, is included in each virtual-machine node, such as virtual-machine node 1160, and a different type of agent 1162 is included in each server, such as server 1164, for collecting information about container nodes 1166-1168 executing within the server. These agents continuously or intermittently collect information about the nodes in which they are included or with which they communicate, and transmit or stream the collected information to a collector 1170 within each server that, in turn, streams the collected information to a streaming collector or application 1172 which streams the collected information to a pipeline of stream processors. The stream channel 1174 shown in FIG. 11C represents the fact that the agent-collected information may be streamed to the stream-processor pipeline from multiple discrete distributed-computing facilities or data centers. There are a variety of different types of commercially available information-collection, information-streaming, and information-processing systems that may be used for data collection, transmission of collected data to various information processors, and for information processing, including Kafka streams and the Kafka Ktable abstraction. In the following discussion, the information collected by the agents is represented as being sent in a stream of messages, although, depending on the type of streaming system used, different types of language are used to describe the process of collecting and streaming information to stream processors. For example, when using Kafka, it is common to describe the agents as publishing information to topics. There are, of course, many different ways to collect, transmit, and process information streams, and many of the commercially available systems provide a variety of useful services, including guaranteeing that information is received by data sinks, guaranteeing that information received by a data sink does not include duplicate information, automatic archiving of information so that streams can be replayed, and dynamically scaling system components to respond to different levels of information volumes. For purposes of discussing the currently disclosed methods and systems, it is sufficient to describe agents as periodically collecting information about the node in which they execute and transmitting the collected information to the stream-processor pipeline in messages.

Figure 12A:
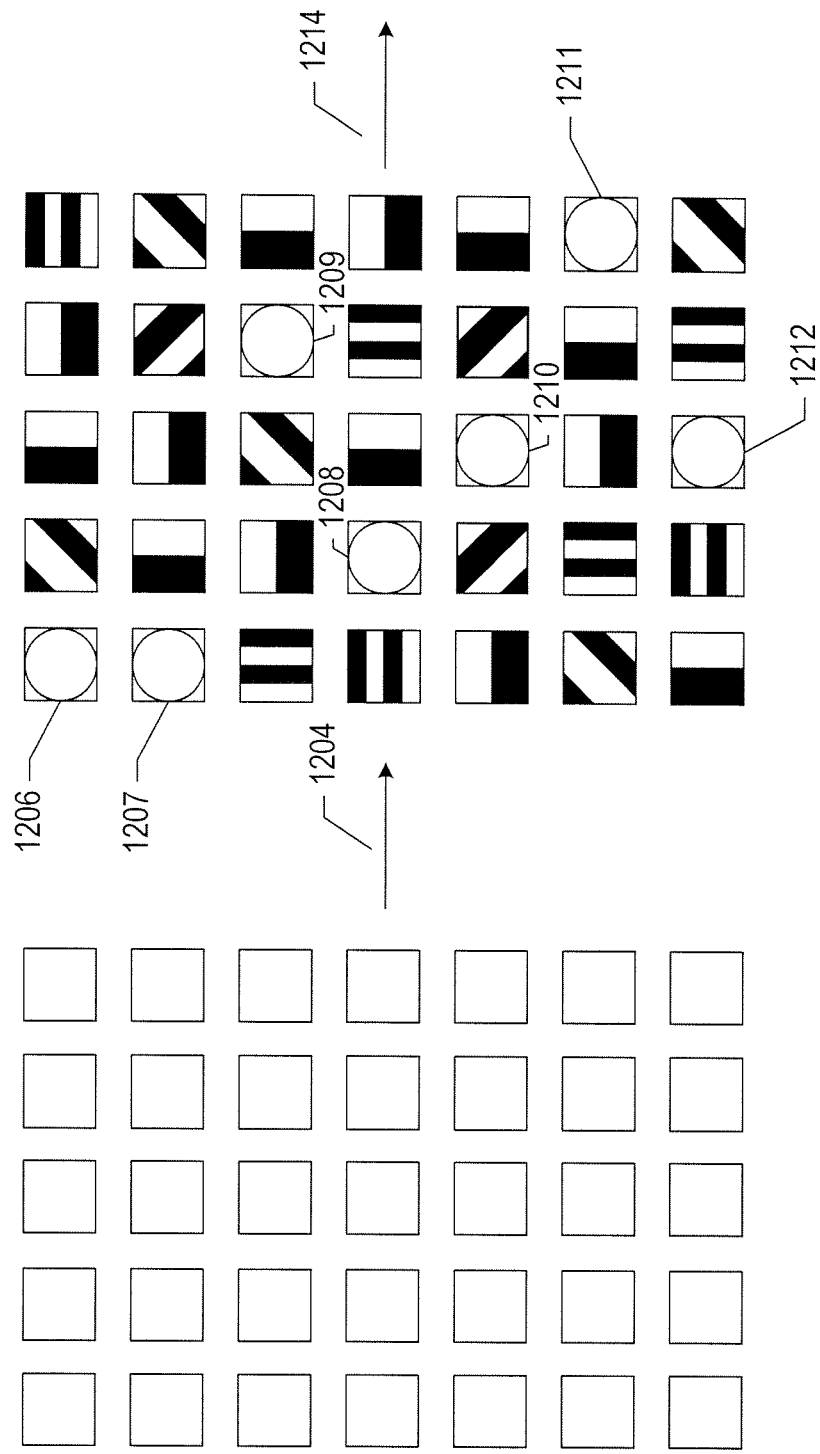
FIGS. 12A-B provide an overview of the currently disclosed application-discovery method.
Figure 12B:
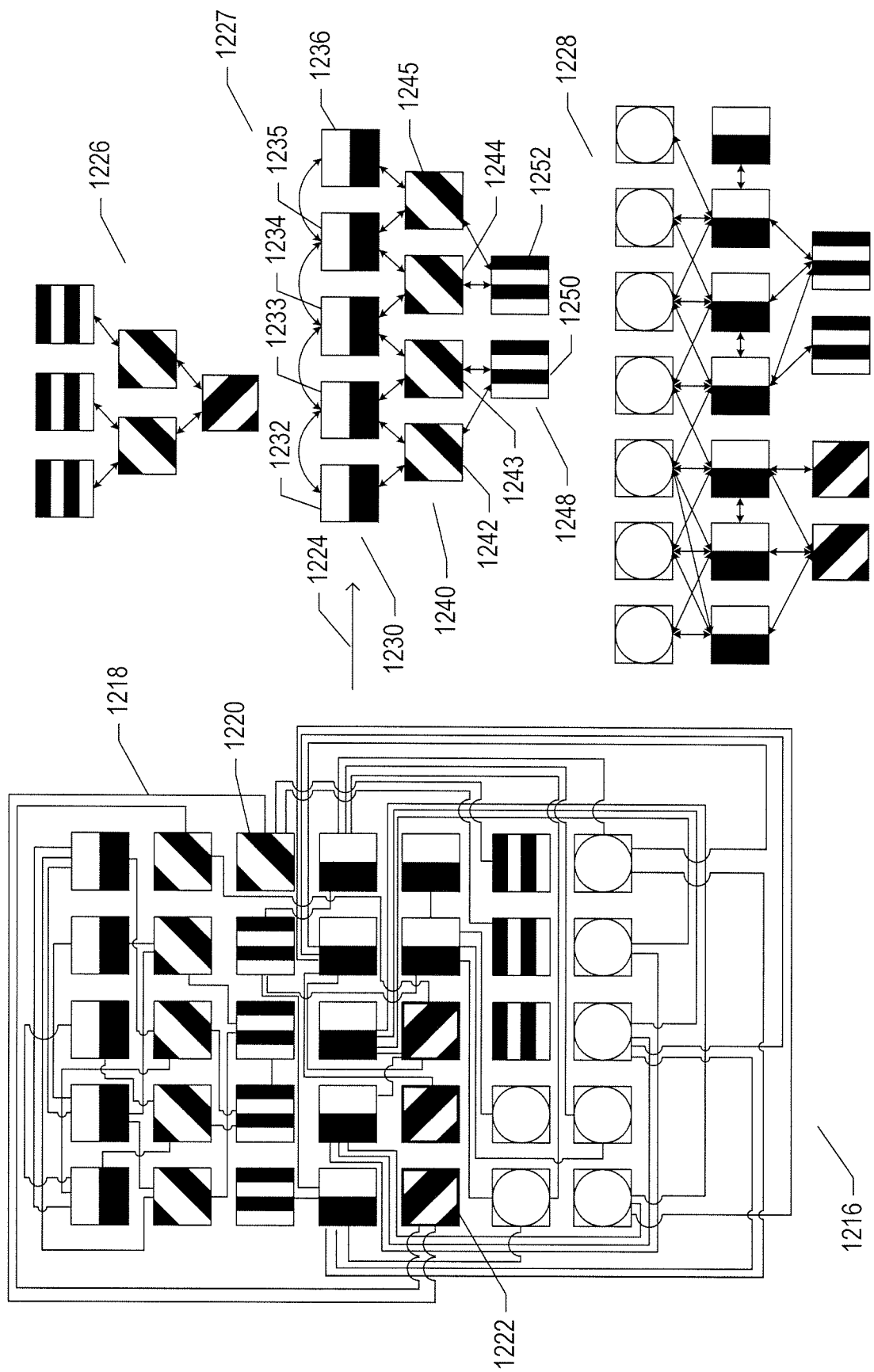

FIGS. 12A-B provide an overview of the currently disclosed application-discovery method. In FIG. 12A, the rectangular set of nodes 1202 on the right-hand side of the figure represent the nodes comprising a distributed-computing facility. In a first step, represented by arrow 1204, the information streamed from agents within the nodes is used to classify the types of the nodes or, in other words, to partition the nodes into node groups, each of which represents a different node type. In FIG. 12A, different graphical patterns are used to indicate different types of nodes. For example, one type of node is represented by a circle inscribed within the node, so that nodes 1206-1212 together constitute a group of nodes 1202 corresponding to a particular node type. In a next step, represented by arrow 1214 and the connected-node diagram 1216 in FIG. 12B, additional information streamed from agents within the nodes is used to determine communications connections between the nodes. Each connection is represented by a path, such as the path 1218 that connects nodes 1220 and 1222. In the connected-node diagram 1216, the nodes have been rearranged so that all of the nodes of each type are co-located. In a third step, represented by arrow 1224, the node-type assignments and the node-to-node connections are used to organize the nodes into discrete applications 1226-1228. Each application comprises groups of the one or more nodes, referred to as "tiers," with each tier including nodes of a common type. For example, in application 1227, the highest-level tier 1230 consists of the five nodes 1232-1236, all with a node type represented by a pattern of two differently shaded horizontal subsections. In application 1227, a second-highest-level tier 1240 includes the 4 nodes 1242-1245, and a lowest-level tier 1248 includes the two nodes 1250 and 1252. The partitioning of the nodes into applications is carried out using connection information. One underlying premise of the currently disclosed implementation is that the nodes that to gather comprise an application are directly or indirectly interconnected with one another through communications paths or connections, while the nodes of two different applications are not connected by communications paths. A second underlying premise of the currently disclosed implementation is that all of the nodes in each application tier have a common node type. The type of a node is determined from the command lines used to launch the processes executing within the node. A third underlying premise of the currently disclosed implementation is that nodes can be partitioned into groups of nodes with a common node type by grouping together those nodes that execute a common or similar set of processes. As is further discussed below, there are a variety of different computational methods that can be used for carrying out each of the four steps discussed above with reference to FIGS. 12A-B.

Figure 13:
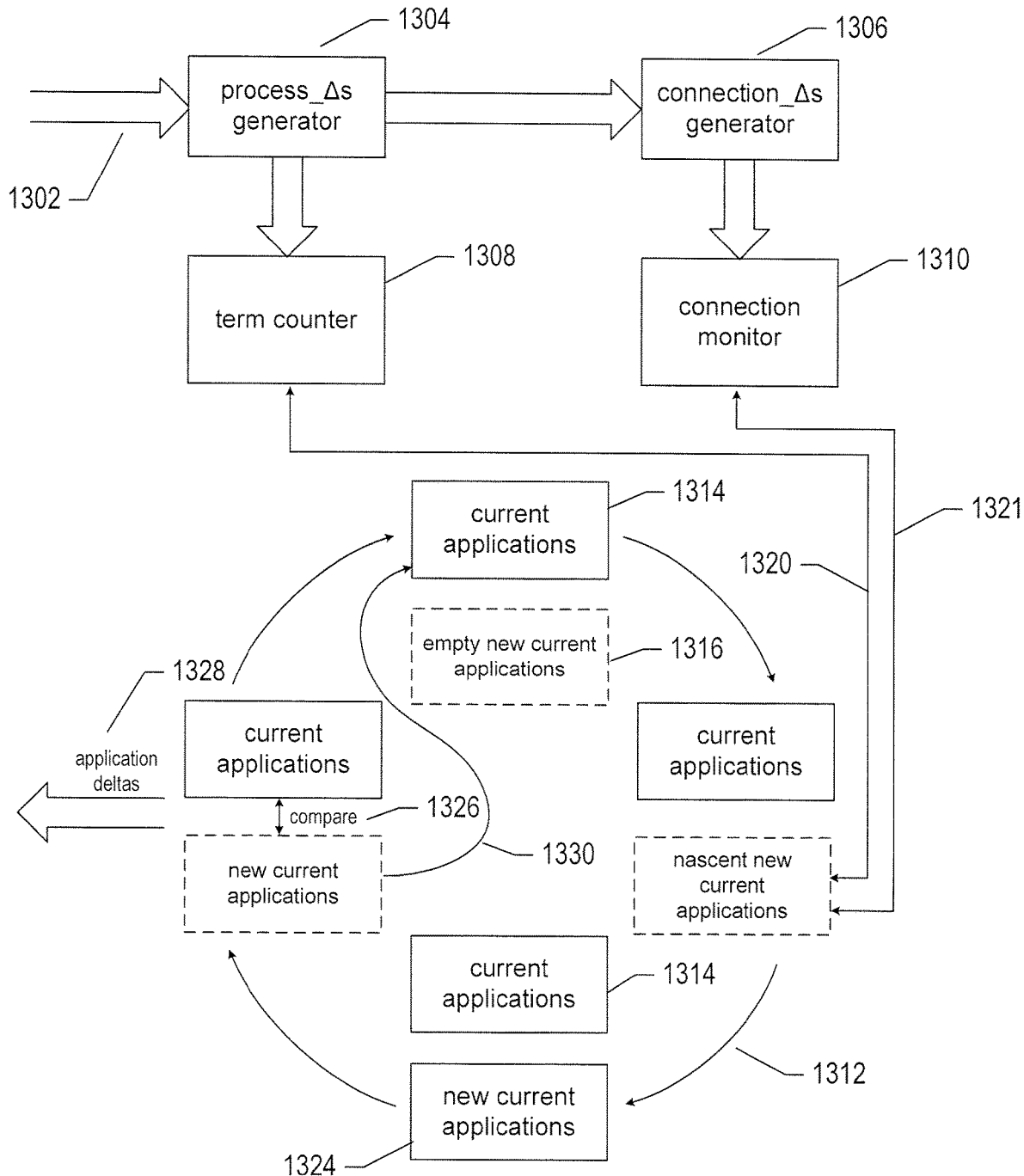
FIG. 13 illustrates the stream-processing components of the currently disclosed application-discovery system.

FIG. 13 illustrates the stream-processing components of the currently disclosed application-discovery system. It should be noted that each of the stream-processing components may be distributed among multiple processes executing on one or more physical computer systems. The raw data collected by agents within nodes is streamed, as represented by arrow 1302, to a process-Δs generator 1304. Because the agents continuously collect node-describing information from the nodes in which they execute, much of the collected information is redundant, since the agent-collection-and-reporting cycle is generally much shorter that the cycle of change for most types of node-related information. It is a primary task of the process-Δs generator 1304 and the connection-Δs generator 1306, discussed below, to remove much of the redundant information and emit only messages or information describing changes, or Δs, in the data representations of the nodes. The process-Δs generator 1304 extracts process information from the raw data and generates Δs that represent the changes in the set of processes executing within nodes. The process-Δs generator 1304 additionally extracts communications-address information from the raw data and updates stored information representing the communications addresses associated with each node. The process Δs are streamed to a term counter 1308, discussed below. The connection-Δs generator 1306 extracts communications-connection information from the raw data and emits connection Δs that represent changes in the communications connections between nodes to the connection monitor 1310, discussed below. For purposes of discussion, it is assumed that the process-Δs generator emits one or more process-Δs messages in response to receiving a message from a node-embedded agent only when the set of processes executing within the node has changed during the most recent agent-collection-in-reporting cycle. Similarly, it is assumed that the connection-Δs generator emits one or more connection-Δs messages in response to receiving a message from a node-embedded agent only when the set of communications connections associated with the node has changed during the most recent agent-collection-in-reporting cycle.

In order to generate process Δs and connection Δs, the process-Δs generator 1304 and the connection-Δs generator 1306 maintain persistent information that represents the sets of processes and the sets of communications connections associated with each node. In one implementation, the process-Δs generator 1304, connection-Δs generator 1306, term counter 1308, and connection monitor 1310 are Kafka stream processors and maintain the persistent information in Kafka Ktables.

The term counter 1308 maintains a count of the relevant terms included in the command lines used to launch the processes currently executing in each node. These counts are used as the basis for partitioning nodes into groups of nodes with common types. The connection monitor maintains a set of node-to-node communications connections which represent the communications links or paths between nodes. This information is used by an application monitor 1312, represented by the cycle of steps in the lower portion of FIG. 13. Each execution of the cycle by the application monitor generates a set of application Δs that represents changes in the discovered set of applications within the distributed-computing facility. These application Δs are persistently stored by the currently disclosed system and may also be streamed or transmitted to application-Δs sinks, such as distributed-application administration-and-management tools, which separately maintain data representations of all the applications currently executing within a cloud-computing facility or other application-execution environment.

The application monitor maintains a data representation of the currently executing applications 1314 and, during each cycle, generates a new data representation of the currently executing applications 1316. Initially, the new data representation 1316 is empty, as indicated by the current-applications/new-current-applications pair 1314 and 1316 at the top of the cycle. In a first step, the process and connection information maintained by the term counter and connection monitor is used to generate a new data representation of the applications executing within the distributed-computing facility, with access to the information represented by double-headed arrows 1320 and 1321. The new data representation is then stored so that the application monitor has a current-applications data representation 1314 and a new-current-applications data representation 1324, as shown at the bottom of the cycle in FIG. 13. The current-applications data representation represents the currently executing applications in the distributed-computing facility as determined during the previous application-monitor cycle and the new-current-applications data representation 1324 represents a currently executing applications in the distributed-computing facility as determined during the current application-monitor cycle. In general, these two data representations should be quite similar, since the application-monitor cycle is far shorter than most application-related data-change cycles. By comparing 1326 the current-applications data representation to the new-current-applications data representation, in a third step of the cycle, the application monitor is able to emit a set of application Δs 1328 that allows application-Δs sinks to maintain data representations of the currently executing applications within the distributed-computing facility. In a final step of the application-monitoring cycle, the current-applications data representation is replaced by the new-current-applications data representation, as represented by curved arrow 1330, and the new-current-applications data representation is reinitialized, or cleared.

As mentioned above, various different implementations of the currently disclosed methods and systems may use a variety of different commercial stream processors to stream data and store processed data. For purposes of the current discussion, the data stored by the various components of the currently disclosed system is represented by relational-database tables, but any of a large variety of different types of data-storage functionalities can be used in any particular implementation of the currently disclosed system. Furthermore, the commercial stream processors often provide facilities that automatically update stored information maintained by stream processors, rather than requiring stream processors to update the stored data using database or database-like operations.

Figure 14A:
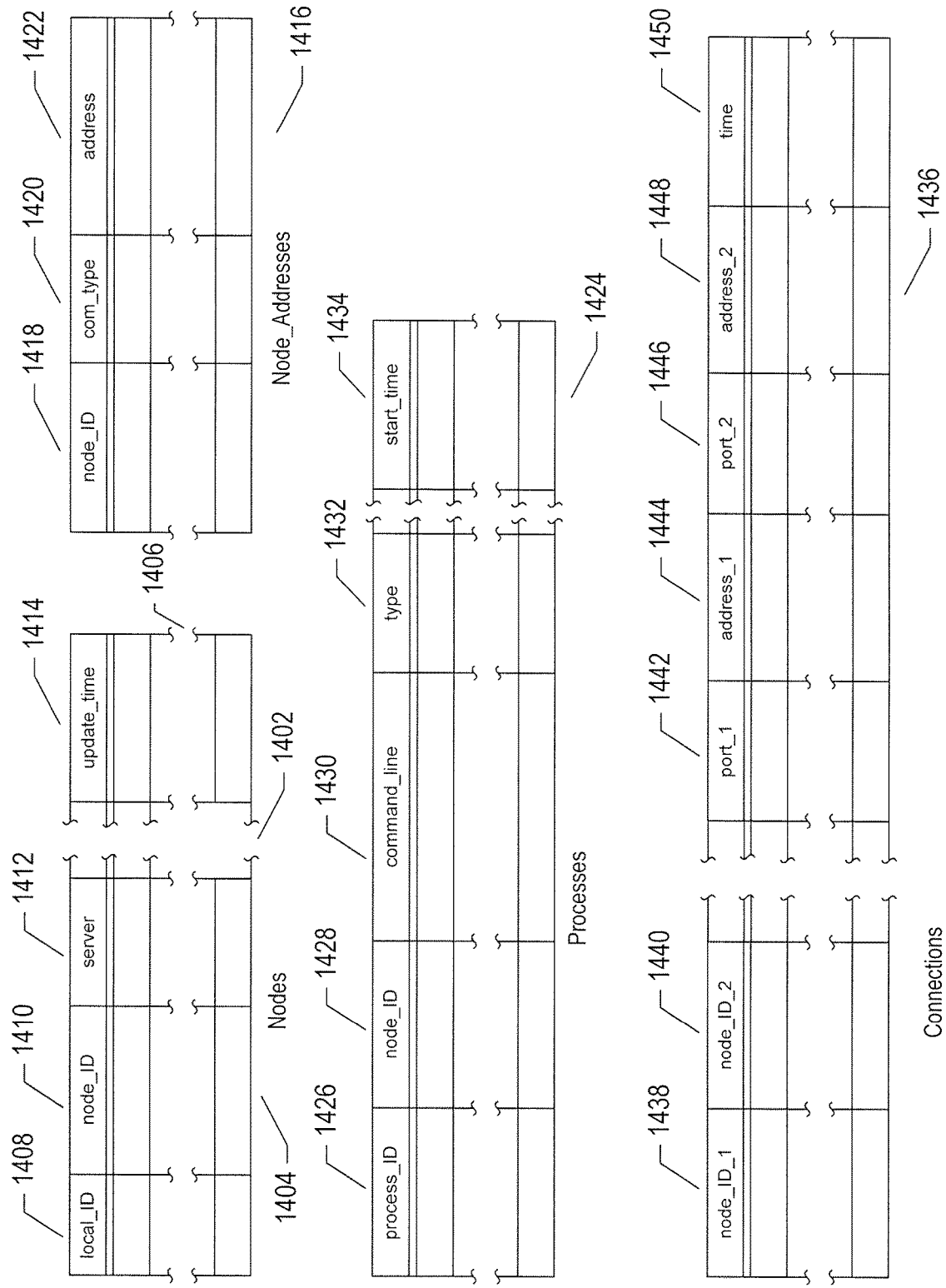
FIGS. 14A-B illustrate various tables used by the components of the currently disclosed system discussed above with reference to FIG. 13.
Figure 14B:
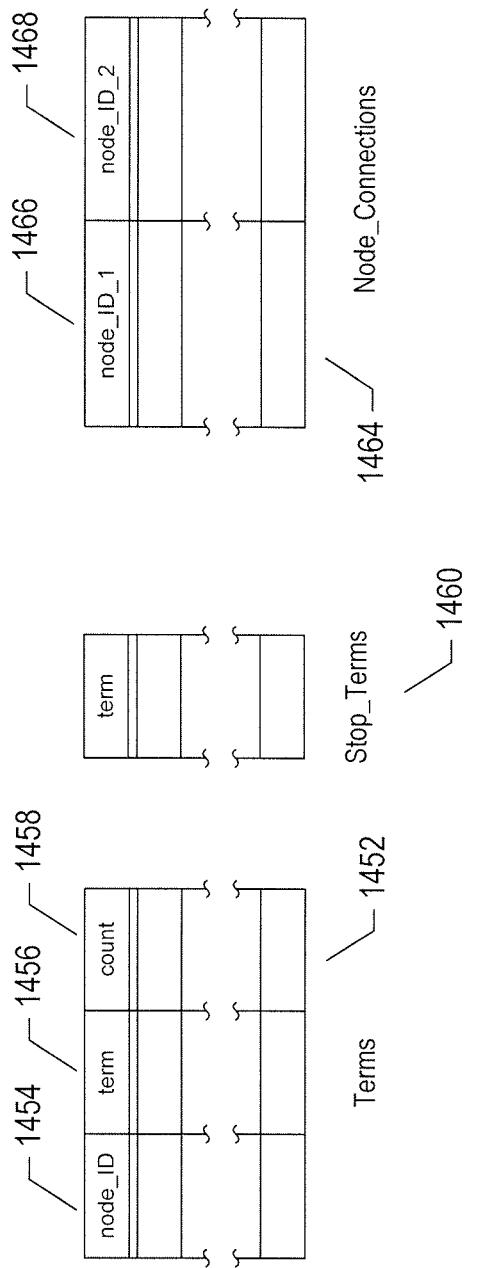

FIGS. 14A-B illustrate various tables used by the components of the currently disclosed system discussed above with reference to FIG. 13. FIG. 14A shows the tables used by the process-Δs generator 1304 and the connection-Δs generator. In most cases, a vertical broken-line column, such as vertical broken-line column 1402 in the table Nodes 1404, represents the fact that additional columns may be included in various different implementations. Similarly, a horizontal broken-line column, such as horizontal broken-line column 1406 in the table Nodes 1404, represents the fact that additional rows may be included in the table. Each row in the table Nodes 1404 represents a node in the distributed-computing facility. The columns of the table Nodes 1404, which correspond to fields within the records represented by rows, include: (1) local_ID 1408, a local identifier for the node; (2) node_ID 1410, a global identifier for the node is assigned to the node by the currently disclosed system; (3) server 1412, an identifier or description of the server in which the node executes; and (4) update_time 1414, the last point in time that an information message from the agent embedded in the node was received by the currently disclosed system. Each row in the table Node_Addresses 1416 represents a communications address within a node in the distributed-computing facility. The columns of the table Node_Addresses 1416 include: (1) node_ID 1418, the global identifier for the node; (2) com_type 1420, an indication of the type of communications address; and (3) address 1422, a numeric or alphanumeric representation of the communications address. Each row in the table Processes 1424 represents a process executing within a node in the distributed-computing facility. The columns of the table Processes 1424 include: (1) process_ID 1426, an identifier for the process; (2) node_ID 1428, the global identifier for the node; (3) command line 1430, the command line used to launch the process; (4) type 1432, an indication of the type of process; and (5) start_time 1434, the time when the process was launched. Each row in the table Connections 1436 represents a node-to-node communications connection. The columns of the table Connections 1436 include: (1) node_ID_1 1438, a global identifier for a first node; (2) node_ID_2 1440, the global identifier for a second node; (3) port_1 1442, the communications port on the first node; (4) address_1 1444, the communications address on the first node; (5) port_2 1446, the communications port on the second node; (6) address_2 1448, the communications address on the second node; and (7) time 1450, the time when the communications connection is established.

FIG. 14B shows the tables used by the term counter 1308 and the connection monitor 1310. Each row in the table Terms 1452 represents the count of the occurrences of a particular term in the command lines for the processes currently executing on the node. The columns of the table Terms 1452 include: (1) node_ID 1454, a global identifier for the node; (2) term 1456, a term used in the command line used to launch 1 of the processes currently executing on the node; and (3) count 1458, the number of occurrences of the term in the command lines used to launch the processes currently executing on the node. Each row in the table Stop_Terms 1460 represents a term that is to be ignored when it occurs in a command line used to launch a process. Each row in the table Node_Connections 1464 represents a node-to-node connection. The columns of the table Node_Connections 1464 include: (1) node_ID_1 1466, a global identifier for the first node of the connection; and (2) node_ID_2 1468, the global identifier for the second node of the connection.

Figure 15:
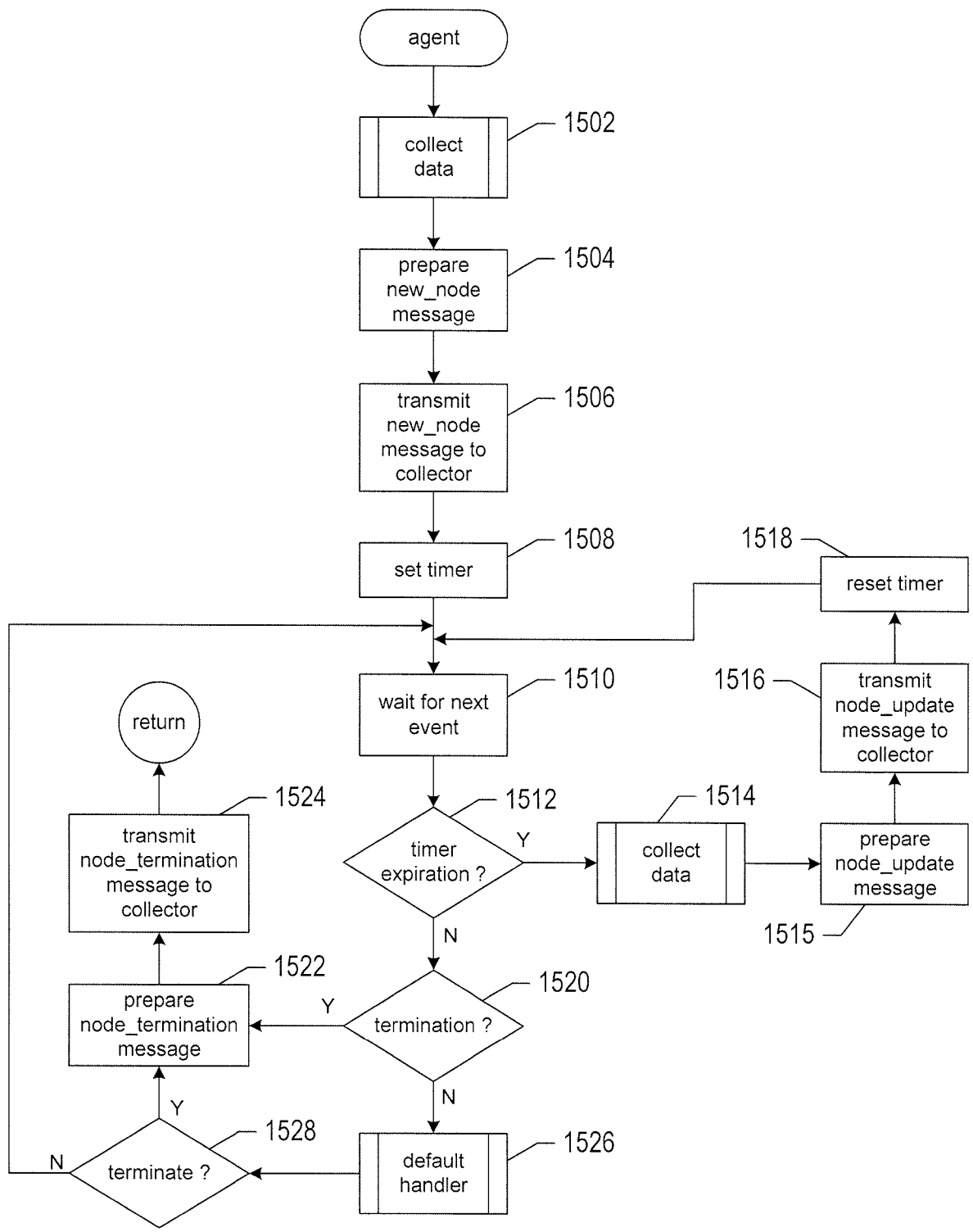
FIG. 15 provides a control-flow diagram that illustrates implementation of an agent embedded within a node.

FIG. 15 provides a control-flow diagram that illustrates implementation of an agent embedded within a node. These four initial steps 1502, 1504, 1506, and 1508 are executed when the agent is launched. In step 1502, the agent collects node-related data using various available tools and functions provided by the virtualization layer within the server that executes the node or by various remote virtualization-related facilities. In step 1504, the agent prepares a new_node message and then, in step 1506, transmits the new_node message to the local collector. In step 1508, the agent sets a timer. Then, in step 1510, the agent waits for a next event to occur. When the next event is a timer-expiration event, as determined in step 1512, and agent collects data and sends the collected data in a node_update message to the collector, in steps 1514-1516, and then resets the timer, in step 1518. Otherwise, when the event is a node-termination event, as determined in step 1520, the agent prepares a node_termination message, in step 1522, and sends the node_termination message to the collector, in step 1524. A default handler 1526 handles any rare or unexpected events, after which the agent may terminate or may continue to wait for a next event, as determined in step 1528.

Figure 16A:
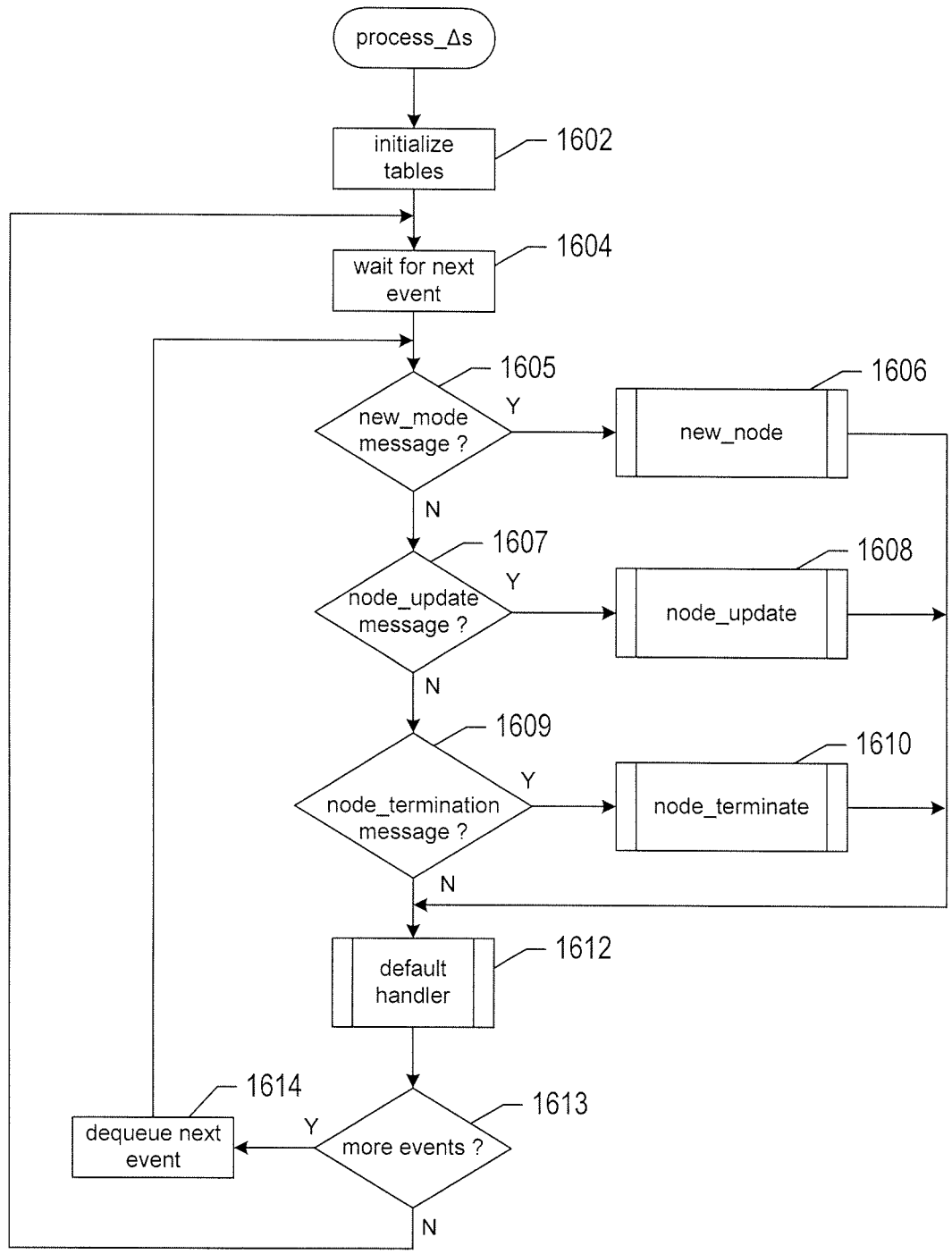
FIGS. 16A-E provide control-flow diagrams that illustrate implementation of the process-$\Delta$s generator (1304 in FIG. 13).

FIGS. 16A-E provide control-flow diagrams that illustrate one implementation of the process-Δs generator (1304 in FIG. 13). FIG. 16A illustrates the event-handling-loop implementation of the process-Δs generator. In step 1602, the various tables maintained by the process-Δs generator are initialized. Then, in step 1604, the process-Δs generator waits for a next event to occur. When the next occurring event is a new_node message, as determined in step 1605, the handler new_node is called, in step 1606. When the next occurring event is a node_update message, as determined in step 1607, the handler node_update is called, in step 1608. When the next event is a node_termination message, as determined in step 1609, the handler node_terminate is called, in step 1610. A default handler 1612 handles any unexpected or rare events. When there are more events that have occurred during processing of the most recently handled event, as determined in step 1613, a next event is dequeued from an event queue, in step 1614, and control returns to step 1605. Otherwise, control returns to step 1604.

Figure 16B:
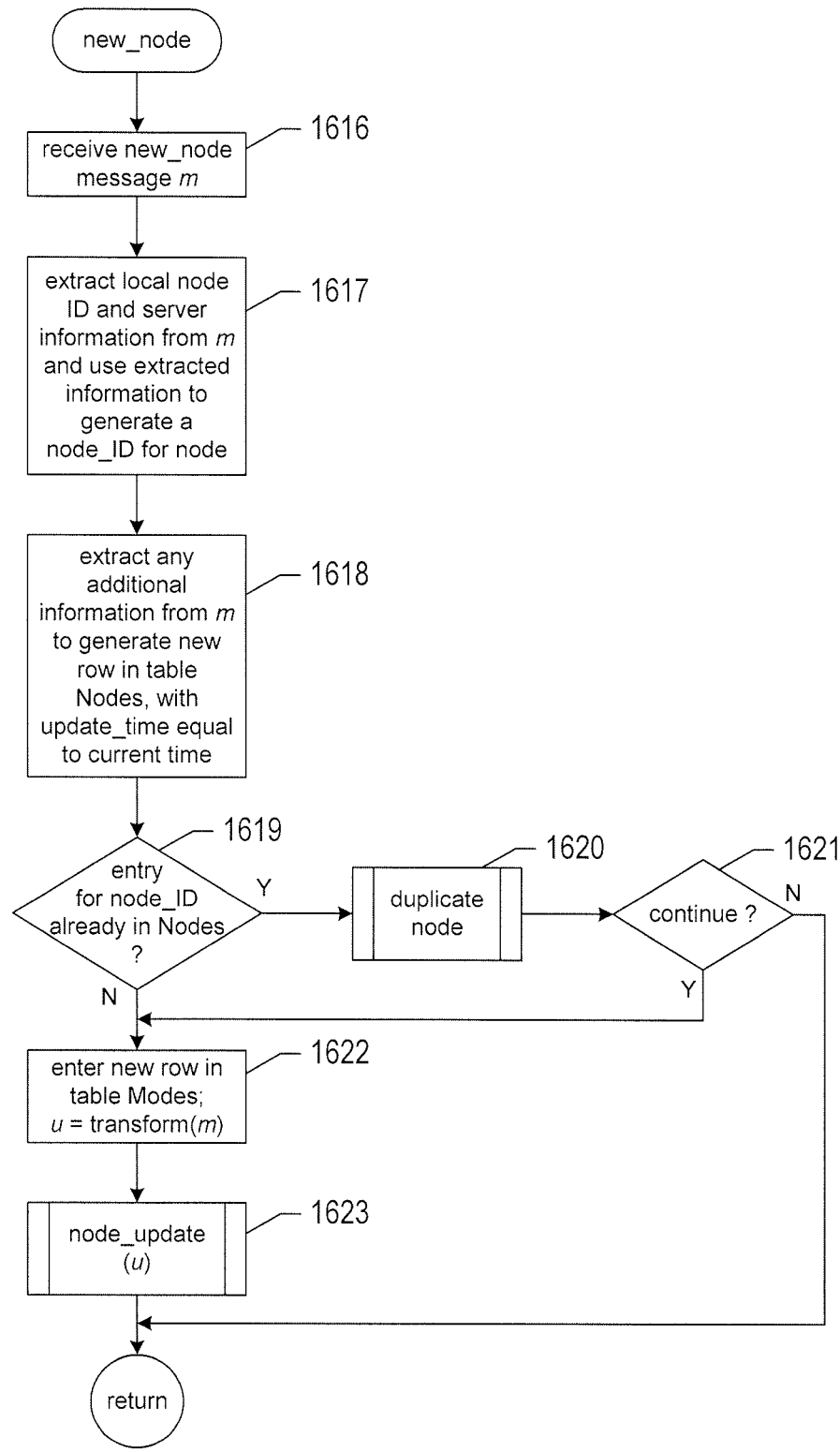

FIG. 16B provides a control-flow diagram for the handler new_node, called in step 1606 of FIG. 16A. In step 1616, a new_node message m received. In step 1617, a local node identifier and server information is extracted from the message m and used to generate a global node_ID for the node. The generation of a global node_ID for the node for which a message is received by an event-handling loop or event handler is common to many event-processing handlers in the process-Δs-generator implementation and the connection-Δs-generator implementation. In alternative implementations, global node_IDs may be assigned to agents, so that either agent-generated messages include a global node_ID or so that node_IDs can be automatically associated with agent-generated messages based on the source addresses of the agent messages. In step 1618, additional information is extracted from the message m to generate a new row for the table Nodes. When the table Nodes already contains a row identical to the newly generated row, as determined in step 1619, an error handler "duplicate node" is called, in step 1620, to handle this problem. In certain cases following the call to the error handler "duplicate node," as determined in step 1621, processing continues at step 1622 while, in other cases, processing terminates. In step 1622, the new row is entered into the table Nodes and the message m is transformed to an update_message u, which is forwarded to the node_update handler, in step 1623.

Figure 16C:
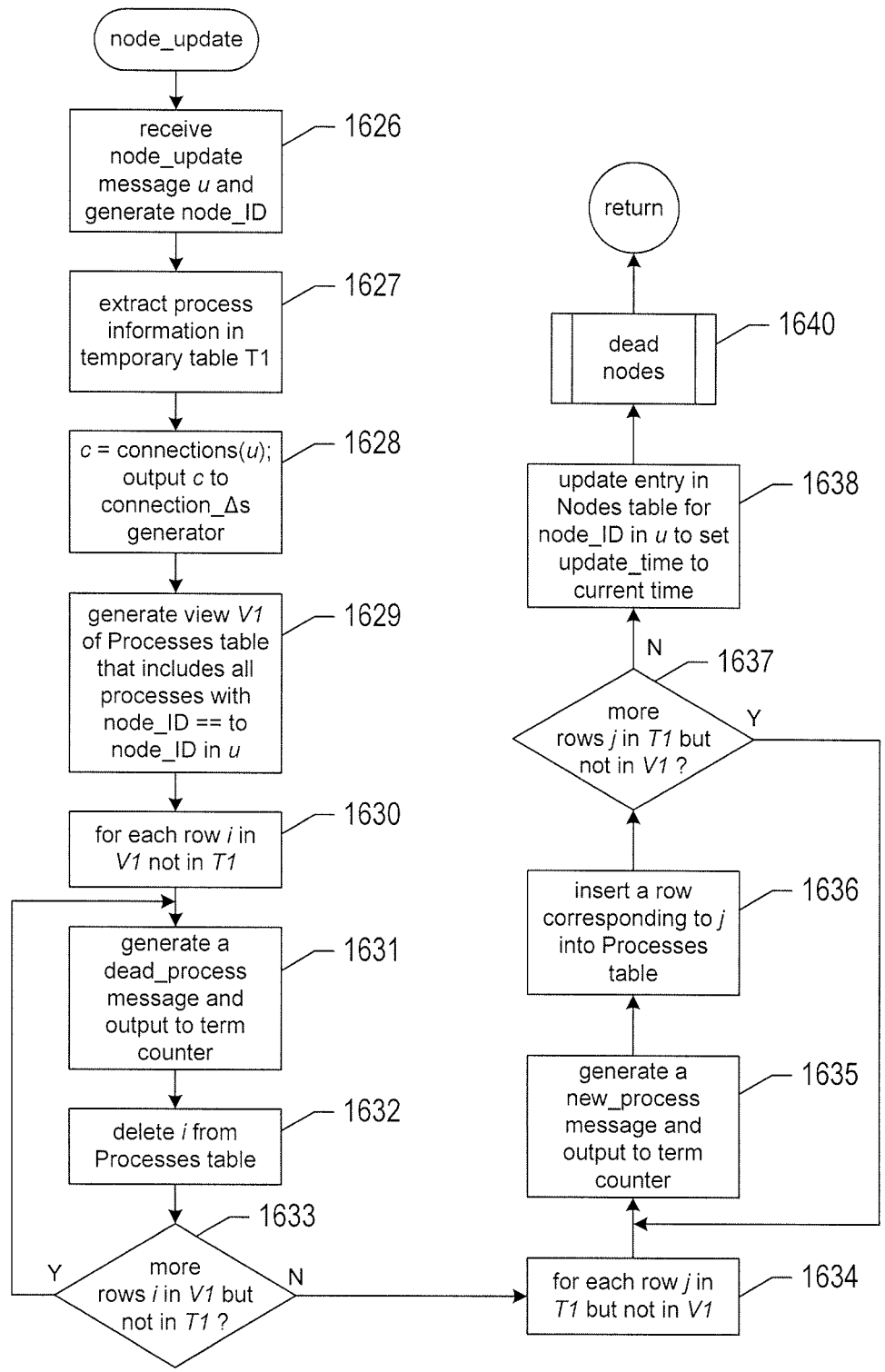

FIG. 16C provides a control-flow diagram for the handler node_update, called in step 1608 of FIG. 16A and in step 1623 of FIG. 16B. In step 1626, a node_update message u is received and a global node_ID is generated. In step 1627, process information included in the message u is extracted and stored in a temporary table T1. In step 1628, a connections message c is generated from information in the update message u and forwarded to the connection-Δs generator, for additional downstream processing. In step 1629, the handler node_update generates a view V1 of the Processes table that includes all the processes for the node identified by the generated node_ID. In the for-loop of steps 1630-1633, each row i in the view of the one that is not in the table T1 is processed. These rows represent formerly executing processes in the node that are no longer executing. Thus, for each such no-longer-executing process, a dead_process message is generated and output to the term counter, in step 1631, and the row i is deleted from the Processes table. Similarly, in the for-loop of steps 1634-1637, each row j in the table T1 that is not in the view V1 is processed. These rows represent new processes that were not previously executing. Thus, a new_process message is generated for each such row and output to the term counter, in step 1635, and the row j is inserted into the Processes table, in step 1636. In step 1638, the field update_time in the entry corresponding to the node_ID is set to the current system time. Finally, in step 1640, a routine "dead nodes" is called to detect any nodes that are no longer streaming agent-collected information.

Figure 16D:
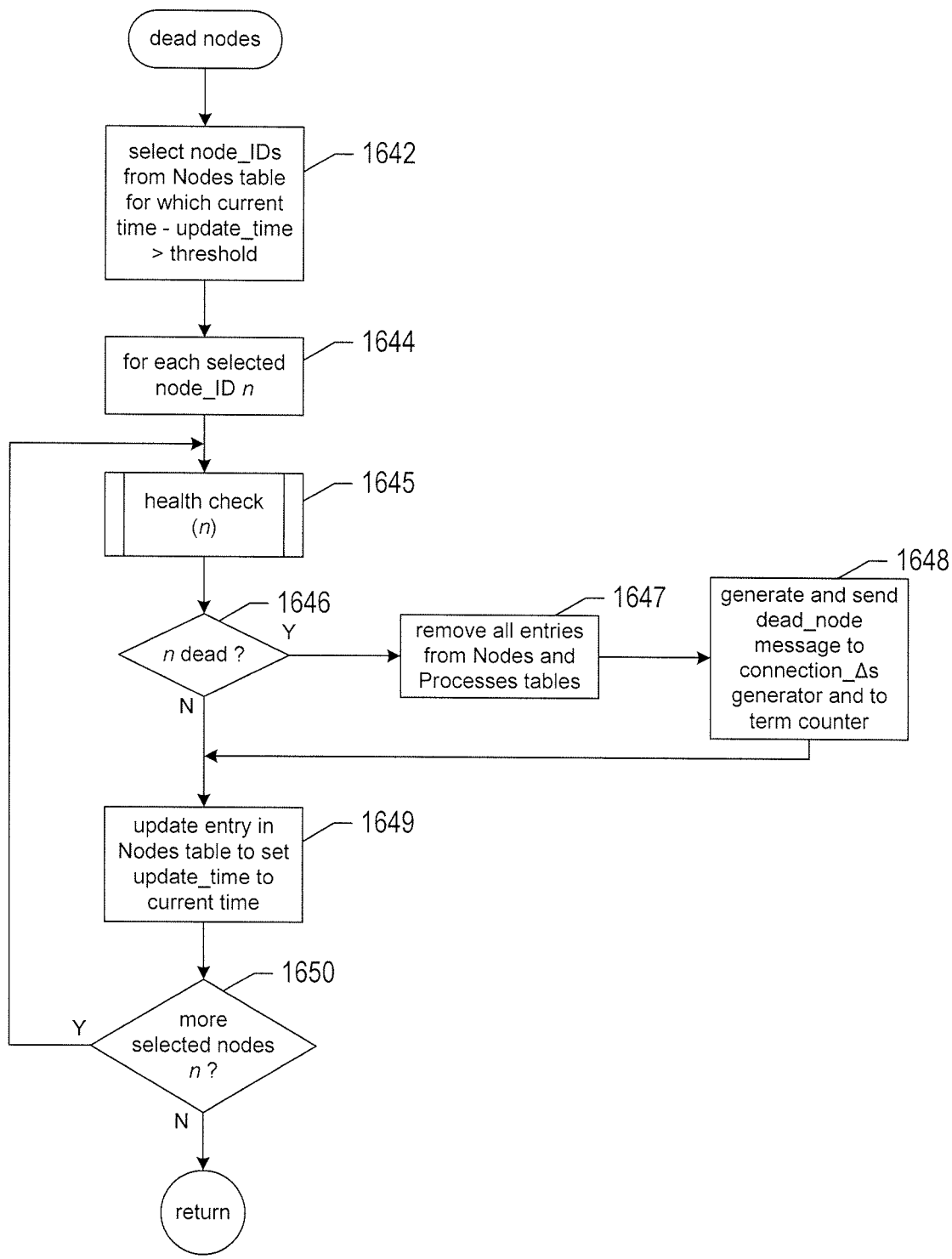

FIG. 16D provides a control-flow diagram for the routine "dead nodes," called in step 1640 of FIG. 16C. Step 1642, rows are selected from the Nodes table that contain values in the update_time field indicating that no information has been received from the node for more than a threshold period of time. Each of these rows is processed in the for-loop of steps 1644-1650. In step 1645, a health check is run to determine whether or not the node referenced by the node_ID field of the row is still operating. When the node is dead, as determined in step 1646, all rows corresponding to the node are removed from the tables Nodes and Processes and, in step 1648, a dead_node message is generated and forwarded to the connection-Δs generator and the term counter. Otherwise, in step 1649, the update_time field in the currently considered row is updated to reflect the current system time.

Figure 16E:
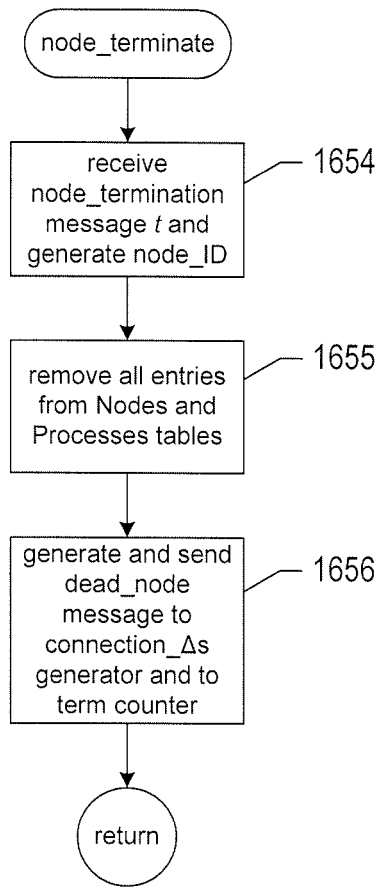

FIG. 16E provides a control-flow diagram for the handler node_terminate, called in step 1610 of FIG. 16A. In step 1654, a node_termination message is received and a node_ID is generated from information contained in that message. In step 1655, all entries for the node are removed from the Nodes and Processes tables. In step 1656, a dead_node message is generated for the node and sent to the term counter and to the connection-Δs generator.

Figure 17A:
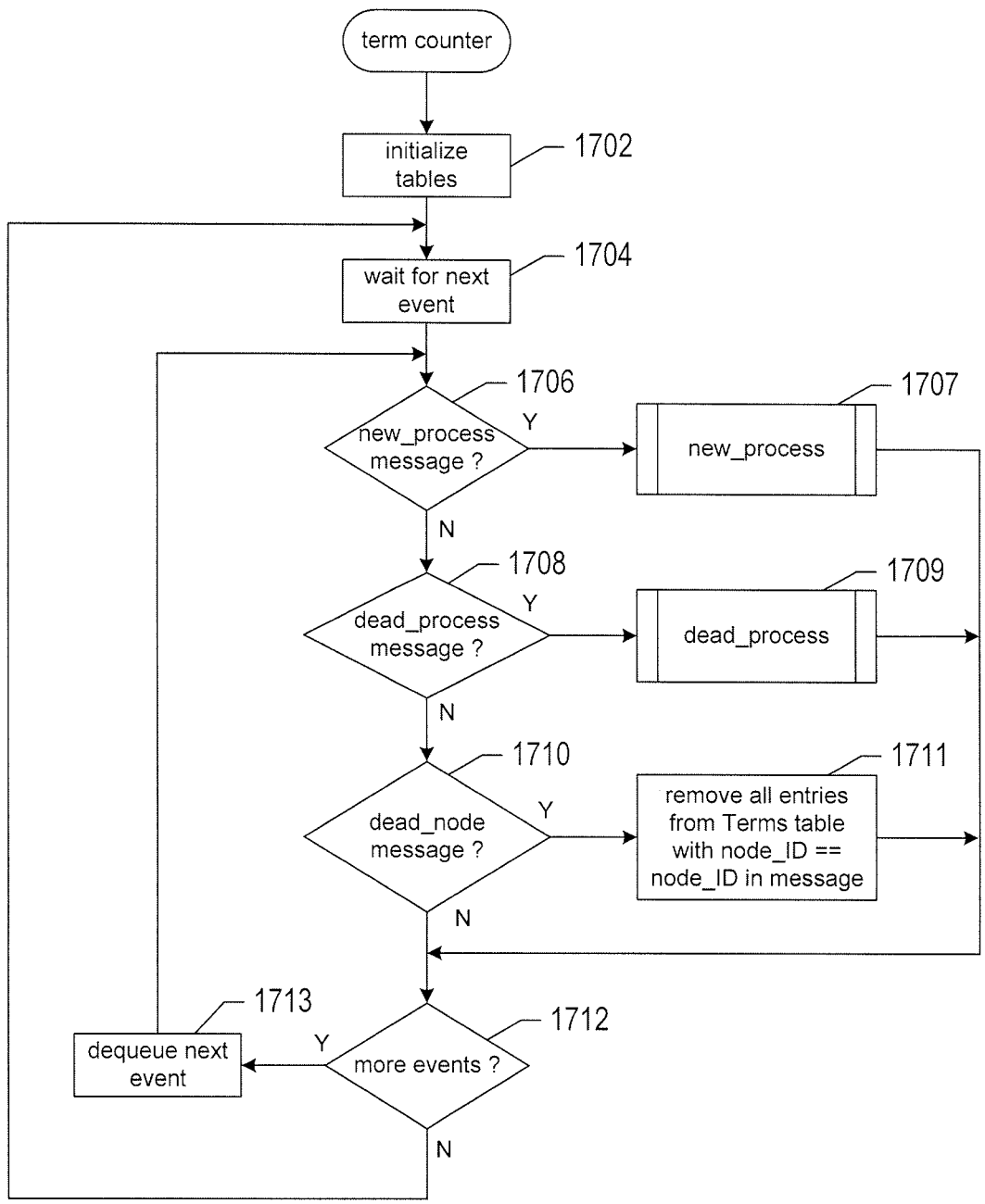
FIGS. 17A-C provide control-flow diagrams that illustrate an implementation of the term counter (1308 in FIG. 13).
Figure 17B:
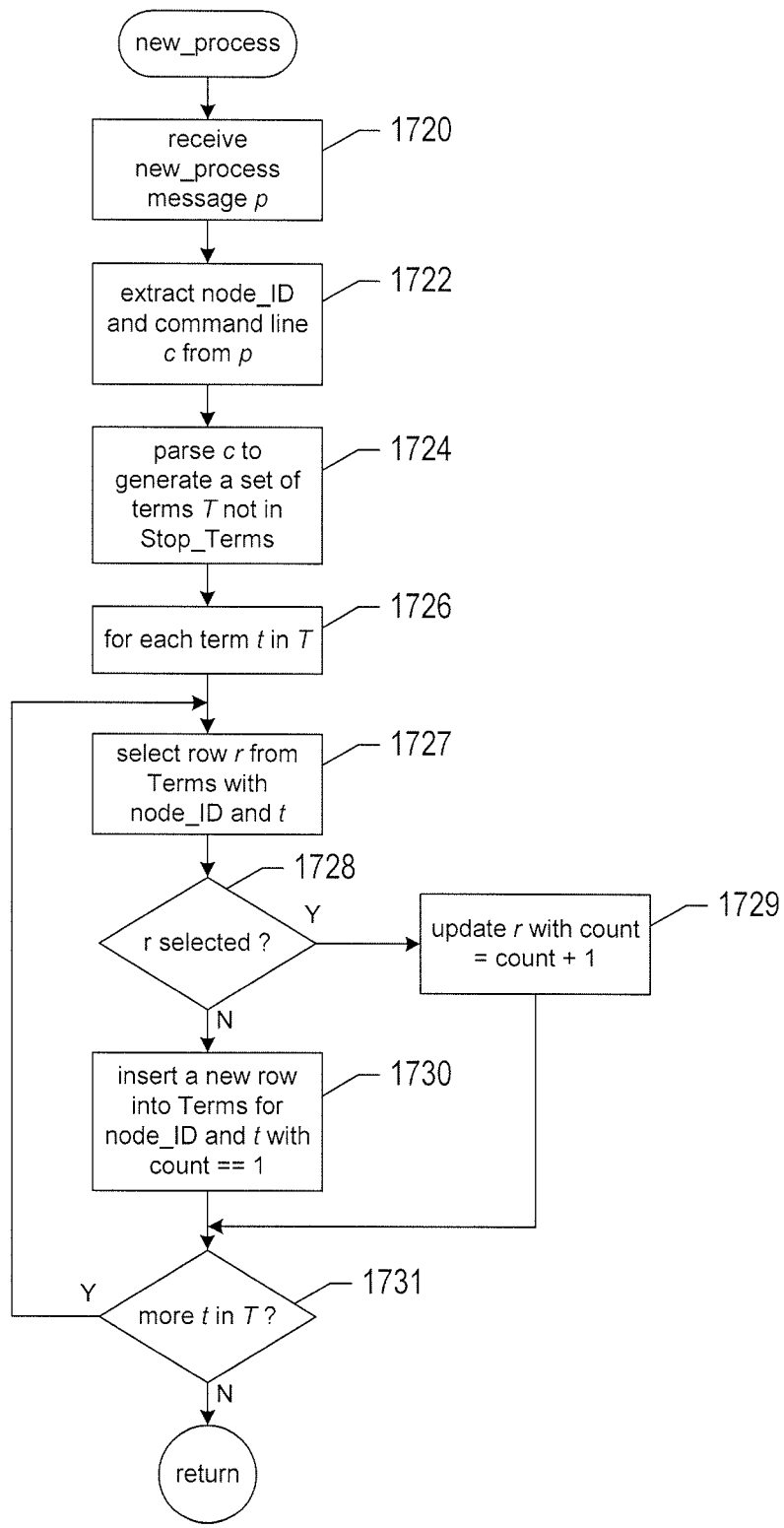
Figure 17C:
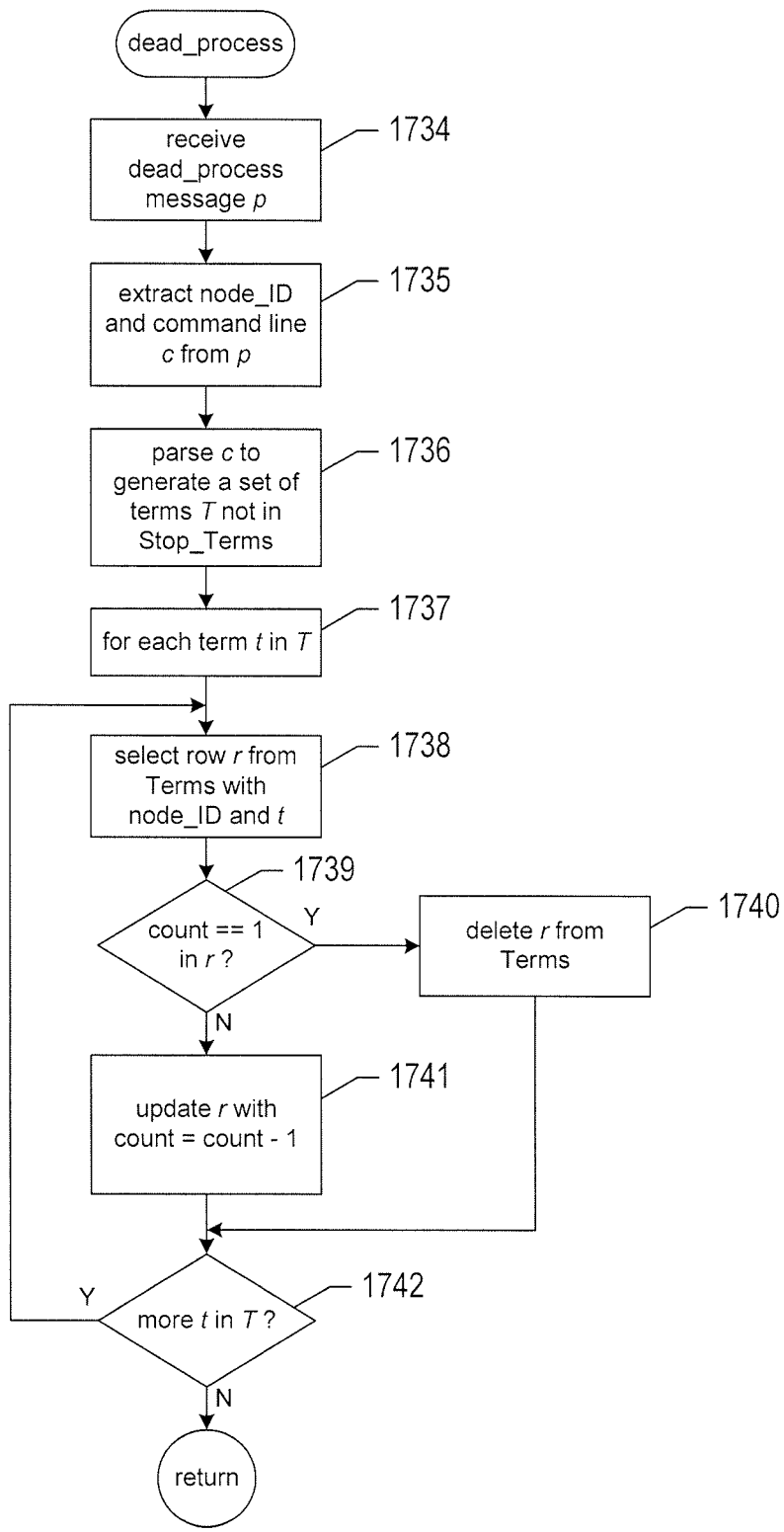

FIGS. 17A-C provide control-flow diagrams that illustrate an implementation of the term counter (1308 in FIG. 13). As shown in FIG. 17A, the term counter is implemented as an event loop. In step 1702, the term counter initializes the tables maintained and used by the term counter. Then, in step 1704, the term counter waits for a next event to occur. When the next-occurring event is a new_process message, as determined in step 1706, the handler new_process is called, in step 1707. When the next-occurring event is a dead_process message, as determined in step 1708, the handler dead_process is called, in step 1709. When the next-occurring process is a dead_node message, as determined in step 1710, the entries in the Terms table for the node referenced by a node_ID extracted from the dead_node message are removed, in step 1711, and when there are more events to handle, as determined in step 1712, a next event is dequeued from an event queue, in step 1713, and control returns to step 1706. Otherwise control returns to step 1704.

FIG. 17B provides a control-flow diagram for the handler new_process, called in step 1707 of FIG. 17A. In step 1720, a new_process message p is received. In step 1722, a node_ID and a command line c are extracted from message p. In step 1724, the command line c is parsed to generate a set of terms T not included in the table Stop_Terms. In each iteration of the for-loop of steps 1726-1731, a different term t in the set of terms T is considered. In step 1727, a row r is selected from the table Terms that includes the node_ID and the term t. When a row r is obtained, as determined in step 1728, the count field in the row r is incremented, in step 1729. Otherwise, in step 1730, a new row is inserted into the table Terms for the node referenced by node_ID and the term t, with the count field having the value 1.

FIG. 17C provides a control-flow diagram for the handler dead_process, called in step 1709 of FIG. 17A. In step 1734, a dead_process message p is received. In step 1735, a node_ID and a command line c are extracted from the message p. In step 1736, the command line c is parsed to generate a set of terms T not in the table Stop_Terms. Then, in the for-loop of steps 1737-1742, the count values for the terms in the set T are decremented and the rows of the table Terms for the node referenced by node_ID for which the count value falls to 0 are removed from the table Terms.

It should be noted that, in alternative implementations, the term counter may be combined with the process-Δs generator or implemented as a set of routines to which the process-Δs generator interfaces, rather than being an event-driven entity. Similar comments apply to other of the components of the currently discussed implementation.

Figure 18A:
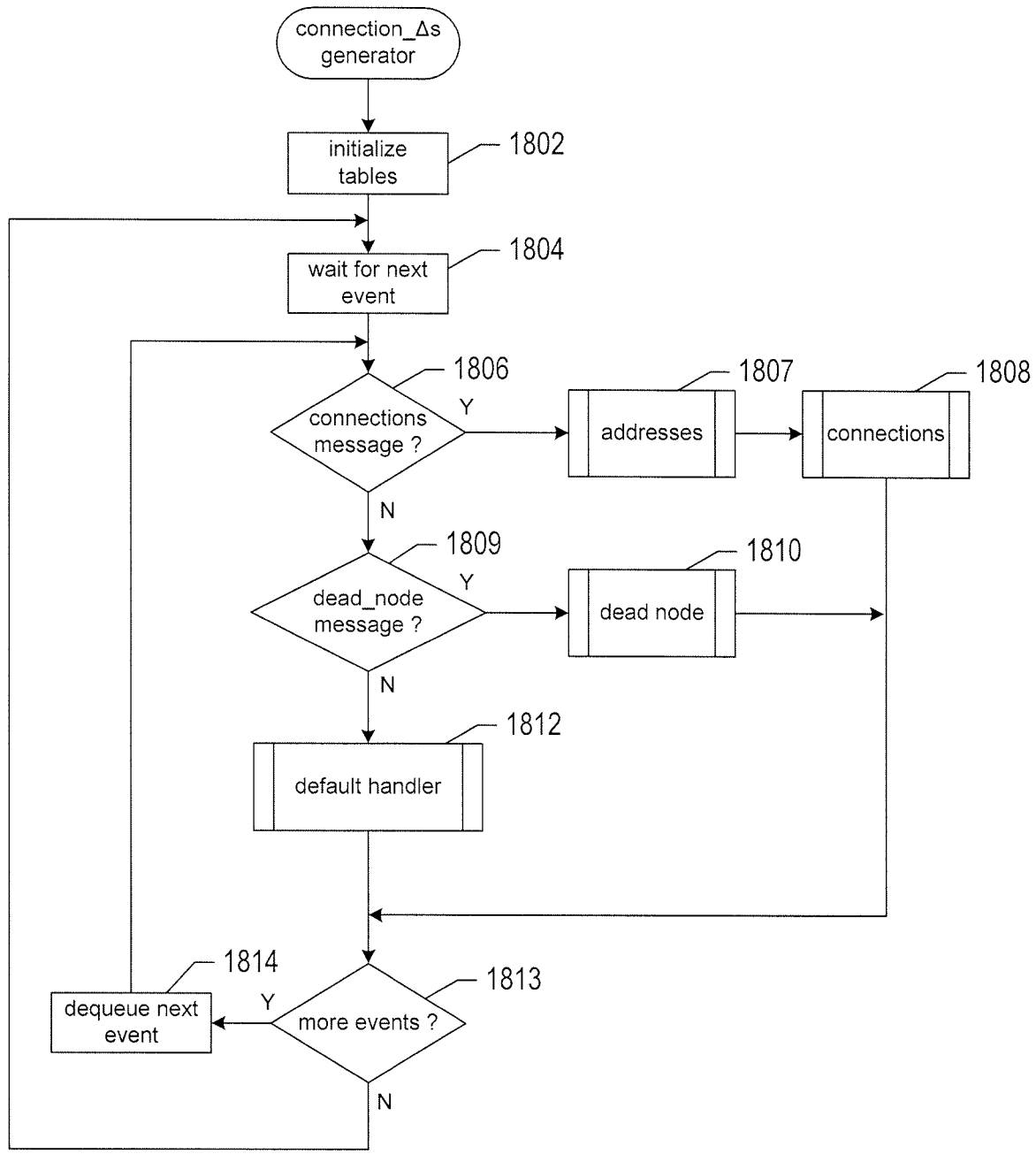
FIGS. 18A-D provide control-flow diagrams that illustrate one implementation of the connection-$\Delta$s generator (1306 in FIG. 13).

FIGS. 18A-D provide control-flow diagrams that illustrate one implementation of the connection-Δs generator (1306 in FIG. 13). As shown in FIG. 18A, the connection-Δs generator is implemented as an event-handling loop. In step 1802, the connection-Δs generator initializes the tables maintained by the connection-Δs generator. Then, in step 1804, the connection-Δs generator waits for a next event to occur. When the next-occurring event is receipt of a connections message, as determined in step 1806, the handlers addresses and connections are called, in steps 1807 and 1808. When the next-occurring event is a dead_node message, as determined in step 1809, the handler dead_node is called, in step 1810. A default handler 1812 handles any rare or unexpected events. When there are more events to handle, as determined in step 1813, a next event is dequeued from an event queue, in step 1814, and control returns to step 1806. Otherwise, control returns to step 1804.

Figure 18B:
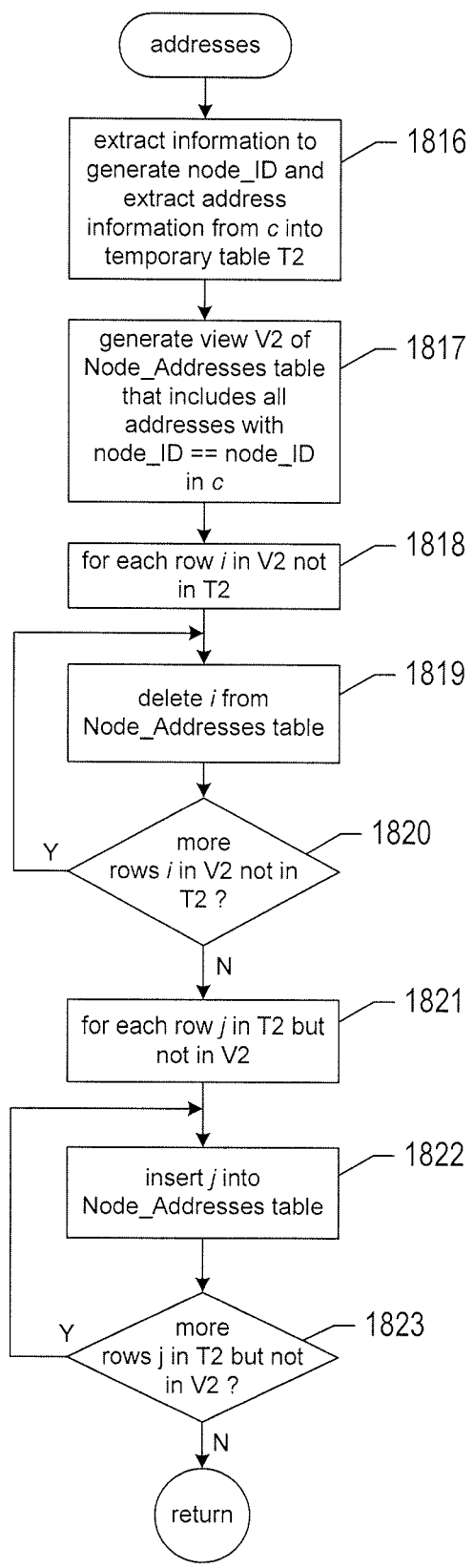

FIG. 18B provides a control-flow diagram for the handler addresses called in step 1807 of FIG. 18A. In step 1816, address information is extracted from the received connections message c into a temporary table T2. In step 1817, a view V2 is generated from the table Node_Addresses that includes all rows corresponding to the node identified by a node_ID generated from information extracted from the connections message c. In the for-loop of steps 1818, each row i that is in the view V2 but not also in the temporary table T2 is deleted from the table Node_Addresses and, in the for-loop of steps 1821-1823, each row j in temporary table T2 that is not in the view V2 is inserted into the table Node_Addresses.

Figure 18C:
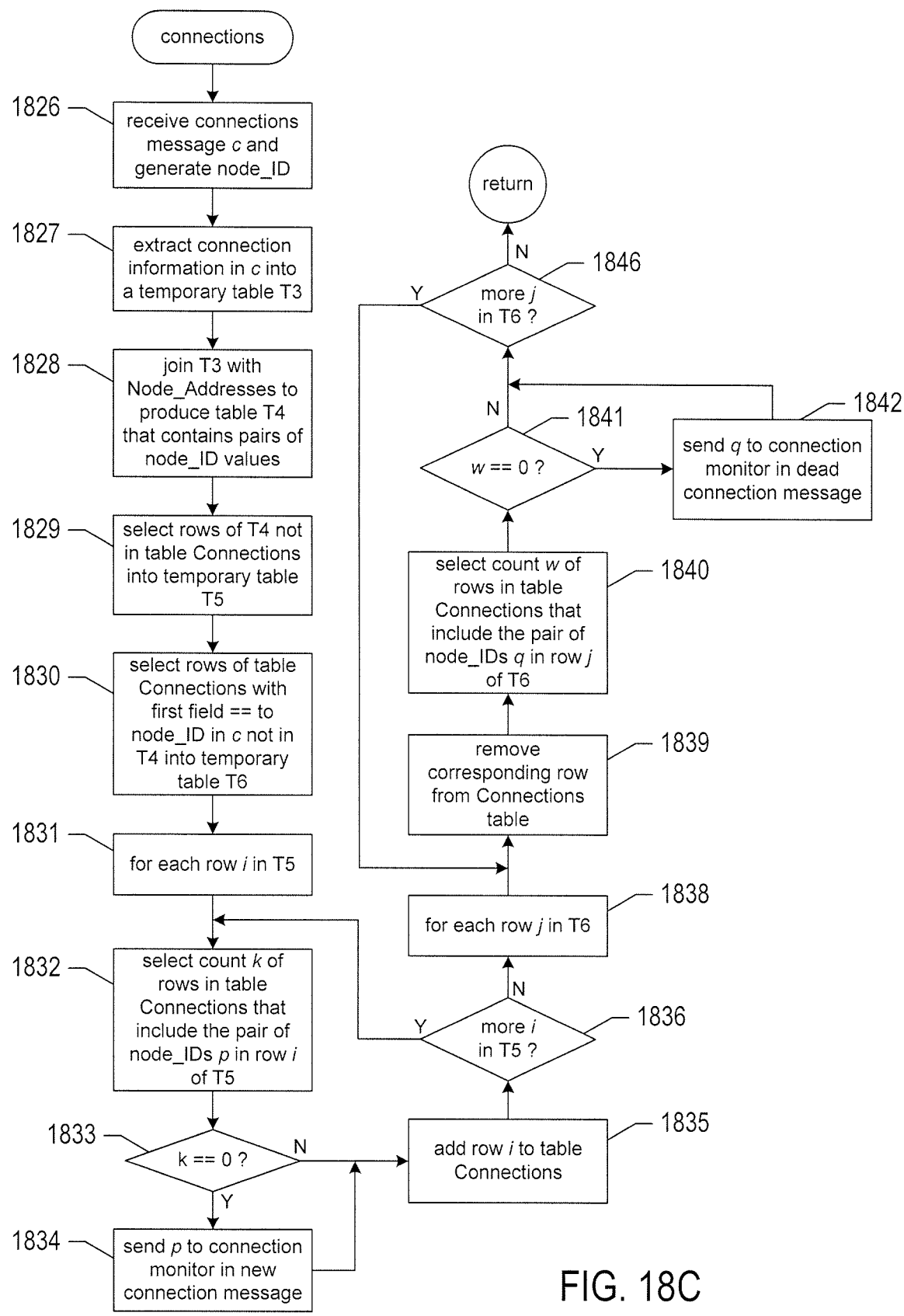

FIG. 18C provides a control-flow diagram for the handler connections called in step 1808 of FIG. 18A. In step 1826, connections message c is received and a node_ID is generated from information contained in the message. In step 1827, connection information contained in the connections message c is extracted into a temporary table T3. In step 1828, the temporary table T3 is joined with the table Node_Addresses to produce a table T4 that contains pairs of node_IDs. In step 1829, rows of temporary table T4 that do not occur in the table Connections are selected into a temporary table T5. In step 1830, rows of the table Connections with first field equal to node_ID that are not in temporary table T4 are selected into temporary table T6. In the for-loop of steps 1831-1836, each row in temporary table T5 is considered. When the number of rows in the table Connections that include the pair of node_IDs p in the currently considered row of temporary table T5 is 0, the pair of nodes p is sent to the connection monitor in a new_connection message, in step 1834 and the currently considered row is added to the table Connections, in Step 1835. Similarly, in the for-loop of steps 1838-1846, each row in temporary table T6 is considered. These rows represent dead connections. They are removed from the table Connections and when the table Connections no longer contains any connections between the pair of nodes, a dead_connection message is sent to the connection monitor for the pair of nodes, in step 1842.

Figure 18D:
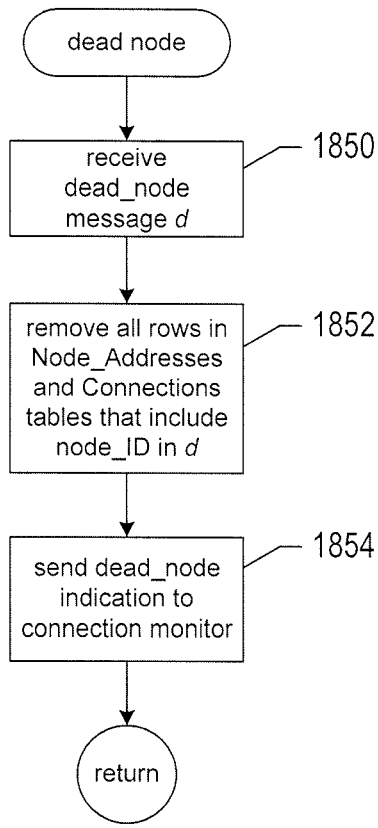

FIG. 18D provides a control-flow diagram for the dead_node handler called in step 1810 of FIG. 18A. In step 1850, the dead_node message d is received. In step 1852, entries in the tables Node_Addresses and Connections that include the node_ID contained in message d are removed and, in step 1854, a dead_node message is sent to the connection monitor.

Figure 19:
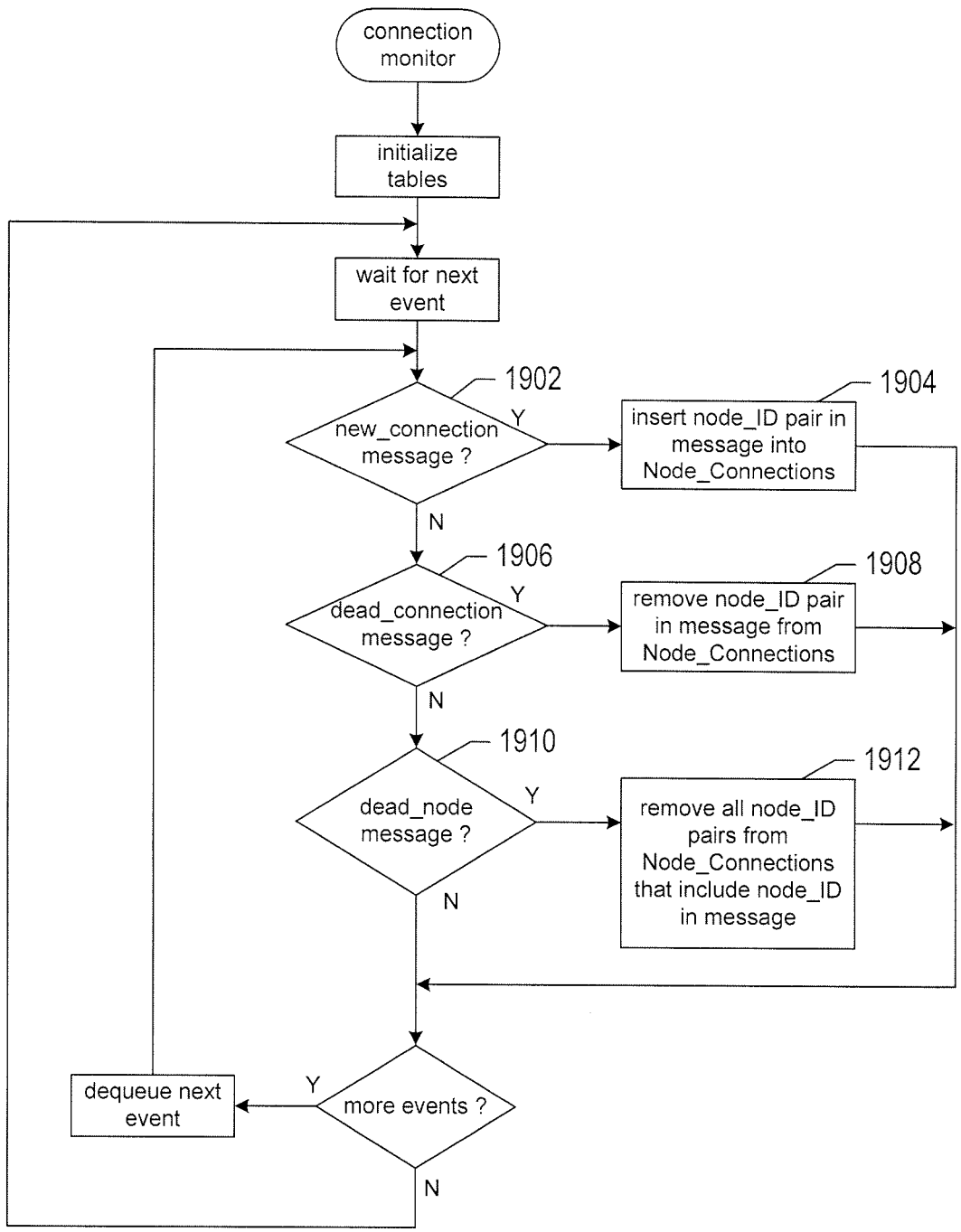
FIG. 19 provides a control-flow diagram that illustrates one implementation of the connection monitor (1310 in FIG. 13).

FIG. 19 provides a control-flow diagram that illustrates one implementation of the connection monitor (1310 in FIG. 13). The connection monitor is implemented as an event-handling loop. When a new_connection message is received, as determined in step 1902, the node_ID pair contained in the message is inserted into the table Node_Connections, in step 1904. When a dead_connection message is received, as determined in step 1906, the node_ID pair contained in the message is removed from the table Node_Connections, in step 1908. When a dead_node message is received, as determined in step 1910, the node_ID pairs that contain the node_ID contained in the dead_connection message are removed from the table Node_Connections.

Figure 20:
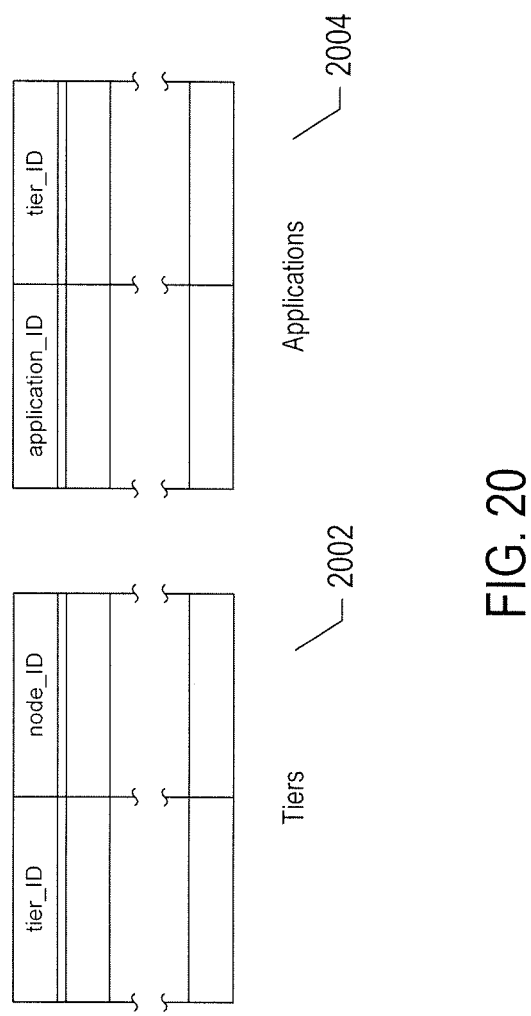
FIG. 20 illustrates to tables used by the application monitor (1312 in FIG. 13).

FIG. 20 illustrates to tables used by the application monitor (1312 in FIG. 13). Each row in the table Tiers 2002 includes a tier_ID and a node_ID. Each row in the table Applications 2004 includes an application_ID and a tier_ID. These tables are used to construct application tiers and applications, as discussed above with reference to FIGS. 12A-B.

Figure 21:
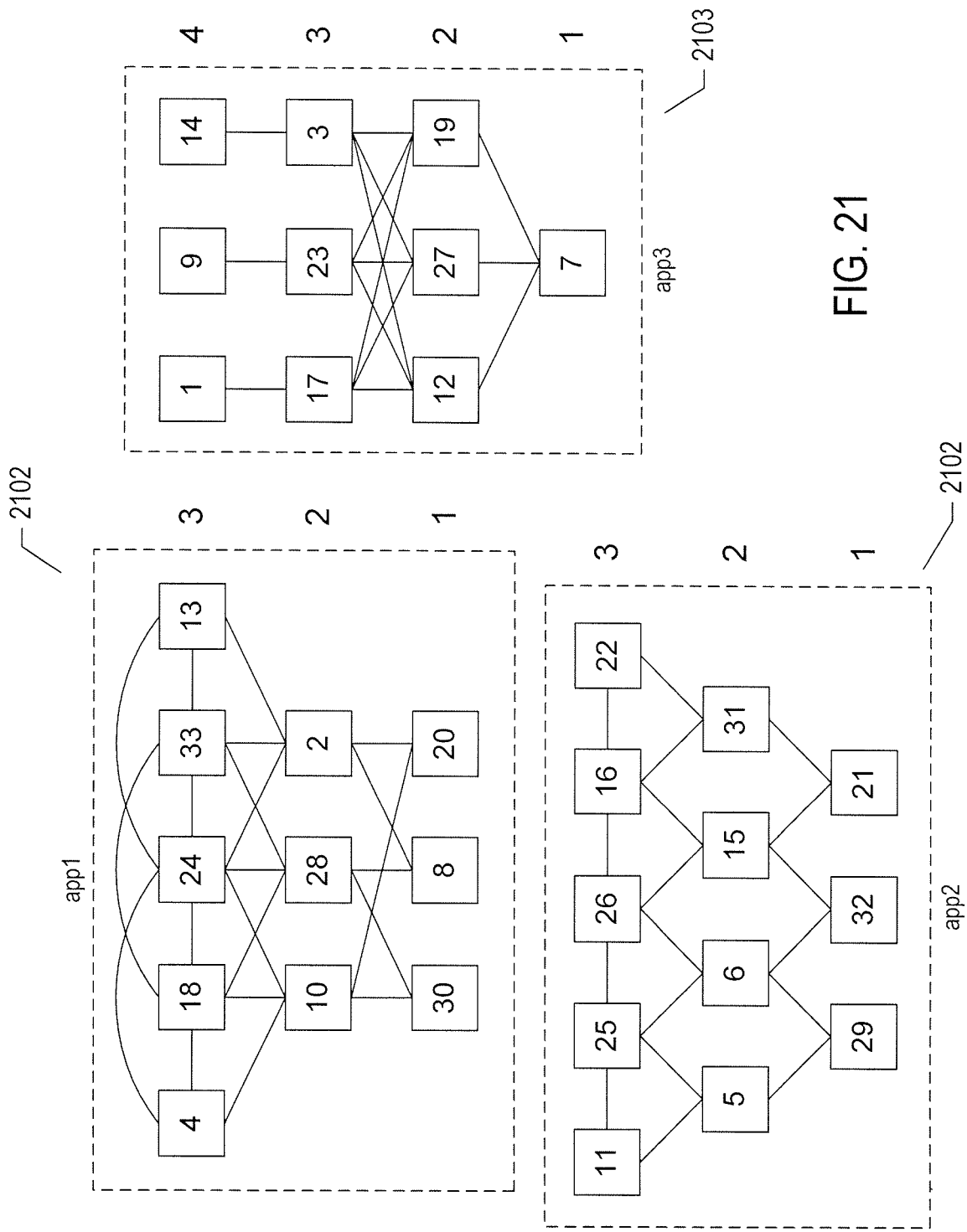

FIGS. 21-24 illustrate operation of the application monitor. FIG. 21 shows three applications using the node-, tier-, and connection-illustration conventions used in FIG. 12B. Small integers are used to label the nodes and dashed rectangles are used to indicate the three applications 2102-2103.

Figure 22A:
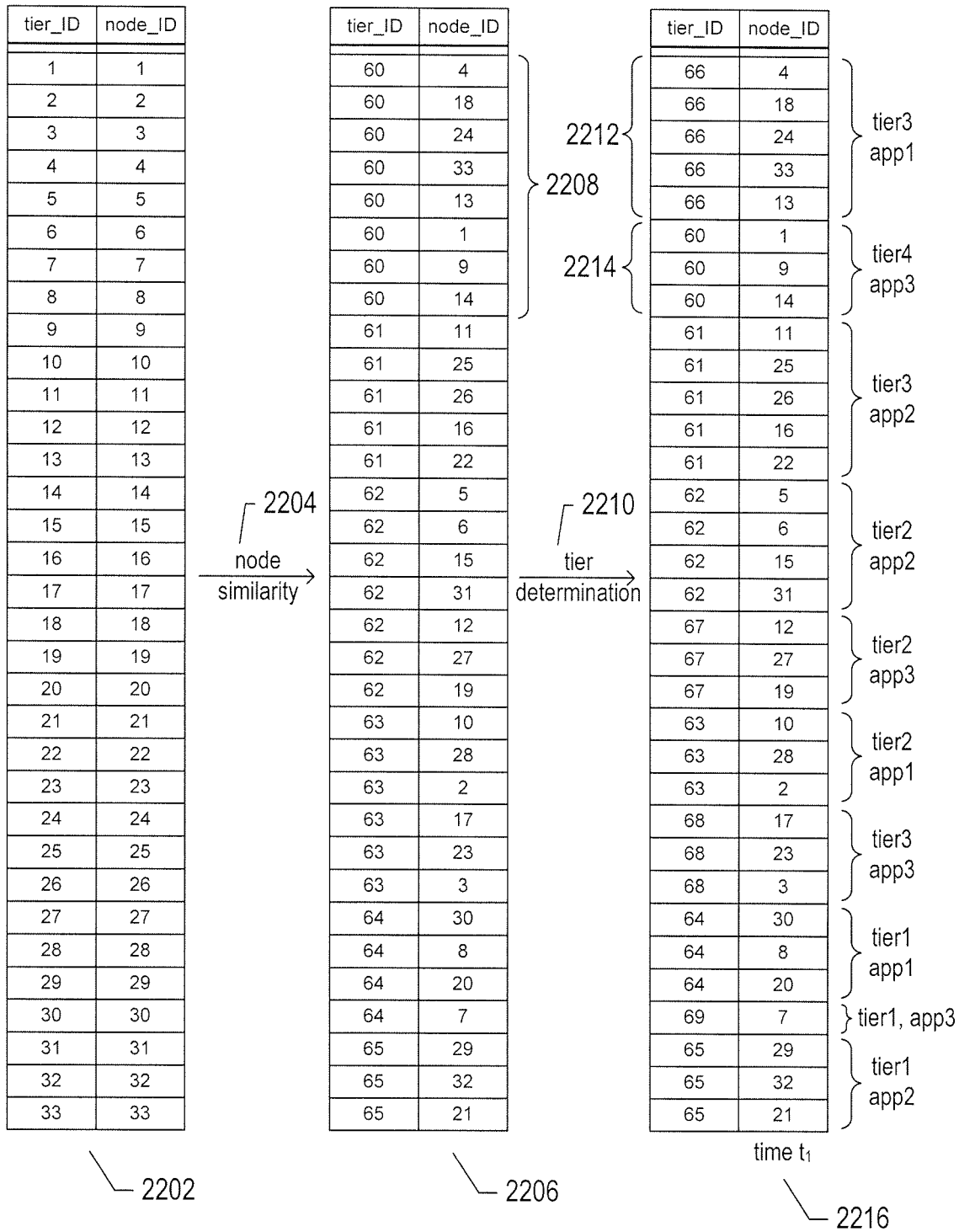
FIGS. 22A-B illustrate how the application monitor, in one implementation, determines applications from the information generated and stored by the term counter and connection monitor.
Figure 22B:
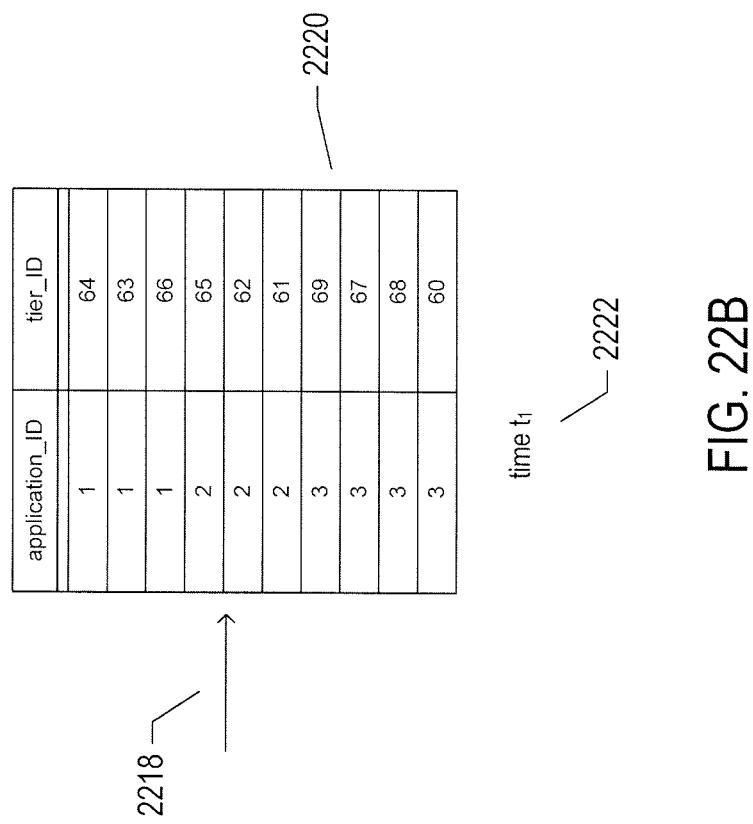

FIGS. 22A-B illustrate how the application monitor, in one implementation, discovers the three applications, shown in FIG. 21, from the information generated and stored by the term counter and connection monitor. FIG. 22A shows an initial state of the table Tiers 2202. Each node for which information is collected by agents is assigned to its own tier, or group, with the value of the tier_ID field equal to the value of the node_ID field. In a first step 2204, term-count information is used to partition the nodes into six different node types. A second state 2206 of the table Tiers represents assignment of the nodes to the six different node-type groups. For example, a first set of nodes 2208 are assigned to a group represented by the tier_ID 60. In a second step 2210, connection information is used to partition the node-type groups into application tiers. For example, the node-type group 2208 is now partitioned into a first tier 2212 and a second tier 2214. Indications of to which applications the tiers belong are provided along the right side of the table Tiers 2216 in FIG. 22A, for clarity. However, after the second step, assignments of tiers to applications has not yet occurred. Finally, in a third step 2218 shown in FIG. 22B, the application monitor uses additional node-connection information to identify the three applications shown in FIG. 21 and the tiers within each application, with the application-identification information stored in the table Applications 2220. As discussed above, the first step 2204 uses node-type information obtained from the data generated by the term counter, the tier-determination step 2210 uses connection information maintained by the connection monitor, and the third step 2218 employs additional connection information generated and maintained by the connection monitor. As indicated in FIG. 22B, the application-identifying information stored in the table Applications 2220 represents the distributed applications executing in a distributed-computing facility at a first point in time $t_1$ 2222. As discussed below, an alternative approach is to first identify applications and then identify the tiers within the identified applications.

FIG. 23 shows the currently executing applications in the distributed-computing facility at a second point in time $t_2$. Comparison of FIGS. 21 and 22 reveals that original nodes 1 and 3 in the third application 2103 have been replaced, by time $t_2$, with new nodes 34 and 35. Similarly, node 22 in the second application 2102 has been replaced by a new node 36 at time $t_2$. Finally, nodes 4, 13, 10, 20, and 30 have been deleted from the first application 2102 at time $t_2$.

Figure 24:
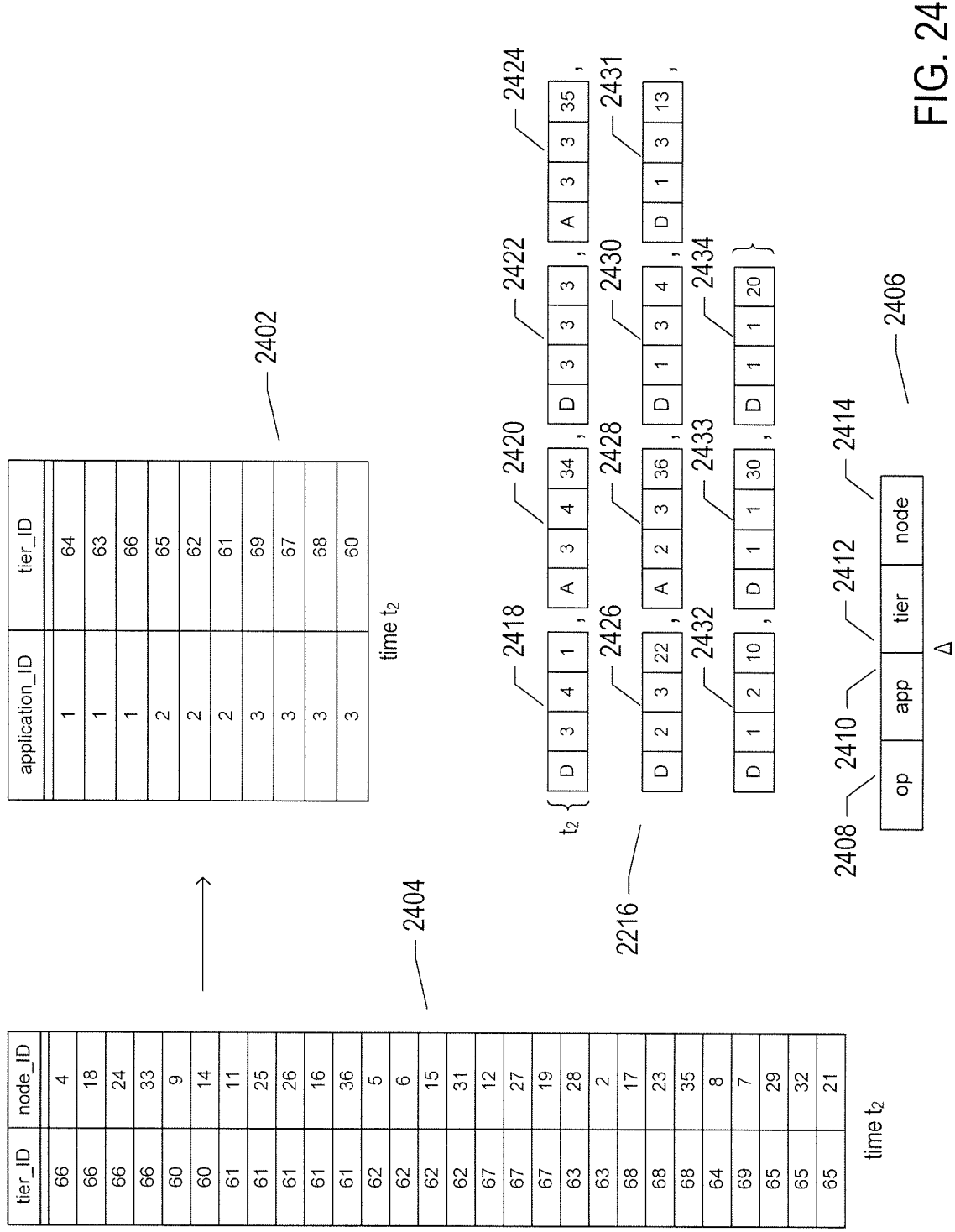

FIG. 24 illustrates the tables Tiers and Applications following application identification by the application monitor at time $t_2$. The contents of the Applications table at time $t_1$ (2220 FIG. 22 B) and at time $t_2$ (2402 in FIG. 24) are identical. Indeed, comparison of FIGS. 21 and 23 reveals that the same three applications are executing at both times $t_1$ and $t_2$ and that the three applications have the same number of tiers at both times $t_1$ and $t_2$. However, the contents of the table Tiers at time $t_1$ (2216 in FIG. 22A) differ from the contents of the table Tiers 2404 at time $t_2$. These differences reflect substituted nodes and the deleted nodes. In the third step of the application-monitor cycle, in which the application monitor compares the discovered applications for two successive points in time (1326 in FIG. 13) to generate application Δs, an ordered set of edits is generated by the application monitor to describe the differences in the identified applications. Each edit, or Δ, is represented, in one implementation, by a four-value quantity 2406. The four values include: (1) an indication of an operation 2408; (2) an indication of an application, or an application identifier 2410; (3) a tier identifier 2412; and (4) a node identifier 2414. The application monitor generates the set of Δs 2216 for the example of FIGS. 21-24 at time $t_2$. These edits, or Δs, include deletion of node 1 in the fourth tier of application 3 2418, addition of node 34 to the fourth tier of application 3 2420, deletion of node 3 in the third tier of the third application 2422, addition of node 35 to the third tier of the third application 2424, deletion of node 22 in the third tier of the second application 2426, addition of node 36 to the third tier the second application 2428, and deletion of nodes 4, 13, 10, 30, and 20 from the first application 2430-2434. By leaving out the node identifier in an application Δ, the application Δ refers to an operation carried out on a tier of an application. By leaving out both the node identifier and the tier identifier in an application Δ, the application Δ refers to an operation carried out on an application. Thus, applications and tiers can be both deleted and added. There are many different possible sets of application Δs that can be used to represent the differences in the discovered applications at two points in time. The application monitor employs an edit-distance-based method that generates an optimal set of application Δs, which is a set of application Δs with minimum cardinality. When the application Δs generated by the application monitor are carried out sequentially by an application-Δ sink, an exact replica of the current discovered applications, at a time corresponding to the final application Δ in the sequence, is generated. Of course, there are many different possible definitions of an optimal set of application Δs, and different implementations may use different of the definitions and therefore employ different constraints and goals for generating an optimal set of application Δs. In general, each edit is associated with a cost, and an optimal set of application Δs may be the minimal-cost set of application Δs, but different types of costs may be considered. In the current implementation, each edit has the same, unit cost. In alternative implementations, the cost may be related to the number of basic of fundamental changes represented by an edit.

Figure 25:
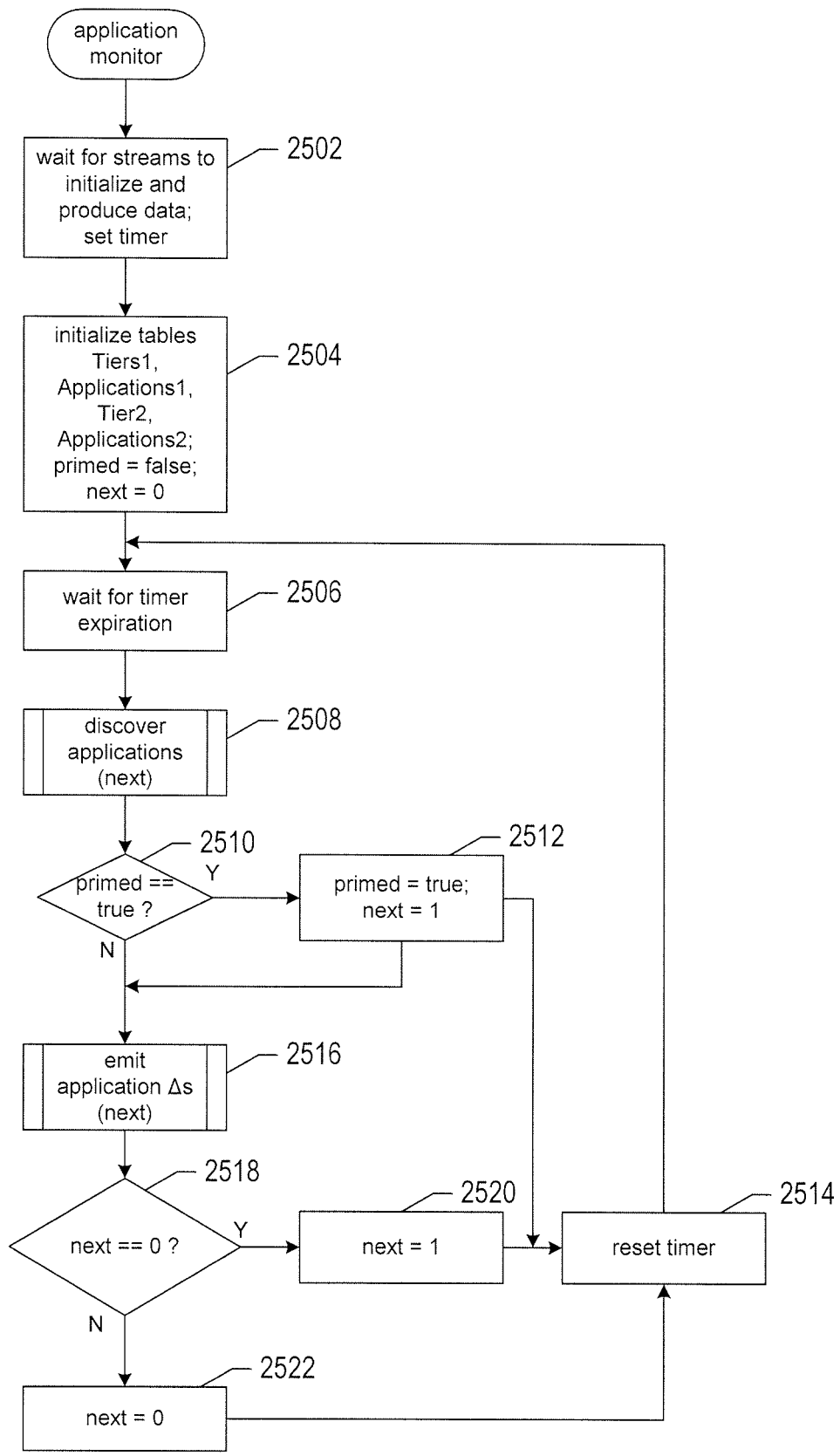
FIG. 25 provides a control-flow diagram that illustrates one implementation of the application monitor (1312 in FIG. 13).

FIG. 25 provides a control-flow diagram that illustrates one implementation of the application monitor (1312 in FIG. 13). In Step 2502, the application monitor waits for the data streams to initialize and begin producing data and then sets a cycle timer. In step 2504, the application monitor initializes two sets of tables, each including a table Tiers and a table Applications. In addition, a local variable primed is set to false and a local variable next is set to 0. In step 2506, the application monitor waits for expiration of the cycle timer set in step 2502. When the cycle timer expires, a next application-discovery cycle is undertaken by the application monitor. In step 2508, the application monitor calls the routine "discover applications" to identify the applications currently executing in the distributed-computing facility. When the local variable primed does not contain the value true, as determined in step 2510, then, in step 2512, the local variable primed is set to true, the local variable next is set to 1, and control returns to step 2506 following a reset of the cycle timer, in step 2514. Otherwise, the application monitor calls a routine "emit application Δs" in step 2516 to compare the currently executing applications to the applications discovered in the previous application-monitor cycle in order to generate the application Δs that represent the differences between the currently executing applications and the previously discovered applications. When the local variable next has the value 0, as determined in step 2518, the local variable next is set to the value 1, in step 2520, after which the cycle timer is reset, in step 2514, and control returns to step 2506. When the local variable next has the value 1, as determined in step 2518, the local variable next is set to 0, in step 2522, the cycle timer is reset, and control returns to step 2506.

Figure 26:
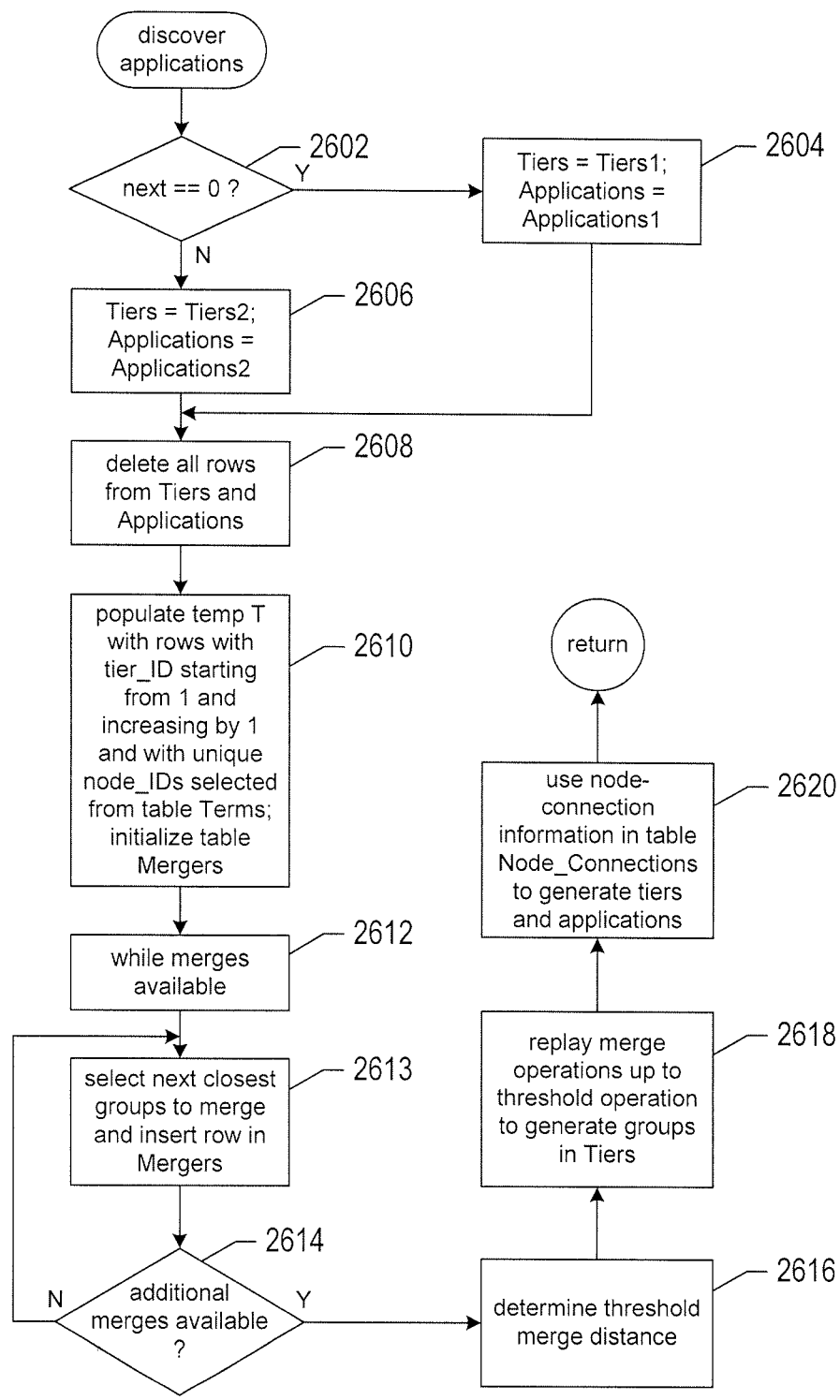
FIG. 26 provides a control-flow diagram for the routine "discover applications," called in step 2508 of FIG. 25.

FIG. 26 provides a control-flow diagram for the routine "discover applications," called in step 2508 of FIG. 25. When the variable next has the value 0, as determined in step 2602, the local variable Tiers is set to reference the table Tiers1 and the local variable Applications is set to reference the table Applications1, in step 2604. Otherwise, in step 2606, the local variable Tiers is set to reference the table Tiers2 and the local variable Applications is set to reference the table Applications2. In step 2608, all of the rows are deleted from the tables Tiers and Applications. In step 2610, a temporary table tempT is populated with rows that contain the node identifiers selected from the table Terms and with the tier_ID value set to a unique small integer for each row a table Merges is initialized. The table Merges is discussed, below, with reference to FIG. 27. In each iteration of the for-loop of steps 2612-2614, two rows representing the closest current node groups are selected from one or both of the tables tempT and Merges, used to generate a new row that is inserted into the table Merges with the field merged having the value false, and then, when one or both of the selected rows was selected from the table tempT, the one or two rows selected from the table tempT are deleted from the table tempT and, when one or both of the rows are selected from the table Merges, the value of the field merged in the one or two selected rows is set to true. The for-loop of steps 2612-2614 continues to iterate until there are no more possible node-group merges. The for-loop of steps 2612-2614 essentially implements a hierarchical agglomerative clustering method to cluster similar node groups together to generate larger clusters until all of the nodes have been clustered into a single cluster. The entries in the table Merges essentially represent the sequence of merge operations that begins with each node assigned to its own cluster and ends with all of the nodes assigned to a single cluster. In step 2616, a threshold distance value is determined from the information stored in the table Merges, as further discussed below. Then, in step 2618, the entries in the table Merges are sequentially replayed to generate a set of clusters or groups that represent the merge operations up to the point that no additional merge operations that merge clusters having a distance less than or equal to the threshold distance are possible. Finally, in step 2620, node-connection information maintained by the connection monitor in the table Node_Connections is used to generate application tiers and applications, as discussed above with reference to FIGS. 12A-B and FIGS. 21-24.

FIG. 27 provides greater detail regarding the hierarchical agglomerative clustering method implemented by the for-loop of steps 2612-2614 in the FIG. 26. The number of occurrences of the term t in the command lines used to launch the processes currently executing on a node n, count(t, n) 2702, is stored in the table Terms maintained by the term counter. The total number of nodes N 2704 can be determined as the number of rows in the table Nodes maintained by the process-Δs generator. The number of nodes associated with process command lines that include at least one occurrence of a term t, $n_t$ 2706, can be determined from the table Terms maintained by the term counter. A weight for a particular term t that occurs in at least one process command line for a node n, w(t, n), is computed as shown in expression 2708. The weight of a term increases with an increase in the number of occurrences of that term in the process command lines for a node and decreases as the number of nodes for which the term occurs in at least one process command line increases. The distance between two nodes is computed as shown in expression 2710. A node group G 2712 includes one or more nodes. The cardinality of a node group 2714 is equal to the number of nodes in the node group and the cardinality of any particular node group is greater than or equal to 1 and less than or equal to N 2716. The distance between two node groups is computed according to expression 2718. FIG. 27 also shows an illustration of the table Merges 2720. Each row in the table Merges represents a merge operation in which two node groups referenced by the field values tier_ID_1 and tier_ID_2 are merged to generate the node group tier_ID_f. Each row also includes the computed distance between the merged node groups and a field indicating whether the node group tier_ID_f represented by the row has been merged with another node group in a subsequent merge operation.

Figure 28:
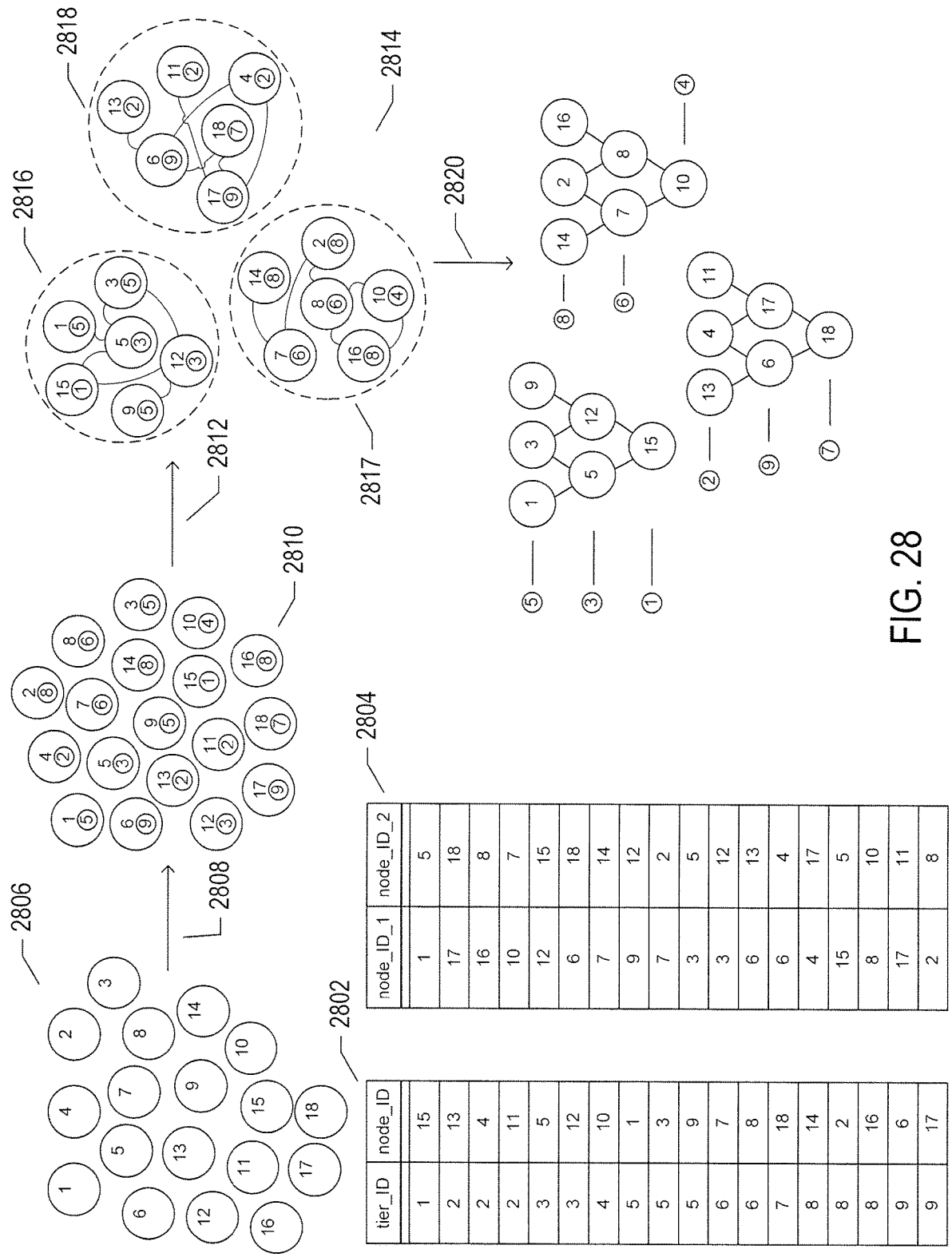
FIG. 28 illustrates use of the table Tiers and the table Node_Connections to identify distributed applications and a distributed-computing facility.

FIG. 28 illustrates use of the table Tiers and the table Node_Connections to identify distributed applications in a distributed-computing facility. The table Tiers 2802 includes a full set of nodes that have been partitioned into node groups, each node group represented by particular tier_ID value. The contents of the table Tiers 2802 is produced by the above-discussed hierarchical agglomerate of clustering method. The Node_Connections table 2804 includes representations of the node-to-node connections maintained by the connection monitor. Initially, the application monitor determines the total number of nodes in the current node set 2806 representing the nodes currently executing in the distributed-computing facility, with each node associated with a node_ID. In a first step 2808, the application monitor uses the contents of the table Tiers 2802 to assign a type to each node 2810. In a next step 2012, the application monitor uses the connection information in the Node_Connections table 2804 to partition the nodes into sets of connected nodes 2814, in the example of FIG. 28 including the three partitions 2816-2818. Finally, application monitor uses the assigned node types to reorganize the nodes within each partition into tiers, in a final step 2820.

FIG. 29 provides pseudocode that illustrates one method for partitioning the type-assigned nodes (2810 in FIG. 28) into interconnected partitions (2814 in FIG. 28). A pointer connection_groups references a list of connection_group data structures 2902, each connection_group data structure representing a set of nodes. A temporary table tempTable is initialized to contain the contents of the table Node_Connections 2904. The outer while-loop 2906 iterates until there are no more rows left in the table tempTable. During each iteration, a row r is selected from the table t tempTable 2908 and then deleted from the table tempTable 2910. A new connection_group data structure is allocated 2912 and added to the list of connection groups 2914. The two node_IDs in the row r are inserted into the newly allocated connection_group 2960 then, in each iteration of the inner while-loop 2918, a rows is selected from the table tempTable, where one of the two node_IDs in the selected row s is contained in the newly allocated connection_group. The row s is then deleted from the table tempTable 2920. When the row s contains a node_ID not already contained in the newly allocated connection_group data structure, that node_ID is added to the newly allocated connection_group data structure 2922. Of course, there are many different approaches that can be used for partitioning entities into related groups.

Figure 30:
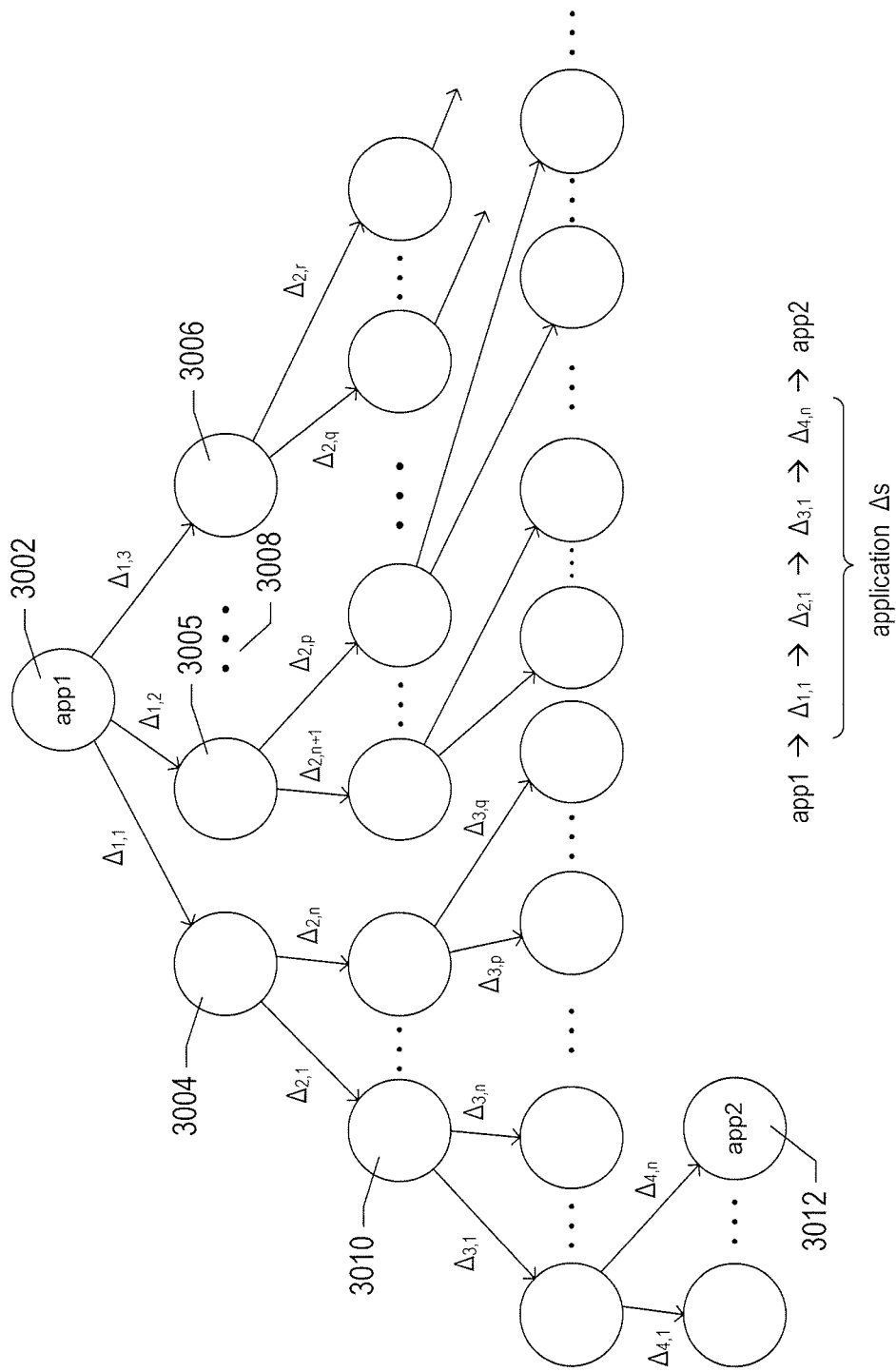
FIG. 30 illustrates one approach to generating the edits, or application $\Delta$s, for two different sets of discovered applications app1 and app2.

FIG. 30 illustrates one approach to generating the edits, or application Δs, for two different sets of discovered applications app1 and app2. A root node 3002 represents the set of discovered applications app1. A first level of nodes 3004-3006 represents all possible single-edit modifications of the set of discovered applications app1. Note that the ellipses 3008 represents the fact that there are many additional nodes in the first level of child nodes below the root node 3002. A second level of child nodes, that includes node 3010, is produced by expanding each node in the first level of child nodes by all possible single-edit modifications of the modified applications represented by the first-level child nodes. This process continues until an ancestor node 3012 represents the second set of discovered applications app2. The sequence of edits, or Δs, represented by the edges leading from the root node 3002 to the ancestor node 3012 represent the ordered sequence of application Δs that would be generated and emitted by the application monitor in the third step of the application-monitor cycle (1326 in FIG. 13). Of course, those familiar with computational complexity would immediately recognize that the process illustrated in FIG. 30 is completely infeasible when the number of virtual-machine nodes is of even modest size. The problem is that the number of possible paths increases exponentially with each subsequent layer of child nodes. Fortunately, there are a number of well-known string-edit-distance-based dynamic-programming methods that are commercially available for finding optimal set of edits to represent the differences between two sets of applications identified at different points in time by the application monitor and compared in the third step of the application-monitor cycle.

The present invention has been described in terms of particular embodiments, it is not intended that the invention be limited to these embodiments. Modifications within the spirit of the invention will be apparent to those skilled in the art. For example, any of many different implementations can be obtained by varying various design and implementation parameters, including modular organization, control structures, data structures, hardware, operating system, and virtualization layers, and other such design and implementation parameters. An underlying assumption in the above discussed methods and implementations is that each application-execution environment supports execution of processes associated with a single distributed application, but that assumption may be removed by additional steps that partition processes executing in an application-execution environment into groups of processes that are each associated with a particular application using additional information collected by agents and additional related assumptions. As mentioned above, many other types of collected information may be additionally employed in alternative implementations of the disclosed methods and systems to increase the precision and reliability of distributed-application discovery. In many implementations, the data collected and transmitted by agents is encrypted and may even be anonymized, to ensure that confidential information is not inadvertently exposed during the application-discovery process.

The invention claimed is:

1. A distributed-application-discovery system comprising multiple information-collection and information-processing components that run within physical computer systems to discover the distributed applications currently executing within a distributed computing facility, the multiple components including:
   agent processes that each
      runs in an application-execution-environment node within a computer system within the distributed computing facility; and
      periodically
         collects information about the application-execution-environment node, and
         transmits the collected information to information-processing components;
   the information-processing components that
      maintain state information for each application-execution-environment node,
      extract state-related information from the collected information received from the agent processes,
      generate application-execution-environment-node state changes for the application-execution-environment nodes, and
      compile application-execution-environment node characteristics from the state changes; and
   an application monitor that
      periodically
         uses the compiled application-execution-environment node characteristics to discover distributed applications currently executing within the application-execution-environment nodes,
         generates application changes, and
         persistently stores the application changes.

2. The distributed-application-discovery system of claim 1 wherein the information collected by each agent process includes:
   command lines used to launch each process currently executing in the application-execution-environment node in which the agent runs;
   communications addresses through which the application-execution-environment node communicates with other application-execution-environment nodes; and
   current communications connections between the application-execution-environment node and other entities, including other application-execution-environment nodes.

3. The distributed-application-discovery system of claim 1 wherein the information-processing components include one or more process-delta generators that each
   extracts information, from received information collected by an agent, about processes executing within the application-execution-environment node from which the agent collected the information, including command lines used to launch the processes;

compares the extracted information to persistently maintained information about processes executing within the application-execution-environment node; and when the received information differs from the persistently maintained information,
generates one or more process-information changes that reflect one or more differences between the persistently maintained information and received information,
transmits the process-information changes to a term-counter information-processing component, and
updates the persistently maintained information to correspond to the received information.

4. The distributed-application-discovery system of claim 3 wherein each of the one or more process-delta generators additionally
extracts information, from received information collected by an agent, about communications addresses within the application-execution-environment node from which the agent collected the information, including command lines used to launch the processes;
compares the extracted information to persistently maintained information about communications addresses within the application-execution-environment node; and
when the received information differs from the persistently maintained information,
updates the persistently maintained information to correspond to the received information.

5. The distributed-application-discovery system of claim 3 wherein each of the one or more process-delta generators additionally
extracts information, from received information collected by an agent, about communications connections that include the application-execution-environment node from which the agent collected the information, including command lines used to launch the processes; and
forwards the communications-connections information to a connection-delta generator.

6. The distributed-application-discovery system of claim 1 wherein the information-processing components include one or more connections-delta generators that each
extracts information, from received information collected by an agent, about communications connections that include the application-execution-environment node from which the agent collected the information;
compares the extracted information to persistently maintained information about communications connections that include the application-execution-environment node; and
when the received information differs from the persistently maintained information,
generates one or more communications-connections-information changes that reflect one or more differences between the persistently maintained information and received information,
transmits the communications-connections changes to a connections-monitor information-processing component, and
updates the persistently maintained information to correspond to the received information.

7. The distributed-application-discovery system of claim 1 wherein the information-processing components include a term counter that
receives process-information changes, from one or more process-delta generators, that each describes a change to the processes executing within an application-execution-environment node from which an agent collected information that the agent transmitted to a process-delta generator;
parses a command line, used to launch a process within the application-execution-environment node, included in the received process-information changes, to generate a list of relevant terms included in the command line; and
updates persistently maintained term-count information for the application-execution-environment node.

8. The distributed-application-discovery system of claim 1 wherein the information-processing components include a connection monitor that
receives communications-connections-information changes, from one or more connections-delta generators, that each describes a change to the communications connections that include an application-execution-environment node from which an agent collected information that the agent transmitted to a connections-delta generator; and
updates persistently maintained communication-connections information that represents each communications connection between two different application-execution-environment nodes.

9. The distributed-application-discovery system of claim 1 wherein the application monitor uses communication-connections information that represents each communications connection between two different application-execution-environment nodes that is persistently maintained by a connection-monitor information-processing component and term-count information for the application-execution-environment nodes is persistently maintained by a term counter information-processing component, the term-count information for an application-execution-environment node including the counts of each relevant term in the command line used to launch a process executing within the application-execution-environment node.

10. The distributed-application-discovery system of claim 9 wherein the application monitor discovers distributed applications executing in the distributed computing facility by:
using the term-count information for each application-execution-environment node to group the application-execution-environment nodes by type;
using the communication-connections information that represents each communications connection between two different application-execution-environment nodes to partition the application-execution-environment nodes into groups of interconnected application-execution-environment nodes, each group of interconnected application-execution-environment nodes corresponding to a distributed application; and
for each group of interconnected application-execution-environment nodes,
using a type for each application-execution-environment node in the group of interconnected application-execution-environment nodes,
assigning application-execution-environment nodes having a common type to a tier within the distributed application corresponding to the group of interconnected application-execution-environment nodes.

11. The distributed-application-discovery system of claim 10 wherein the application monitor employs an agglomerative clustering method to generate groups of application-execution-environment nodes with a common type.

12. The distributed-application-discovery system of claim 11 wherein the agglomerative clustering method generates groups of application-execution-environment nodes with a common type by:
  assigning each application-execution-environment node to a different single-node group;
  iteratively
    selecting two closest groups,
    merging the two closest groups into a new group, and
    recording the merging of the two closest groups
  until the application-execution-environment nodes are assigned to a single group;
  computing a threshold distance from the recorded group mergings; and
  selecting the groups of application-execution-environment nodes with a common type as those groups produced by merging closest groups up to a point where no two groups are within the threshold distance of one another.

13. The distributed-application-discovery system of claim 12
  wherein the distance between two groups is computed from a sum of aggregate distances computed for each application-execution-environment node in a first group of the two groups, where an aggregate distance is the sum of distances between an application-execution-environment node in the first group and the application-execution-environment nodes in the second group;
  wherein the distance between two application-execution-environment nodes is computed as the sum of the products of the weights for each term with respect to the two application-execution-environment nodes divided by the product of the square root of the sums of the squared weights for each term for a first application-execution-environment node of the two application-execution-environment nodes and the square root of the sums of the squared weights for each term for a second application-execution-environment node; and
  wherein the weight of a term with respect to an application-execution-environment node increases with an increase in the number of occurrences of the term in the command lines used to launch the processes executing in the application-execution-environment node and decreases with an increasing number of application-execution-environment nodes for which the term occurs at least once in the command lines used to launch the processes executing in the application-execution-environment nodes.

14. The distributed-application-discovery system of claim 10 wherein the application monitor generates application changes by:
  persistently storing a first data representation of distributed applications discovered during a first periodic distributed-application discovery;
  generating a second data representation of distributed applications discovered during a second periodic distributed-application discovery;
  comparing the first and second data representations to determine differences between the distributed applications discovered during the second periodic distributed-application discovery and the distributed applications discovered during the first periodic distributed-application discovery; and
  generating a sequence of edits that transform the first data representation into the first second data representation.

15. The distributed-application-discovery system of claim 14 wherein each edit represents one of a set of edit operations that include:
  inserting a new distributed application;
  deleting a distributed application;
  inserting a new tier in a distributed application;
  deleting a tier from a distributed application;
  inserting a new application-execution-environment node in a tier of a distributed application; and
  deleting an application-execution-environment node from a tier of a distributed application.

16. A method that discovers distributed applications executing within a distributed computing facility, the method comprising:
  including an agent into each application-execution-environment node of the distributed computing facility to periodically collect and stream about the application-execution-environment node to information-processing components;
  processing the streamed information by the information-processing components to compile persistently stored command-line term-count information for processes currently executing on each application-execution-environment node and persistently stored information about the communications connections between pairs of application-execution-environment nodes; and
  periodically
    using the persistently stored information to discover distributed applications currently executing within the application-execution-environment nodes,
    generating application changes, and
    persistently storing the application changes.

17. The method of claim 16 further comprising using the persistently stored information to discover distributed applications currently executing within the application-execution-environment nodes by:
  using the term-count information for each application-execution-environment node to group the application-execution-environment nodes by type;
  using the communication-connections information to partition the application-execution-environment nodes into groups of interconnected application-execution-environment nodes, each group of interconnected application-execution-environment nodes corresponding to a distributed application; and
  for each group of interconnected application-execution-environment nodes,
    using a type for each application-execution-environment node in the group of interconnected application-execution-environment nodes,
      assigning application-execution-environment nodes having a common type to a tier within the distributed application corresponding to the group of interconnected application-execution-environment nodes.

18. The method of claim 17 wherein the application monitor employs an agglomerative clustering method to generate groups of application-execution-environment nodes with a common type.

19. The method of claim 17 wherein the application monitor generates application changes by:
  persistently storing a first data representation of distributed applications discovered during a first periodic distributed-application discovery;
  generating a second data representation of distributed applications discovered during a second periodic distributed-application discovery;

comparing the first and second data representations to determine differences between the distributed applications discovered during the second periodic distributed-application discovery and the distributed applications discovered during the first periodic distributed-application discovery; and generating a sequence of edits that transform the first data representation into the first second data representation.

20. A physical data-storage device encoded with computer instructions that, when executed within one or more computer systems, control the computer systems to discover distributed applications executing within a distributed computing facility by:

including an agent into each application-execution-environment node of the distributed computing facility to periodically collect and stream information about the application-execution-environment node to information-processing components;

processing the streamed information by the information-processing components to compile persistently stored command-line term-count information for processes currently executing on each application-execution-environment node and persistently stored information about the communications connections between pairs of application-execution-environment nodes; and periodically
using the persistently stored information to discover distributed applications currently executing within the application-execution-environment nodes,
generating application changes, and
persistently storing the application changes.

* * * * *